United States Patent
Li et al.

(10) Patent No.: US 11,402,711 B2
(45) Date of Patent: Aug. 2, 2022

(54) ARRAY SUBSTRATE, DISPLAY PANEL, DISPLAY DEVICE AND MANUFACTURING METHOD FOR ARRAY SUBSTRATE

(71) Applicants: FUZHOU BOE OPTOELECTRONICS TECHNOLOGY CO., LTD., Fuzhou (CN); BOE TECHNOLOGY GROUP CO., LTD., Beijing (CN)

(72) Inventors: Zongxiang Li, Beijing (CN); Wenchao Wang, Beijing (CN); Jinglong Yan, Beijing (CN); Hongjiang Wu, Beijing (CN); Baoqiang Wang, Beijing (CN); Wenrui Liu, Beijing (CN); Xi Chen, Beijing (CN); Yao Liu, Beijing (CN); Hongtao Lin, Beijing (CN); Wenchang Tao, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

(*) Notice: Subject to any disclaimer, the term of this patent is extended or adjusted under 35 U.S.C. 154(b) by 95 days.

(21) Appl. No.: 16/959,234

(22) PCT Filed: Jul. 16, 2019

(86) PCT No.: PCT/CN2019/096151
§ 371 (c)(1),
(2) Date: Jun. 30, 2020

(87) PCT Pub. No.: WO2021/007774
PCT Pub. Date: Jan. 21, 2021

(65) Prior Publication Data
US 2021/0325748 A1   Oct. 21, 2021

(51) Int. Cl.
G02F 1/1368    (2006.01)
G02F 1/1362    (2006.01)
G02F 1/1343    (2006.01)

(52) U.S. Cl.
CPC .. *G02F 1/136286* (2013.01); *G02F 1/134336* (2013.01); *G02F 1/136227* (2013.01);
(Continued)

(58) Field of Classification Search
None
See application file for complete search history.

(56) References Cited

U.S. PATENT DOCUMENTS

| 10,598,992 B2 | 3/2020 | Wang et al. |
| 2017/0205673 A1 | 7/2017 | Wang et al. |

FOREIGN PATENT DOCUMENTS

| CN | 105140235 A | 12/2015 |
| CN | 107290910 A | 10/2017 |
| KR | 20140065865 A | * 5/2014 |

* cited by examiner

*Primary Examiner* — Thanh Nhan P Nguyen
(74) *Attorney, Agent, or Firm* — Dilworth & Barrese, LLP.; Michael J. Musella, Esq.

(57) ABSTRACT

An array substrate, a display panel, a display device, and a manufacturing method for an array substrate are provided. The array substrate includes a pixel unit group which includes a first pixel and a second pixel; the first pixel includes a first pixel electrode, a first switching element, and a first connection portion extending and protruding from the first pixel electrode; the second pixel includes a second pixel electrode, a second switching element, and a second connection portion extending and protruding from the second pixel electrode; the first pixel electrode and the first switching element are electrically connected to each other via the first connection portion; the second pixel electrode and the second switching element are electrically connected to each (Continued)

other via the second connection portion; and an extension length of the first connection portion is not equal to an extension length of the second connection portion.

18 Claims, 24 Drawing Sheets

(52) U.S. Cl.
 CPC ...... *G02F 1/1368* (2013.01); *G02F 1/134318* (2021.01); *G02F 1/134363* (2013.01); *G02F 2201/40* (2013.01)

ARRAY SUBSTRATE, DISPLAY PANEL, DISPLAY DEVICE AND MANUFACTURING METHOD FOR ARRAY SUBSTRATE

TECHNICAL FIELD

Embodiments of the present disclosure relate to an array substrate, a display panel, a display device, and a manufacturing method for an array substrate.

BACKGROUND

With development of display technologies, thin-film transistor liquid crystal display devices (TFT-LCD) have gradually become the mainstream of the market due to their advantages of low power consumption, lightweights and thin sizes, and low radiation. With improvement of people's living standards and continuous improvement of knowledge of display devices, people have put forward increasingly higher requirements on the display performance of display devices. For example, the display devices are required to have high resolution, high contrast, high response speed and so on. In addition, people have put forward higher requirements on parameters characterizing picture quality of display devices (e.g., afterimages, mura, light leakage, or the like). For example, in order to achieve a low-cost, high-resolution display device, many display devices use a dual-gate scheme.

SUMMARY

At least one embodiment of the present disclosure provides an array substrate, which comprises a pixel unit group. The pixel unit group comprises a first pixel and a second pixel arranged side by side and immediately adjacent to each other in a first direction; the first pixel comprises a first pixel electrode, a first switching element, and a first connection portion extending and protruding from the first pixel electrode; the second pixel comprises a second pixel electrode, a second switching element, and a second connection portion extending and protruding from the second pixel electrode; the first pixel electrode and the first switching element are electrically connected to each other via the first connection portion; the second pixel electrode and the second switching element are electrically connected to each other via the second connection portion; and an extension length of the first connection portion is not equal to an extension length of the second connection portion.

For example, in at least one example of the array substrate, the pixel unit group comprises a first edge and a second edge which are opposite to each other in the first direction; both of the first switching element and the second switching element are closer to the first edge of the pixel unit group than to the second edge in the first direction.

For example, in at least one example of the array substrate, the first pixel electrode is between the first switching element and the second switching element in a second direction intersecting with the first direction.

For example, in at least one example of the array substrate, the first switching element and the second switching element are arranged symmetrically with respect to a center line, which extends along the first direction, of the first pixel electrode in the second direction.

For example, in at least one example of the array substrate, an extending and a protruding direction of the first connection portion is the second direction, and an extending and a protruding direction of the second connection portion is the first direction, the first direction is intersecting with the second direction.

For example, in at least one example of the array substrate, in a second direction intersecting with the first direction, the second connection portion at least partially overlaps with the first pixel electrode.

For example, in at least one example of the array substrate, the first connection portion and the first pixel electrode are integrally formed and made of a same material, and the second connection portion and the second pixel electrodes are integrally formed and made of a same material.

For example, in at least one example of the array substrate, the first switching element comprises a first source-drain layer, and the first source-drain layer comprises two first source-drain electrode which are opposite to each other and spaced apart; the second switching element comprises a second source-drain layer, and the second source-drain layer comprises two second source-drain electrodes which are opposite to each other and spaced apart; the first connection portion is directly and electrically connected to the first pixel electrode, and the first connection portion is electrically connected to one of the two first source-drain electrodes via a first via-hole; and the second connection portion is directly and electrically connected to the second pixel electrode, and the second connection portion is electrically connected to one of the two second source-drain electrodes via a second via-hole.

For example, in at least one example of the array substrate, the one of the two first source-drain electrodes covers part of an opening area of the first via-hole, and other part of the opening area of the first via-hole is on a side of the one of the first source-drain electrodes closer to the first pixel electrode; and the one of the two second source-drain electrodes covers part of an opening area of the second via-hole, and other part of the opening area of the second via-hole is on a side of the one of the second source-drain electrodes closer to the first pixel electrode.

For example, in at least one example of the array substrate, the array substrate further comprises a first gate line and a second gate line which are respectively extending in the first direction; the first gate line and the second gate line are on two sides of the pixel unit group in a second direction intersecting with the first direction; and an orthographic projection of the first gate line on the first source-drain layer overlaps with the one of the two first source-drain electrodes in at least two separate positions.

For example, in at least one example of the array substrate, the first gate line comprises a first gate portion, a first line portion, and a first line connection portion connected in sequence; the first gate portion is configured as a gate electrode of the first switching element; the orthographic projection of the first gate line on the first source-drain layer at least partially overlaps with two sides of the one of the two first source-drain electrodes in the first direction.

For example, in at least one example of the array substrate, an orthographic projection of the first line connection portion of the first gate line on the one of the two first source-drain electrodes at least partially overlaps with the one of the two first source-drain electrodes.

For example, in at least one example of the array substrate, the first line connection portion comprises a first protrusion protruding toward the first gate portion; and an orthographic projection of the first protrusion on the one of the two first source-drain electrodes at least partially overlaps with the one of the two first source-drain electrodes.

For example, in at least one example of the array substrate, an overlapping area between the orthographic projection of the first protrusion on the one of the two first source-drain electrodes and the one of the two first source-drain electrodes is a first overlapping area, and the first overlapping area has a first overlapping edge extending in the second direction intersecting with the first direction; an overlapping area between an orthographic projection of the first gate portion on the one of the two first source-drain electrodes and the one of the two first source-drain electrodes is a second overlapping area, and the second overlapping area has a second overlapping edge extending in the second direction; the first overlapping edge has a length equal to a length of the second overlapping edge.

For example, in at least one example of the array substrate, an orthographic projection of the second gate line on the second source-drain layer overlaps with the one of the two second source-drain electrodes in at least two separate positions.

For example, in at least one example of the array substrate, the second gate line comprises a second gate portion, a second line portion, and a second line connection portion connected in sequence; the second gate portion is configured as a gate electrode of the second switching element; the orthographic projection of the second gate line on the second source-drain layer at least partially overlaps with two sides of the one of the two second source-drain electrodes in the first direction.

For example, in at least one example of the array substrate, an orthographic projection of the second line connection portion of the second gate line on the one of the two second source-drain electrodes at least partially overlaps with the one of the two second source-drain electrodes.

For example, in at least one example of the array substrate, the second line connection portion comprises a second protrusion protruding toward the second gate portion, and an orthographic projection of the second protrusion on the one of the two second source-drain electrodes at least partially overlaps with the one of the two second source-drain electrodes.

For example, in at least one example of the array substrate, an overlapping area between the orthographic projection of the second protrusion on the one of the two second source-drain electrodes and the one of the two second source-drain electrodes is a third overlapping area, and the third overlapping area has a third overlapping edge extending in the second direction; an overlapping area between an orthographic projection of the second gate portion on the one of the two second source-drain electrodes and the one of the two second source-drain electrodes is a fourth overlapping area, and the fourth overlapping area has a fourth overlapping edge extending in the second direction; and the third overlapping edge has a length equal to a length of the fourth overlapping edge.

For example, in at least one example of the array substrate, an area of an overlapping area between the orthographic projection of the first gate line on the first source-drain layer and the one of the two first source-drain electrodes is a first value; an area of an overlapping area between the orthographic projection of the second gate line on the second source-drain layer and one of the two second source-drain electrodes is a second value; and the first value is equal to the second value.

For example, in at least one example of the array substrate, the first connection portion and the second connection portion are respectively on two sides of the first pixel electrode in the second direction perpendicular to the first direction; the first connection portion and the second connection portion are both between the first gate line and the second gate line in the second direction; and the first gate line and the second gate line are arranged symmetrically with respect to a center line, which extends along the first direction, of the pixel unit group in the second direction.

For example, in at least one example of the array substrate, the array substrate comprises a plurality of pixel unit groups arranged in an array; a first gate line for driving each pixel unit group and a second gate line for driving a pixel unit group that is adjacent to the each pixel unit group in the second direction partially overlap in the first direction.

For example, in at least one example of the array substrate, the array substrate comprises a plurality of pixel unit groups arranged in an array and a data line which is between adjacent pixel unit groups; and a first switching element and a second switching element of the each pixel unit group are connected to a same data line.

For example, in at least one example of the array substrate, the array substrate further comprises a plurality of common electrode patterns arranged in an array; the plurality of common electrode patterns are in one-to-one correspondence with the plurality of pixel unit groups; common electrode patterns in a same row are between a first gate line and a second gate line which are for driving pixel unit groups corresponding to the common electrode patterns in the same row; common electrode patterns adjacent in the first direction are electrically connected to each other through a first common electrode connection portion, and the first common electrode connection portion is in a layer same as the common electrode patterns; and common electrode patterns adjacent in the second direction are electrically connected to each other through a second common electrode connection portion, and the second common electrode connection portion is in a layer same as the first connection portion, and the second common electrode connection portion and a corresponding common electrode pattern are electrically connected through a third via-hole.

For example, in at least one example of the array substrate, each of the common electrode patterns comprises a body portion and a first protrusion extending from a first side of the body portion; the first protrusion extends in the second direction; the common electrode patterns adjacent in the second direction are electrically connected to each other through the third via-hole and first protrusions of the common electrode patterns adjacent in the second direction.

For example, in at least one example of the array substrate, a lateral distance between the first pixel electrode and a gate line for driving the first pixel is larger than five microns; and a lateral distance between the second pixel electrode and a gate line for driving the second pixel is larger than five microns.

For example, in at least one example of the array substrate, an extension length of the first connection portion is smaller than an extension length of the second connection portion; the second pixel electrode has a recessed portion on a side closer to a gate line for driving the second pixel.

For example, in at least one example of the array substrate, the first pixel electrode and a gate line for driving the first pixel overlap with each other in a second direction intersecting with the first direction, and the second pixel electrode and a gate line for driving the second pixel overlap with each other in the second direction intersecting with the first direction; and an effective overlapping length between the gate line for driving the first pixel and a combined structure of the first pixel electrode and the first connection portion is equal to an effective overlapping length between the gate line for driving the second pixel and a combined structure of the second pixel electrode and the second connection portion.

At least one embodiment of the present disclosure further provides a display panel, which comprises any array substrate provided by the embodiment of the present disclosure.

At least one embodiment of the present disclosure further provides a display device which comprises any array substrate provided by the embodiment of the present disclosure or any display panel provided by the embodiment of the present disclosure.

At least one embodiment of the present disclosure further provides a method for manufacturing an array substrate, which comprises: forming a pixel unit group. The pixel unit group comprises a first pixel and a second pixel arranged side by side in a first direction; the first pixel comprises a first pixel electrode, a first switching element, and a first connection portion extending and protruding from the first pixel electrode; the second pixel comprises a second pixel electrode, a second switching element, and a second connection portion extending and protruding from the second pixel electrode; the first pixel electrode and the first switching element are electrically connected to each other via the first connection portion; the second pixel electrode and the second switching element are electrically connected to each other via the second connection portion; and a length of the first connection portion is not equal to a length of the second connection portion.

For example, in at least one example of the method, forming the pixel unit group includes: patterning a same film layer through a same patterning process to form the first connection portion, the first pixel electrode, the second connection portion, and the second pixel electrode.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details, and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount, or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Inventors of the present disclosure have discovered in their research that some display panels that adopt a dual-gate design have shaking stripe (headshaking stripe) defects and/or low aperture ratios, especially for TN (Twist Nematic) display panels. The following is an exemplary description of the problem of low aperture ratio of a display panel adopting a dual-gate scheme with reference to FIG. 1.

Figure 1:
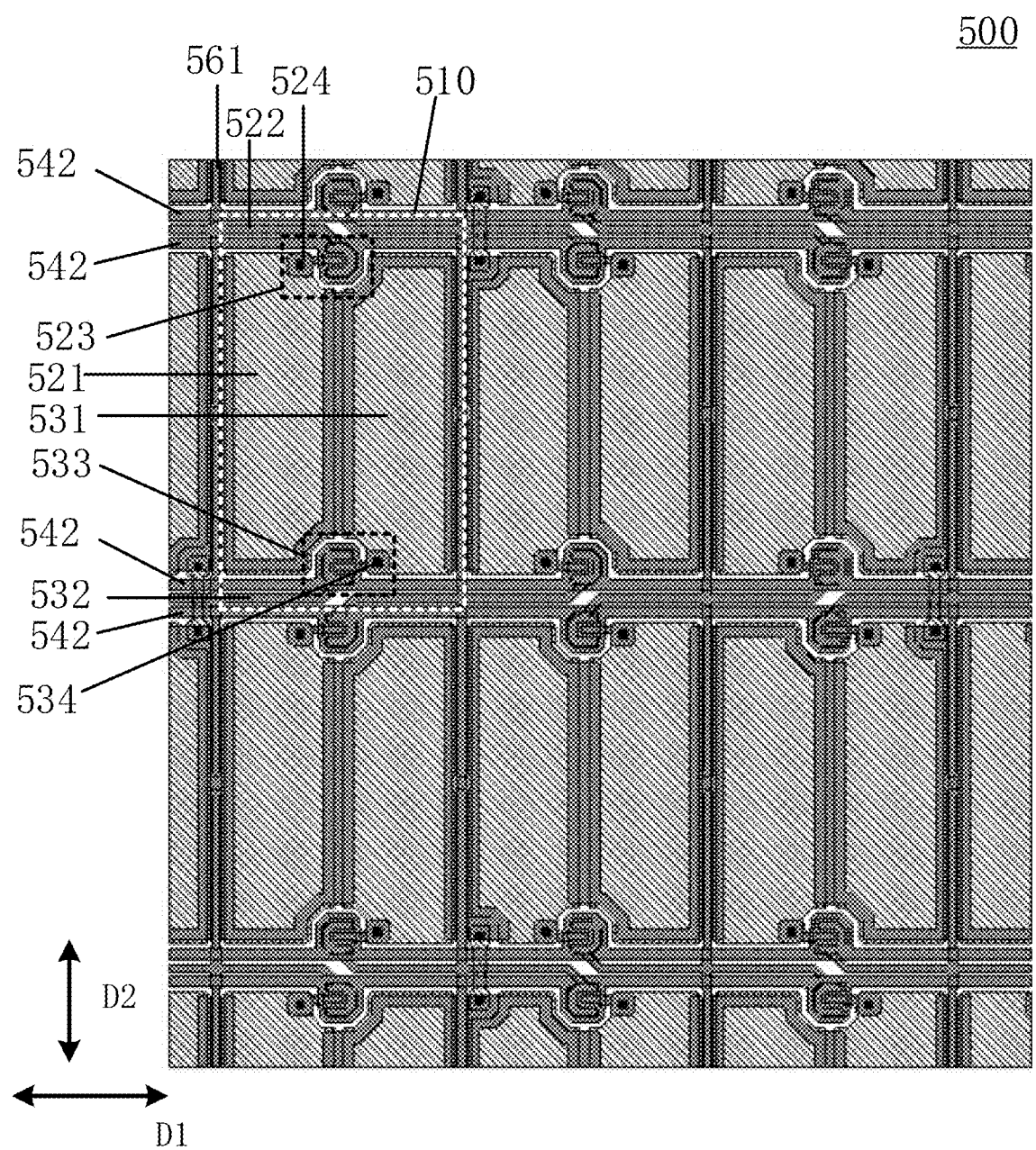
FIG. 1 is a schematic plan view of an array substrate.

FIG. 1 is a schematic plan view of an array substrate 500. As illustrated in FIG. 1, the array substrate 500 includes a plurality of pixel unit groups 510 arranged in an array, gate lines 542 extending along a first direction D1, and data lines 561 extending along a second direction D2 intersecting with (e.g., perpendicular to) the first direction D1. One data line 561 is disposed between two pixel unit groups 510 that are adjacent in the first direction D1, and two gate lines 542 are disposed between two pixel unit groups 510 that are adjacent in the second direction D2. Each row of pixel unit groups 510 are driven by the two gate lines 542 on the two sides of the each row of the pixel unit groups 510 (that is, one gate line 542 on the upper side of the each row of pixel unit groups 510 and one gate line 542 on the lower side of the each row of pixel unit groups 510).

As illustrated in FIG. 1, each pixel unit group 510 includes a first pixel and a second pixel which are arranged side by side (arranged in parallel) and are immediately adjacent to each other in the first direction D1. The first pixel includes a first pixel electrode 521, a first switching element 523, and a first wire 522. The first wire 522 is used for connecting the first switching element 523 and the data line 561 for driving the first pixel. The second pixel includes a second pixel electrode 531, a second switching element 533 and a second wire 532. The second wire 532 is used for connecting the second switching element 533 and the data line 561 for driving the second pixel.

As illustrated in FIG. 1, the first pixel electrode 521 and the first switching element 523 are electrically connected through a first via-hole 524, and the second pixel electrode 531 and the second switching element 533 are electrically connected through a second via-hole 534. An orthographic projection of the first via-hole 524 on the first pixel electrode 521 at least partially overlaps with the first pixel electrode 521; and an orthographic projection of the second via-hole 534 on the second pixel electrode 531 at least partially overlaps with the second pixel electrode 531.

As illustrated in FIG. 1, the first switching element 523 and the second switching element 533 for driving the same pixel unit group 510 are arranged side by side in the second direction D2, and the first switching element 523 and the second switching element 533 at least partially overlap with each other in the second direction D2, that is, the orthographic projections of the first switching element 523 and the second switching element 533 on a plane perpendicular to the second direction D2 at least partially overlap with each other. The first wire 522 and the second wire 532 are disposed between two gate lines 542 which are between two pixel unit groups 510 that are adjacent in the second direction D2.

For example, a display panel including the array substrate 500 includes a black matrix (not shown), and an orthographic projection of the black matrix on the array substrate 500 covers the gate lines 542, the data lines 561, the first wires 522, the second wires 532, the first switching elements 523, the second switching elements 533, the first via-holes 524 and the second via-holes 534. For example, the first wires 522, the second wires 532, and the data lines 561 are made of the same material.

The inventors of the present disclosure have discovered in the research that the aperture ratio of the display panel including the array substrate as illustrated in FIG. 1 is low. Also, although the aperture ratio of the display panel including the array substrate as illustrated in FIG. 1 can be slightly increased by reducing the widths of the first and second wires in the second direction, reducing of the widths of the first and second wires in the second direction can increase the risks of disconnection of the first wires and disconnection of the second wires. In addition, signals on the first and second wires can interfere with signals on other wires of the array substrate.

At least one embodiment of the present disclosure provides an array substrate, a display panel, a display device, and a manufacturing method for an array substrate. The array substrate includes a pixel unit group. The pixel unit group includes a first pixel and a second pixel arranged side by side and immediately adjacent to each other in a first direction; the first pixel includes a first pixel electrode, a first switching element, and a first connection portion extending and protruding from the first pixel electrode, the second pixel includes a second pixel electrode, a second switching element, and a second connection portion extending and protruding from the second pixel electrode; the first pixel electrode and the first switching element are electrically connected to each other via the first connection portion, the second pixel electrode and the second switching elements are electrically connected to each other via the second connection portion; and an extension length of the first connection portion is not equal to an extension length of the second connection portion.

In some examples, by making the extension length of the first connection portion not equal to the extension length of the second connection portion (that is, making the array substrate have long connection pixels and short connection pixels), the array substrate as well as the display panel and the display device including the array substrate, has the capability to increase the aperture ratio or the basis for increasing the aperture ratio.

In some examples, because a lateral capacitance of the long connection pixel and related capacitance of the short connection pixel are not equal, in this case, the array substrate having the capability to increase the aperture ratio or the basis to increase the aperture ratio can have a display unevenness phenomenon (e.g., shaking stripe phenomenon, shaking stripe defect). The shaking stripe is a kind of bright and dark alternating stripes that can only be observed when a user of a display panel is shaking his head. The shaking stripes are related to different jump change values ΔVp of pixel voltages for different pixels, and a factor that affects a jump change value ΔVp of pixel voltage of a pixel includes: a lateral capacitance of the pixel, which includes a capacitance Cgs formed by a gate line and a source-drain layer, a capacitance Cpg formed by a pixel electrode and a gate line corresponding to the pixel electrode, and a capacitance Cpg' formed by a pixel electrode and a gate line adjacent to the pixel electrode (but not used to drive the pixel where the pixel electrode is located). For example, when the capacitance Cgs of the long connection pixel is more approximate to the capacitance Cgs of the short connection pixel and/or the capacitance Cpg of the long connection pixel is more approximate to the capacitance Cpg of the short connection pixel, the long connection pixel has the jump change value ΔVp of pixel voltage more approximate to the jump change value ΔVp of pixel voltage of the short connection pixel, and thus the shaking stripe phenomenon can be alleviated. It should be noted that for the sake of clarity, the definition, causes, related factors, and experimental methods for observing and studying shaking stripes will be described in detail later, which will not be elaborated here.

In some examples, by making a portion of a gate line (the first gate line and the second gate line) corresponding to each pixel (the first pixel and the second pixel) have an orthographic projection on the source-drain layer overlapping with one of two source-drain electrodes of the pixel in at least two separated positions, it is possible to reduce a variation range (a range deviating from the design value) of the capacitance Cgs formed by the gate line and the source-drain layer, and thus it can mitigate the display unevenness phenomenon (e.g., shaking stripe phenomenon, shaking stripe defect).

In some examples, by making an overlapping area between an orthographic projection of the first gate line on the source-drain layer and one of two first source-drain electrodes equal to an overlapping area between an orthographic projection of the second gate line on the source-drain layer and one of two second source-drain electrodes, it is possible to make the capacitance Cgs of the long connection pixel equal to the capacitance Cgs of the short connection pixel, and thus it can further mitigate, for example, shaking stripe phenomenon, shaking stripe defect.

In some examples, by making a lateral distance between the first pixel electrode and the gate line driving the first pixel larger than five microns, it is possible to reduce the influence of the following factors on the capacitance Cpg of the first pixel: a variation (e.g., a variation due to manufacturing processes) of the lateral distance between the first pixel electrode and the gate line for driving the first pixel; variation in the effective overlapping length between the gate line for driving the first pixel and the combined structure of the first pixel electrode and the first connection portion. By making a lateral distance between the second pixel electrode and the gate line driving the second pixel larger than five microns, it is possible to reduce the influence of the following factors on the capacitance Cpg of the second pixel: a variation of the lateral distance between the second pixel electrode and the gate line for driving the second pixel; variation in the effective overlapping length between the gate line for driving the second pixel and the combined structure of the second pixel electrode with the second connection portion. Therefore, the requirement for the manufacturing process can be reduced without degrading the display evenness.

In some examples, by making the side, which is closer to the gate line for driving the long connection pixel, of the pixel electrode of the long connection pixel have a recessed portion, it is possible to shorten the effective overlapping length lpg between the gate line and the combined structure of the pixel electrode and the connection portion of the long connection pixel. In this case, the effective overlapping length between a gate line and the combined structure of the pixel electrode and the connection portion of the long connection pixel can be more approximate to the effective overlapping length between a gate line and the combined structure of the pixel electrode and the connection portion of the short connection pixel, and thus the capacitance Cpg of long connection pixel can be more approximate to the capacitance Cpg of the short connection pixel, thereby further mitigating the shaking stripe defect.

Non-limitative descriptions are given to the array substrate provided by at least an embodiment of the present disclosure in the following with reference to a plurality of examples or embodiments. As described in the following, in case of no conflict, different features in these specific examples or embodiments may be combined so as to obtain new examples or embodiments, and the new examples or embodiments are also fall within the scope of present disclosure.

Figure 2A:
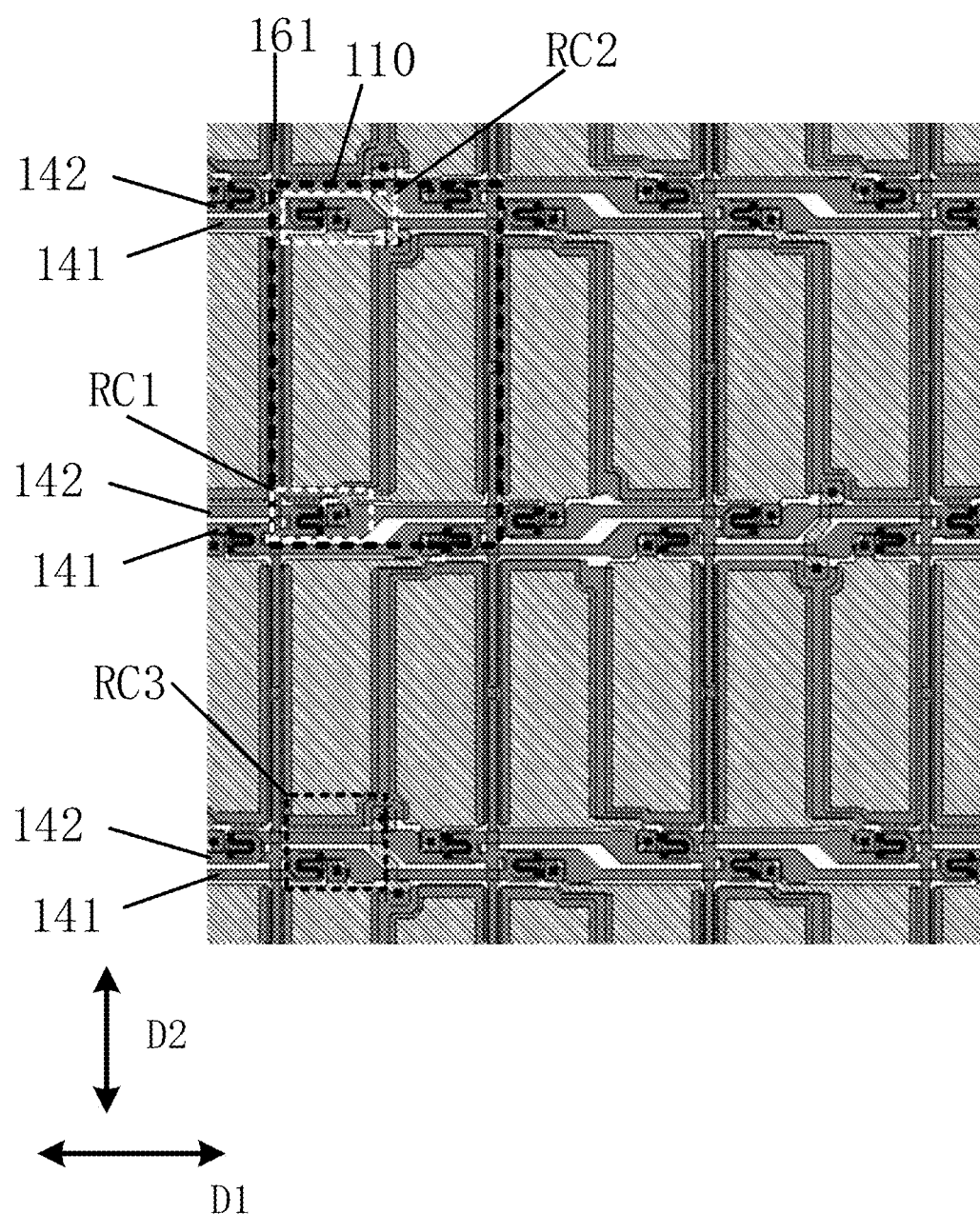
FIG. 2A is a schematic plan view of an array substrate provided by at least one embodiment of the present disclosure.

FIG. 2A is a schematic plan view of an array substrate 100 provided by at least one embodiment of the present disclosure. As illustrated in FIG. 2A, the array substrate 100 includes a plurality of pixel unit groups 110 arranged in an array, a plurality of first gate lines 141, a plurality of second gate lines 142 and a plurality of data lines 161. The plurality of first gate lines 141 and the plurality of second gate lines 142 extend substantially along the first direction D1, respectively, and the plurality of data lines 161 extend substantially along the second direction D2 intersecting with (e.g., perpendicular to) the first direction D1.

Each row of pixel unit groups 110 are driven by two gate lines, and the two gate lines (one first gate line 141 and one second gate line 142) are located on the two sides of the each row of pixel unit groups 110 in the second direction D2 and immediately adjacent to the each row of pixel unit groups 110. Here, the gate line being immediately adjacent to a pixel unit group 110 refers to that no other gate line is disposed between the above pixel unit group 110 and the above gate line. Two gate lines are disposed between two pixel unit groups 110 that are adjacent in the second direction D2, and one data line is disposed between two pixel unit groups 110 that are adjacent in the first direction D1.

For the sake of clarity, the following description is made to one of the plurality of pixel unit groups 110 as an example.

Figure 2B:
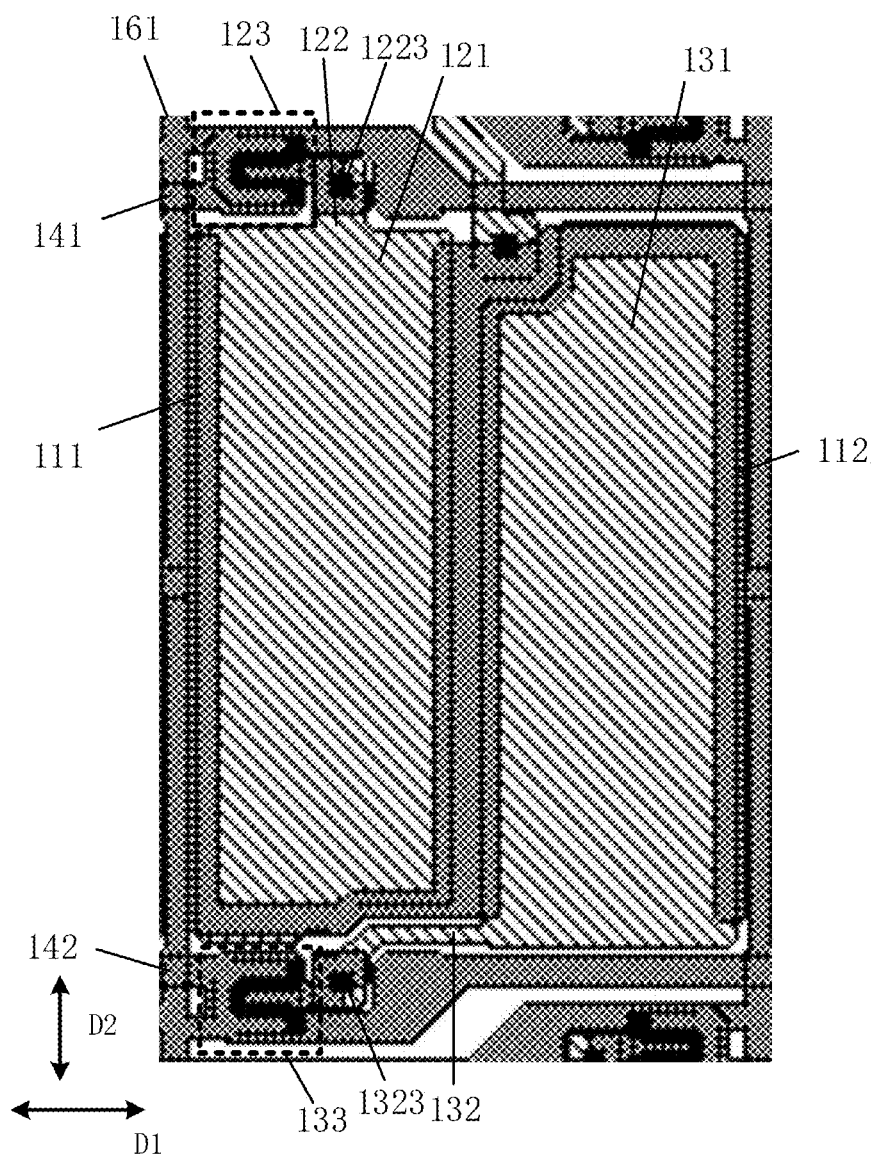
FIG. 2B is a schematic plan view of a pixel unit group of an array substrate as illustrated in FIG. 2A.

FIG. 2B is a schematic plan view of a pixel unit group 110 of the array substrate 100 as illustrated in FIG. 2A. For convenience of description, FIG. 2B also illustrates the first gate line 141, the second gate line 142, and the data line 161. Part or all of the pixel unit groups 110 of the array substrate 100 as illustrated in FIG. 2A can be implemented as the pixel unit group 110 illustrated in FIG. 2B.

As illustrated in FIG. 2B, the pixel unit group 110 includes a first pixel and a second pixel that are arranged side by side and immediately adjacent to each other in the first direction D1. It should be noted that the first pixel and the second pixel being arranged side by side and immediately adjacent to each other refers to that no other pixel is provided between the above first pixel and the above second pixel.

As illustrated in FIG. 2B, the first pixel includes a first pixel electrode 121, a first switching element 123, and a first connection portion 122 extending and protruding from the first pixel electrode 121, and the second pixel includes a second pixel electrode 131, a second switching element 133 and a second connection portion 132 extending and protruding from the second pixel electrode 131. The first pixel electrode 121 and the first switching element 123 are electrically connected to each other via the first connection portion 122, and the second pixel electrode 131 and the second switching element 133 are electrically connected to each other via the second connection portion 132. The extension length of the first connection portion 122 is not equal to (e.g., smaller than) the extension length of the second connection portion 132.

For example, when the extension length of the first connection portion 122 is smaller than the extension length of the second connection portion 132, the first pixel can also be referred to as a short connection pixel, and the second pixel can also be referred to as a long connection pixel. For example, the pixel, which has a connection portion of a smaller extension length, of each pixel unit group is referred to as a short connection pixel, and the pixel included in each pixel unit group which has a connection portion of a larger extension length is referred to as a long connection pixel. In some examples, all short connection pixels of the array substrate are referred to as first pixels, and all long connection pixels of the array substrate are referred to as second pixels.

For example, by making the extension length of the first connection portion 122 be not equal to (e.g., smaller than) the extension length of the second connection portion 132, it is possible to provide both of the first switching element 123 and the second switching element 133 on an edge of the pixel unit group 110 in the first direction D1. The following is an exemplary description with reference to FIG. 2B.

For example, as illustrated in FIG. 2B, the pixel unit group 110 includes a first edge 111 and a second edge 112 which are opposite to each other in the first direction D1, and both of the first switching element 123 and the second switching element 133 are closer to the first edge 111 of the pixel unit group 110 than to the second edge 112.

For example, as illustrated in FIG. 2B, the first switching element 123 and the second switching element 133 of each pixel unit group 110 are connected to the same data line 161. For example, the distance between the first switching element 123 of each pixel unit group 110 and the same data line 161 is the same as the distance between the second switching element 133 of each pixel unit group 110 and the same data line 161. In this case, a connection line between the first switching element 123 of each pixel unit group 110 and the data line 161 for driving the pixel unit group 110 can have a length (the length in the first direction D1) equal to a length (the length in the first direction D1) of a connection line between the second switching element 133 of each pixel unit group 110 and the data line 161 for driving the pixel unit group 110.

For example, as illustrated in FIG. 2A, the switching elements connected to the same data line 161 include a switching element disposed on the first side (e.g., the left side) of the same data line 161 and a switching element disposed on the second side (e.g., the right side) of the same data line 161, and the switching element on the first side (e.g., the left side) of the same data line 161 and the switching element on the second side (e.g., the right side) of the same data line 161 partially overlap in the first direction D1.

For example, in at least some embodiments of the present disclosure, a structure A and a structure B overlap (or partially overlap) in a direction C refers to that an orthographical projection of the structure A on a plane D perpendicular to the direction C overlaps (or partially overlaps) with an orthographical projection of the structure B on the plane D.

For example, by making the switching element on the first side (e.g., left side) of the same data line 161 and the switching element on the second side (e.g., right side) of the same data line 161 partially overlap in the first direction D1, it is possible to reduce the size of the area occupied by the switching elements (the first switching element 123 and the second switching element 133) in the second direction D2, and thus it can reduce the size, in the second direction D2, of the black matrix for shielding the switching elements, and can increase the aperture ratio of the array substrate 100 and the aperture ratio of the display panel and display device including the array substrate 100.

For example, as illustrated in FIG. 2B, the first connection portion 122 and the second connection portion 132 of the pixel unit group 110 are respectively disposed on two sides of the first pixel electrode 121 in the second direction D2. The first connection portion 122 and the second connection portion 132 are both disposed between the first gate line 141 and the second gate line 142 in the second direction D2.

For example, as illustrated in FIG. 2B, the first connection portion 122 extends and protrudes in the second direction D2, and the second connection portion 132 extends and protrudes in the first direction D1. In an example, the extension length of the first connection portion 122 refers to the length of the first connection portion 122 in the second direction D2; the extension length of the second connection portion 132 refers to the length of the second connection portion 132 in the first direction D1 That is, the extension length of the connection portion refers to the length of the connection portion in the extending direction of the connection portion. In another example, the extension length of the connection portion can also be the overall length or physical length of the connection portion.

For example, in the second direction D2, the second connection portion 132 at least partially overlaps with the first pixel electrode 121. In the second direction D2, the first pixel electrode 121 is disposed between the first switching element 123 and the second switching element 133.

For example, the first connection portion 122 and the first pixel electrode 121 are integrally formed by a same material, and the second connection portion 132 and the second pixel electrode 131 are integrally formed by a same material.

Figure 6:
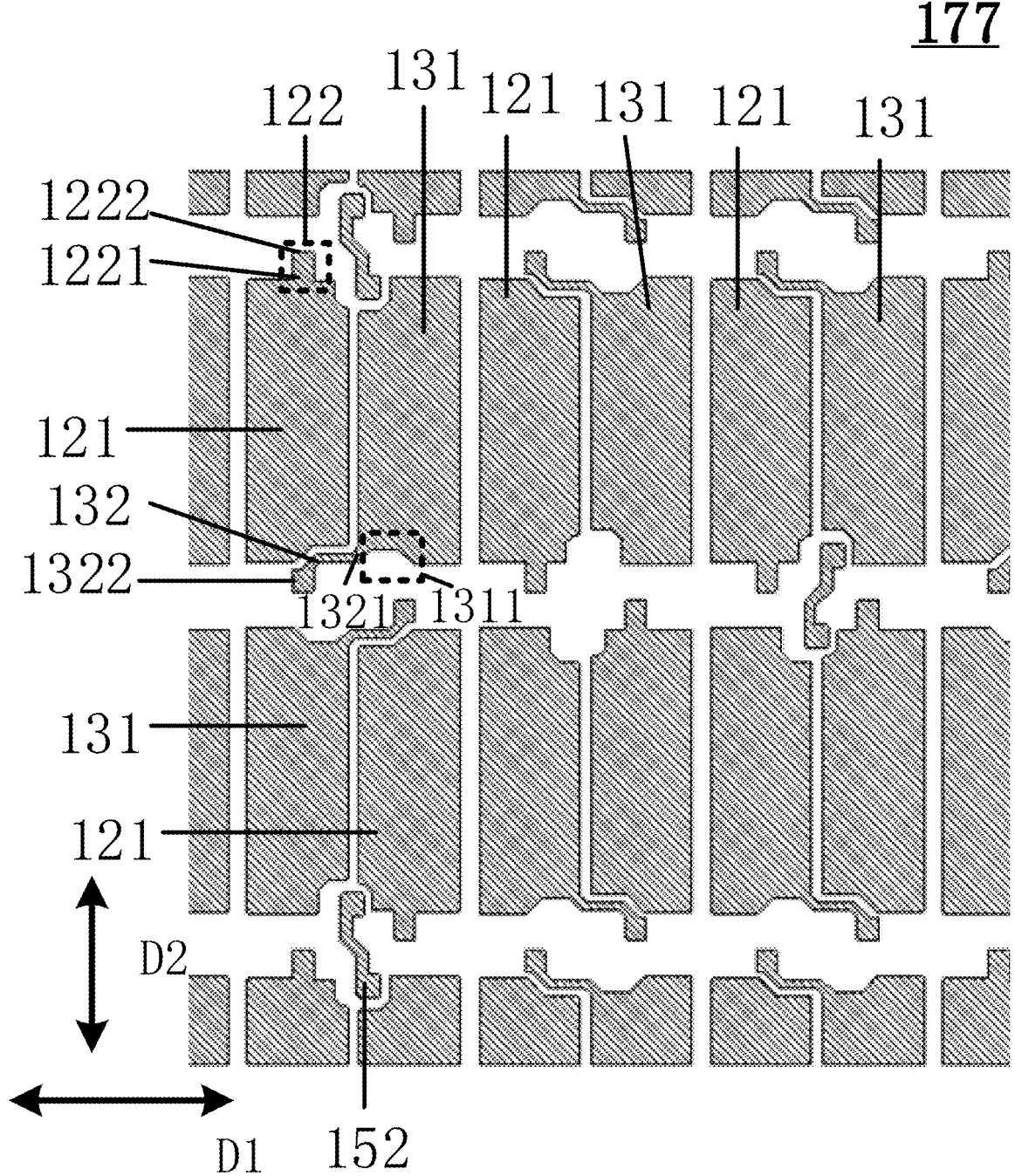
FIG. 6 is a schematic plan view illustrating a third electrode layer of the array substrate as illustrated in FIG. 4A.

For example, as illustrated in FIG. 2B, by making the first switching element 123 and the second switching element 133 both closer to the same edge of the pixel unit group 110 (e.g., the first edge 111) in the first direction D1, forming the first connection portion 122 integrally with the first pixel electrode 121 by a same material, and forming the second connection portion 132 integrally with the second pixel electrode 131 by a same material, it is possible to make the first connection portion 122 (the first end 1221 of the first connection portion 122, see also FIG. 6 below) be electrically connected to the first pixel electrode 121 directly, and make the second connection portion 132 (the first end 1321 of the second connection portion 132, see also FIG. 6 below) be electrically connected to the second pixel electrodes 131 directly. Therefore, as compared to the array substrate as illustrated in FIG. 1, it is possible to eliminate the need to provide via-holes in the areas closer to the first pixel electrode 121 and the second pixel electrode 131, thereby increasing the sizes of display area of the first pixel and the display area of the second pixel. In addition, although the first connection portion 122 (the second end 1222 of the first connection portion 122) is electrically connected to the first switching element 123 through the first via-hole 1223, the second connection portion 132 (the second end 1322 of the second connection portion 132) is electrically connected to the second switching element 133 through the second via-hole 1323, because the first via-hole 1223 is closer to the first switching element 123, the second via-hole 1323 is closer to the second switching elements 133, and the areas that are closer to the first switching element 123 and the second switching element 133 are correspond to the area shielded by the black matrix, and therefore, the first via-hole 1223 and the second via-hole 1323 as illustrated in FIG. 2B do not reduce the aperture ratio of the pixel unit group 110 and the aperture ratio of the array substrate 100.

For example, both the first pixel electrode 121 and the second pixel electrode 131 may be made of a transparent conductive material. For example, the transparent conductive material is indium tin oxide (ITO) or indium zinc oxide (IZO). When the first connection portion 122 and the first pixel electrode 121 are integrally made of a same material, and the second connection portion 132 and the second pixel electrode 131 are integrally made of a same material, the first connection portion 122 and the second connection portion 132 may also be made of a transparent conductive material (e.g., ITO). For example, the processing accuracy of transparent conductive materials (e.g., ITO) is higher than the processing accuracy of metal materials, that is, the width of a wire of a transparent conductive material can be smaller than the width of a wire of a metal material. In this case, the size of the areas occupied by the first connection portion 122 and the second connection portion 132 can be reduced, and the size of the areas occupied by the first pixel electrode 121 and the second pixel electrode 131 can be correspondingly increased, thereby further increasing the aperture ratio of the pixel unit group 110 and aperture ratio of the array substrate 100.

For example, as illustrated in FIGS. 2A and 2B, both the first switching element 123 and the second switching element 133 are U-shaped TFTs. For example, as illustrated in FIG. 2A, the opening directions of the U-shaped TFTs in the pixel unit groups in adjacent rows are opposite. For example, as illustrated in FIG. 2A, the opening direction of the U-type TFTs of the pixel unit groups in the first row (odd-numbered row) is to the right, and the opening direction of the U-type TFTs in the pixel unit groups in the second row (even-numbered row) is to the left. Correspondingly, the U-type TFTs of the pixel unit groups in the first row (odd-numbered row) are disposed on the right side of a data line, and the U-type TFTs of the pixel unit groups in the second row (even-numbered row) are disposed on the left side of a data line.

The inventors of the present disclosure have discovered in their research that although it is possible to increase the aperture ratio of the array substrate by making the pixel unit group of the array substrate as illustrated in FIG. 2A include long connection pixels and short connection pixels, it can also lead to a phenomenon of uneven brightness of the array substrate (e.g., shaking stripe phenomenon, shaking stripe defect) as illustrated in FIG. 2A. The issues related to the shaking stripe defect will be described in detail below with reference to FIGS. 2C-2H.

Figure 2C:
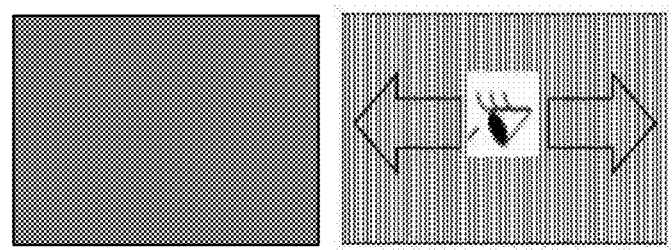
FIG. 2C is a schematic diagram of images observed by a user of a display panel when shaking his head and when not shaking his head.

The shaking stripes are a kind of bright and dark alternating stripes that can only be observed when a user of a display panel is shaking his head. The left image of FIG. 2C is an image observed when the user of the display panel is not shaking his head, and the right image of FIG. 2C is an image observed when the user of the display panel is shaking his head (that is, an image with shaking stripes). Here, the display panel is configured to display an image with a gray scale of 127 (that is, the gray scale of each pixel of the image is 127).

Figure 2D:
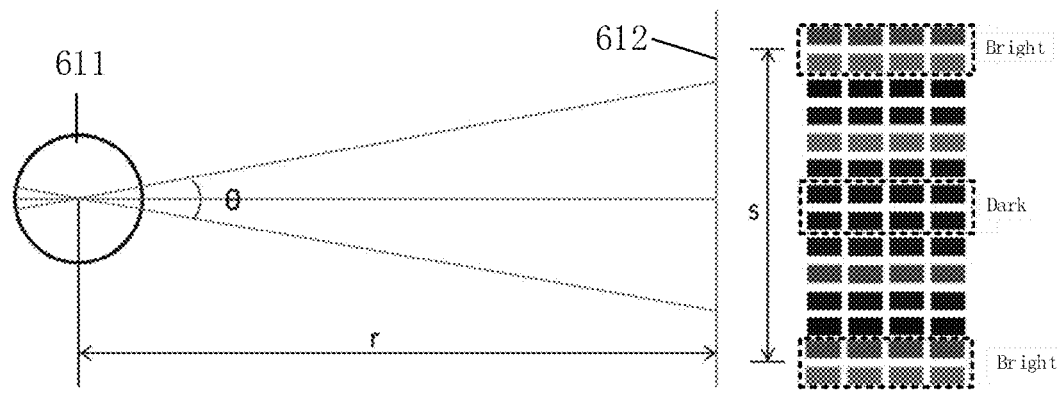
FIG. 2D is a schematic diagram of an exemplary calculation method of a spatial frequency.

As illustrated in the right image of FIG. 2C, the bright and dark stripes of the shaking stripe respectively extend in the column direction of the display panel, and the bright and dark stripes of the shaking stripes are alternately arranged in the row direction of the display panel. For example, the shaking stripes can be described with a spatial frequency fs. The following is an exemplary description with reference to FIG. 2D. FIG. 2D illustrates a schematic diagram of an exemplary calculation method of a spatial frequency.

As illustrated in FIG. 2D, the spatial frequency fs refers to the number of the grid cycles of the brightness and darkness, that is sinusoidal modulated, of the image (or stimulus pattern) per degree of viewing angle, or the number of cycles of the image bright and dark distribution per degree of viewing angle. The unit of the spatial frequency fs is cycles/degree, and the spatial frequency fs can be expressed by formula (1), and the optimal observation distance of the shaking stripe phenomenon can be expressed by formula (2).

$$fs = \frac{r \times d\theta}{s} \qquad \text{Formula (1)}$$

$$r = \frac{180 \times fs \times 1 \times n}{\pi} \qquad \text{Formula (2)}$$

Here, r is an observation distance, that is, a distance from the user's eye 611 to the display panel 612; 1 is a width (width in the row direction) of the sub-pixel of the display panel; n is the number of (the amount of) pixels in a bright and dark cycle, θ is a viewing angle, and dθ is a viewing angle per degree.

Figure 2E:
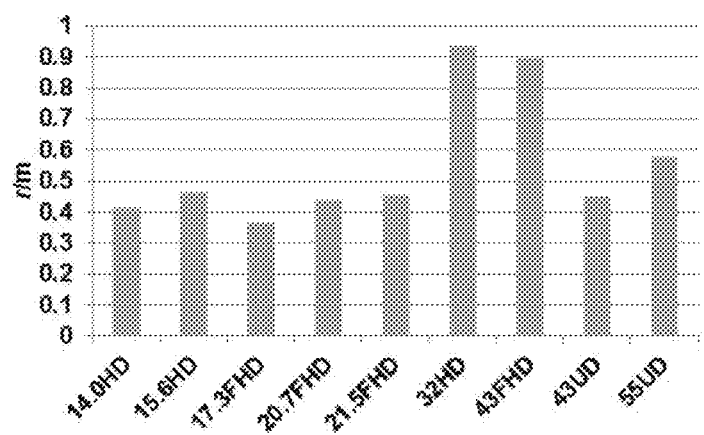
FIG. 2E is a schematic diagram of an optimal observation distance for shaking stripes of display panels of different types.

Studies have shown that for shaking stripes of different spatial frequencies and different brightness, the human eye is most sensitive to a spatial frequency of 8 cycles/degree. Therefore, for a shaking stripes of the display panel with preset relevant parameters, there is an optimal observation distance. FIG. 2E illustrates the optimal observation distance of the shaking stripes of display panels of different types. As illustrated in FIG. 2E, the optimal observation distance of the shaking stripes of most display panels is between 0.2 meter and 0.5 meter. It should be noted that "r/m" as illustrated in FIG. 2E indicates that the ordinate in FIG. 2E represents the observation distance r, and the unit of the observation distance r is "meter"; and "HD", "FHD", and "UHD" respectively indicate "High Definition", "Full HD" and "Ultra High Definition".

Figure 2F:
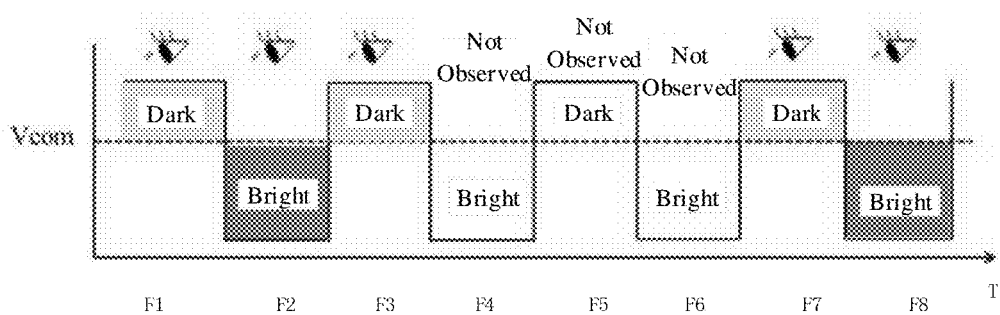
FIG. 2F is a schematic diagram illustrating reasons for causing a shaking stripe defect.

The following is an exemplary description of the reason for the occurrence of the shaking stripes with reference to FIG. 2F. FIG. 2F illustrates reasons for causing the occurrence of the shaking stripe defect. As illustrated in FIG. 2F, the display panel displays a first frame of image F1, a second frame of image F2, a third frame of image F3, a fourth frame of image F4, a fifth frame of image F5, a sixth frame of image F6, a seventh frame of image F7, and an eighth frame of image F8. Because the image seen by the human eye is an image obtained by superimposing and averaging a plurality of images adjacent in time, the user cannot observe the shaking stripe phenomenon while the user's head remains stationary. However, when the user's head moves (e.g., shaking his head), the user cannot observe part of the frames of images (e.g., the user does not observe the fourth frame of image F4—the sixth frame of image F6), and therefore, the user's eye cannot average the observed images well. In this case, the user can observe the shaking stripe phenomenon. For example, the user's eyes cannot eliminate the difference in brightness between different pixels in the display image of the same frame by averaging the third frame of image F3 and the seventh frame of image F7 he has observed.

As illustrated in FIG. 2F, when the first frame of image F1, the third frame of image F3, the fifth frame of image F5, and the seventh frame of image F7 are displayed, the first pixel voltage applied to the pixel electrode is larger than the common voltage Vcom. When the second frame of image F2, the fourth frame of image F4, the sixth frame of image F6, and the eighth frame of image F8 are displayed, the second pixel voltage applied to the pixel electrode is less than the common voltage Vcom, and the voltage difference between the first pixel voltage and the common voltage Vcom is smaller than the voltage difference between the common voltage Vcom and the second pixel voltage, that is, the brightness of the second frame of image F2, the fourth frame of image F4, the sixth frame of image F6, and the eighth frame of image F8 is larger than that of the first frame of image F1, the third frame of image F3, the fifth frame of image F5, and the seventh frame of image F7. For example, even by adjusting the common voltage Vcom illustrated in FIG. 2F and making the voltage difference between the first pixel voltage and the common voltage Vcom be equal to the voltage difference between the common voltage Vcom and the second pixel voltage, due to the unobserved fourth frame of image F4—sixth frame of image F6, the user's eyes cannot well average the third frame of image F3 and the seventh frame of image F7 observed, in this case, the user can still observe the shaking stripe phenomenon.

Figure 2G:
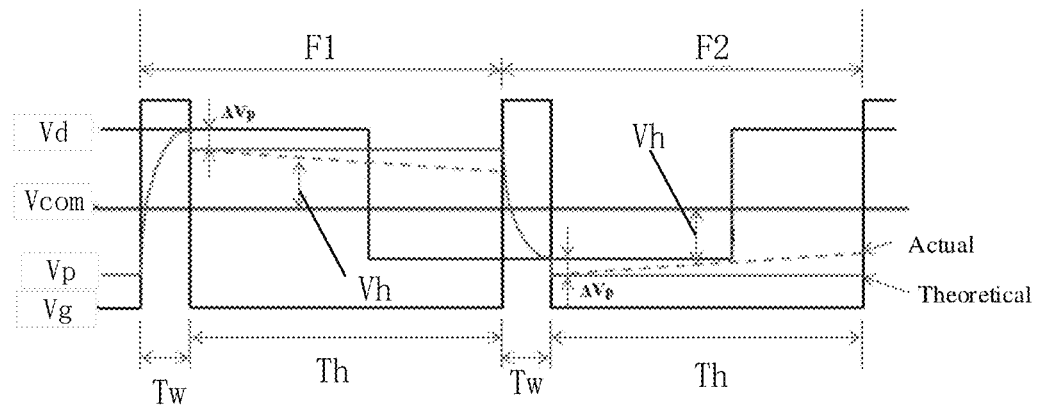
FIG. 2G is a schematic diagram illustrating charging and discharging of pixels of a display panel.

For example, the main factors that affect the brightness of the pixels in the positive and negative frames include the voltage on the common electrode (VCOM), the jump change value (ΔVp) of the pixel voltage, and the voltage holding rate (VHR). FIG. 2G is a schematic diagram illustrating charging and discharging pixels of the display panel. FIG. 2G illustrates profiles of a drain voltage Vd, a common voltage Vcom, a pixel voltage Vp, and a gate voltage Vg of a pixel of the display panel over time. As illustrated in FIG. 2G, each display cycle of a pixel may include a first display frame F1 and a second display frame F2 adjacent to each other. The second display frame F2 is, for example, an inverted display frame. In the second display frame F2, the polarity of the voltage on the pixel electrode of each pixel of the array substrate is opposite to that of the first display frame F1. The first display frame F1 and the second display frame F2 each include a voltage writing phase Tw and a voltage holding phase Th.

As illustrated in FIG. 2G, at the beginning of the voltage writing phase Tw, the absolute value of the difference between the drain voltage Vd and the common voltage Vcom changes, and ΔVp is the jump change value in the absolute value of the difference between the drain voltage Vd and the common voltage Vcom. ΔVp is also referred to as the jump change value of pixel voltage. As illustrated in FIG. 2G, in the voltage writing phase Tw, the absolute value of the difference between the drain voltage Vd and the common voltage Vcom gradually decreases, and Vh is the holding voltage.

For the same pixel, although it is theoretically possible to adjust the common voltage Vcom to make the brightness of the positive frame equal to the brightness of the negative frame, because the optimal values of the common voltage Vcom of the plurality of pixels included in the display panel are different, in practice, it is difficult to use the method of adjusting the common voltage Vcom to completely eliminate the brightness difference of adjacent display frames.

Figure 2H:
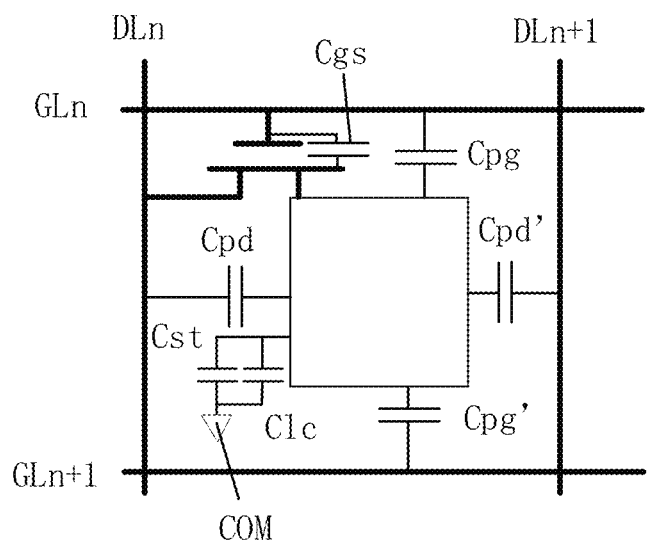
FIG. 2H is a schematic diagram of capacitances related to pixels of a display panel.

As illustrated in FIG. 2G, the inventors of the present disclosure have discovered in their research that, without considering the voltage holding rate (VHR), the jump change value ΔVp of the pixel voltage significantly affects the brightness difference between adjacent display frames and the brightness evenness of the same display frame (e.g., the shaking stripe phenomenon), especially for the display panel of a dual-gate structure, this is because that the structure of adjacent sub-pixels of the display panel of the dual-gate structure can be different, exemplary description will be provided below with reference to FIG. 2H.

FIG. 2H illustrates a schematic diagram of capacitances related to pixels of the display panel. As illustrated in FIG. 2H, the capacitances related to pixels include a capacitance Cgs, a capacitance Cpg, a capacitance Cpg', a capacitance Cpd, a capacitance Cpd', a capacitance Cst, and a capacitance Clc. The jump change value ΔVp of the pixel voltage can be expressed by the following formula (3).

$$\Delta Vp = \frac{Cgs + Cpg + Cpg'}{Cst + Cgs + Cpg + Cpg' + Cpd + Cpd'} \times (Vgh - Vgl) \qquad \text{Formula (3)}$$

Here, the capacitance Cgs is a capacitance formed between one of the source electrode and the drain electrode of the switching element and the gate line (and/or gate electrode) for driving the switching element; the capacitance Cpg is a lateral capacitance formed between the pixel electrode and the gate line (and/or gate electrode) for driving the pixel where the pixel electrode is located; the capacitance Cpg' is a lateral capacitance formed between the pixel electrode and the gate line adjacent to the pixel electrode (not for driving the pixel where the pixel electrode is located); the capacitance Cpd is a lateral capacitance formed between the pixel electrode and the data line for driving the pixel where the pixel electrode is located; the capacitance Cpd' is a lateral capacitance formed between the pixel electrode and the data line adjacent to the pixel electrode (not for driving the pixel where the pixel electrode is located). The capacitance Cst and the capacitance Clc are storage capacitances of the pixel, COM is the common electrode; Vgh and Vgl respectively are the first level and the second level of the gate scanning signal received by the gate line. The voltage value at the first level is larger than the voltage value at the second level. GLn and GLn+1 are respectively the gate lines located in the n-th row and the (n+1)th row; DLn and DLn+1 are respectively the data lines located in the n-th column and the (n+1)th column.

The inventors of the present disclosure have discovered in their research that the shaking stripes are related to the difference in brightness of different sub-pixels of the same frame of image (the theoretical gray scale of different sub-pixels are the same), and the difference in brightness of different sub-pixels of the same frame of image is related to the jump change values ΔVp of the pixel voltages of the different sub-pixels.

The inventors of the present disclosure have discovered in their research that the array substrate as illustrated in FIG. 2A can have a problem of uneven brightness (e.g., the shaking stripe problem) due to at least one of the following reasons: (1) the source-drain metal layer of the array substrate is offset relative to the gate metal layer; (2) the capacitance Cpg of the long connection pixels of the array substrate is not equal to the capacitance Cpg of the short connection pixels of the array substrate; (3) the capacitance Cpg' of the long connection pixels of the array substrate is not equal to the capacitance Cpg' of the short connection pixels of the array substrate.

Figure 3A:
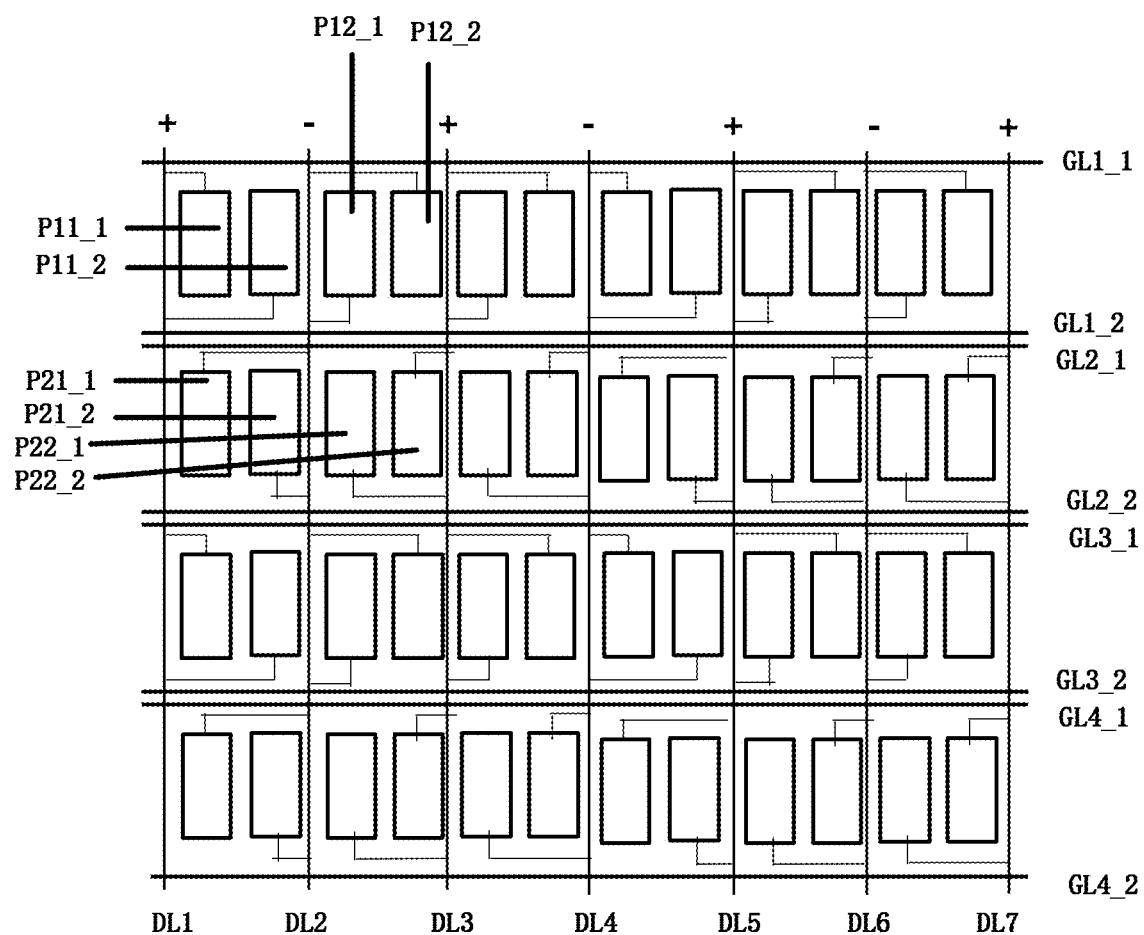
FIG. 3A is a schematic diagram of the array substrate as illustrated in FIG. 2A.
Figure 3B:
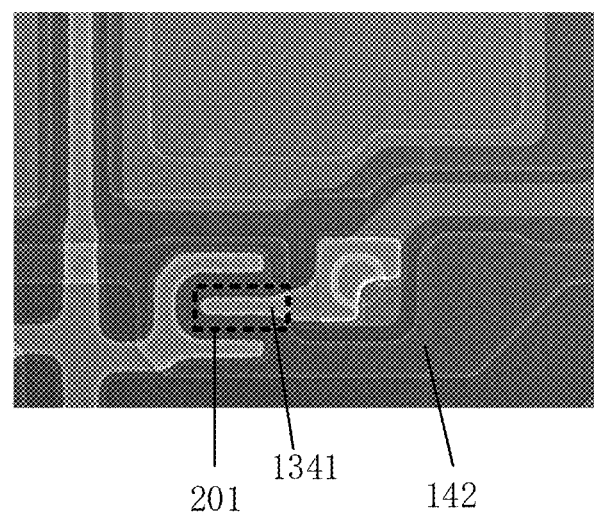
FIG. 3B is an enlarged view of an area RC1 of the array substrate as illustrated in FIG. 2A.
Figure 3C:
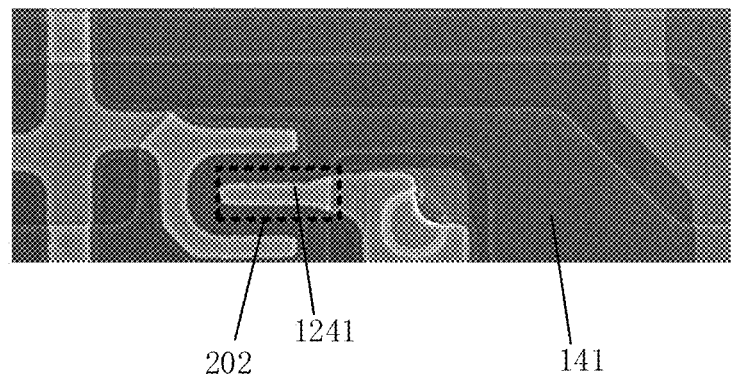
FIG. 3C is an enlarged view of an area RC2 of the array substrate as illustrated in FIG. 2A.

The following is an exemplary description of brightness unevenness that is caused by the offset between the source-drain metal layer and the gate metal layer of the array substrate with reference to FIGS. 3A-3C.

FIG. 3A is a schematic diagram of the array substrate as illustrated in FIG. 2A; FIG. 3B is an enlarged view of an area RC1 of the array substrate as illustrated in FIG. 2A, and FIG. 3C is an enlarged view of an area RC2 of the array substrate as illustrated in FIG. 2A.

FIG. 3A illustrates a plurality of first gate lines, a plurality of second gate lines, a plurality of data lines, and pixel unit groups arranged in an array. As illustrated in FIG. 3A, the plurality of first gate lines includes a gate line GL1_1, a gate line GL2_1, a gate line GL3_1, and a gate line GL4_1. The plurality of second gate lines includes a gate line GL1_2, a gate line GL2_2, a gate line GL3_2, and a gate line GL4_2. The plurality of data lines includes data lines DL1-DL7. The pixel unit groups arranged in the array include, for example, a pixel P11_1, a pixel P11_2, a pixel P12_1, a pixel P12_2, a pixel P21_1, a pixel P21_2, a pixel P22_1, and a pixel P22_2.

FIG. 3B is an enlarged view of the area RC1 of the array substrate as illustrated in FIG. 2A, that is, FIG. 3B illustrates an overlapping area 201 between one of the source electrode and the drain electrode of the switching element of the pixel P11_2 and a gate line (and/or a gate electrode) for driving the switching element. FIG. 3C is an enlarged view of the area RC2 of the array substrate as illustrated in FIG. 2A, that is, FIG. 3C illustrates an overlapping area 202 between one of the source electrode and the drain electrode of the switching element of the pixel P11_1 and a gate line (and/or a gate electrode) for driving the switching element.

As illustrated in FIGS. 3B and 3C, when the source-drain electrode of the switching element moves to the right relative to the gate electrode of the switching element (that is, the source-drain metal layer of the array substrate is offset to the right relative to the gate metal layer), and the areas of the overlapping area 201 and the overlapping area 202 decrease, and therefore, both of the capacitance Cgs of the pixel P11_2 and the capacitance Cgs of the pixel P11_1 decrease, and both of the jump change value ΔVp of the pixel voltage of the pixel P11_2 and the jump change value ΔV of the pixel voltage of the pixel P11_1 decrease.

As illustrated in FIGS. 2A and 3A, b the opening direction of the U-shaped electrodes of the switching elements of the pixel P12_1 and the pixel P12_2 (that is, the other of the source electrode and the drain electrode of the switching element) is the same as the opening direction of the U-shaped electrodes of the switching elements of the pixel P11_1 and the pixel P11_2, when the source electrode and the drain electrode of the switching element move to the right relative to the gate electrode of the switching element, the capacitance Cgs of the pixel P12_2 and the pixel P12_1 and the jump change value ΔVp of the pixel voltage also decrease.

As illustrated in FIGS. 2A and 3A, because the opening directions of the U-shaped electrodes of the switching elements of the pixels P21_1, P21_2, P22_1, and P22_2 are opposite to the opening directions of the U-shaped electrodes of the switching elements of the pixels P11_1 and P11_2, when the source electrode and the drain electrode of the switching element move to the right relative to the gate electrode of the switching element, the capacitance Cgs of the pixels P21_1, P21_2, P22_1, and P22_2, and the jump change value ΔVp of the pixel voltage are all increased.

As illustrated in FIG. 3A, the pixel P11_1 and the pixel P11_2 are both connected to the data line DL1 in the first column, the pixel P12_1, the pixel P12_2, the pixel P21_1, the pixel P21_2 are all connected to the data line DL2 in the second column, the pixel P22_1 and the pixel P22_2 are both connected to the data line DL3 in the third column; the polarities of the voltages applied to the data line DL1 and the data line DL2 are opposite, and the polarities of the voltages applied to the data line DL1 and the data line DL3 are the same.

As illustrated in FIG. 3A, for the case where the voltages applied to the data line DL1, the data line DL2, and the data line DL3 are positive voltage, negative voltage, and positive voltage, respectively (pixel P11_1, pixel P11_2, pixel P22_1, and pixel P222 are in the positive display frame pixel P12_1, pixel P12_2, pixel P21_1, and pixel P21_2 are all in a negative display frame) and the brightness of a pixel is negatively correlated with the absolute value of the difference between the pixel voltage and the common voltage of the pixel, the brightness of the pixels in the pixel unit groups in the odd-numbered columns is low, and the brightness of the pixels in the pixel unit groups in the even-numbered columns is high. A pixel in a positive display frame refers to that the voltage on the pixel electrode of the pixel is a positive voltage, and a pixel in a negative display frame refers to that the voltage on the pixel electrode of the pixel is a negative voltage. The following is an exemplary description with reference to FIGS. 3A, 3D, and 3E.

Figure 3D:
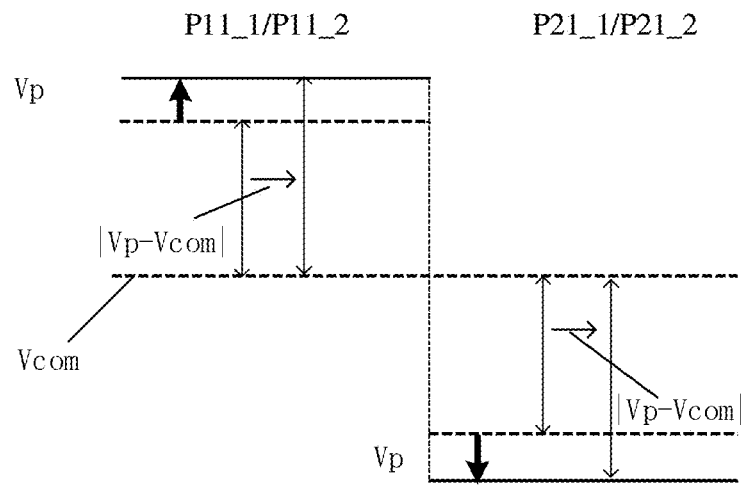
FIG. 3D is a schematic diagram illustrating pixel voltages of pixels of pixel unit groups in odd-numbered columns of the array substrate as illustrated in FIG. 2A when a source-drain metal layer is offset and when a source-drain metal layer is not offset.
Figure 3E:
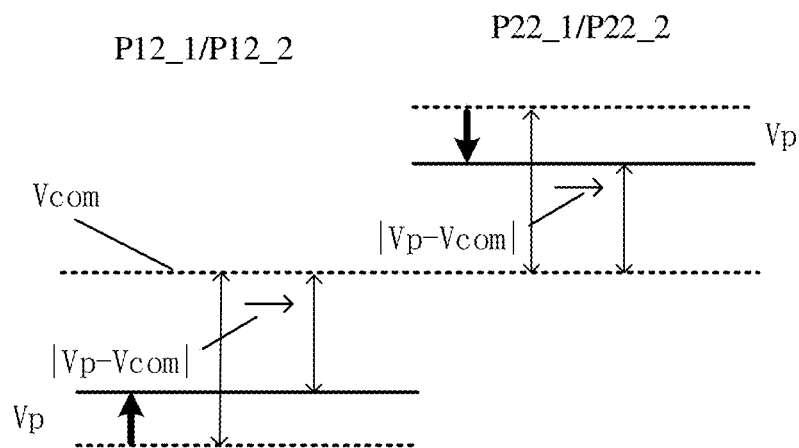
FIG. 3E is a schematic diagram illustrating pixel voltages of pixels of pixel unit groups in even-numbered columns of the array substrate as illustrated in FIG. 2A when a source-drain metal layer is offset and when a source-drain metal layer is not offset.

FIG. 3D is a schematic diagram of pixel voltages of pixels in pixel unit groups in odd-numbered columns when the source-drain metal layer is not offset (dashed line) and offset (solid line) relative to the gate metal layer, and FIG. 3E is a schematic diagram of pixel voltages of pixels in pixel unit groups in even-numbered columns when the source-drain metal layer is not offset (dashed line) and offset (solid line) relative to the gate metal layer.

As illustrated in FIGS. 3A and 3D, because the jump change value ΔVp of the pixel voltage of the pixel P11_1 and the pixel P11_2 both decrease and the pixel P11_1 and the pixel P11_2 are both in the positive display frame, the pixel voltage Vp of the pixel P11_1 and the pixel P11_2 both increase, the absolute values of the differences between the pixel voltages of pixel P11_1 and pixel P11_2 and the common voltage |Vp-Vcom| both increase, the pixel P11_1 and pixel P11_2 are both slightly darker. Because the jump change value ΔVp of the pixel voltage of the pixel P21_1 and the pixel P21_2 both increase and the pixel P11_1 and the pixel P11_2 are both in the negative display frame, the pixel voltages Vp of the pixel P21_1 and the pixel P21_2 both decrease, the absolute values of the differences between the pixel voltages of pixel P21_1 and pixel P21_2 and the common voltage |Vp-Vcom| both increase, pixel P21_1 and pixel P21_2 are also both slightly darker.

As illustrated in FIGS. 3A and 3E, because the jump change value ΔVp of the pixel voltage of the pixel P12_1 and the pixel P12_2 both decrease and the pixel P12_1 and the pixel P12_2 are both in the negative display frame, the pixel voltage Vp of the pixel P12_1 and the pixel P12_2 both increase, the absolute value of the difference between the pixel voltage of pixel P12_1 and pixel P12_2 and the common voltage |Vp-Vcom| both decrease, pixel P11_1 and pixel P11_2 are both slightly brighter. Because the jump change value ΔVp of the pixel voltage of the pixel P22_1 and the pixel P22_2 both decrease and the pixel P22_1 and the pixel P22_2 are both in the positive display frame, the pixel voltage Vp of the pixel P22_1 and the pixel P22_2 both decrease, the absolute value of the difference between the pixel voltage of pixel P22_1 and pixel P22_2 and the common voltage |Vp-Vcom| both decrease, pixel P22_1 and pixel P22_2 are both slightly brighter.

Therefore, in the same image frame, the image displayed on the display panel including the array substrate as illustrated in FIG. 2A can have a display unevenness problem (e.g., a shaking stripe problem).

Figure 3F:
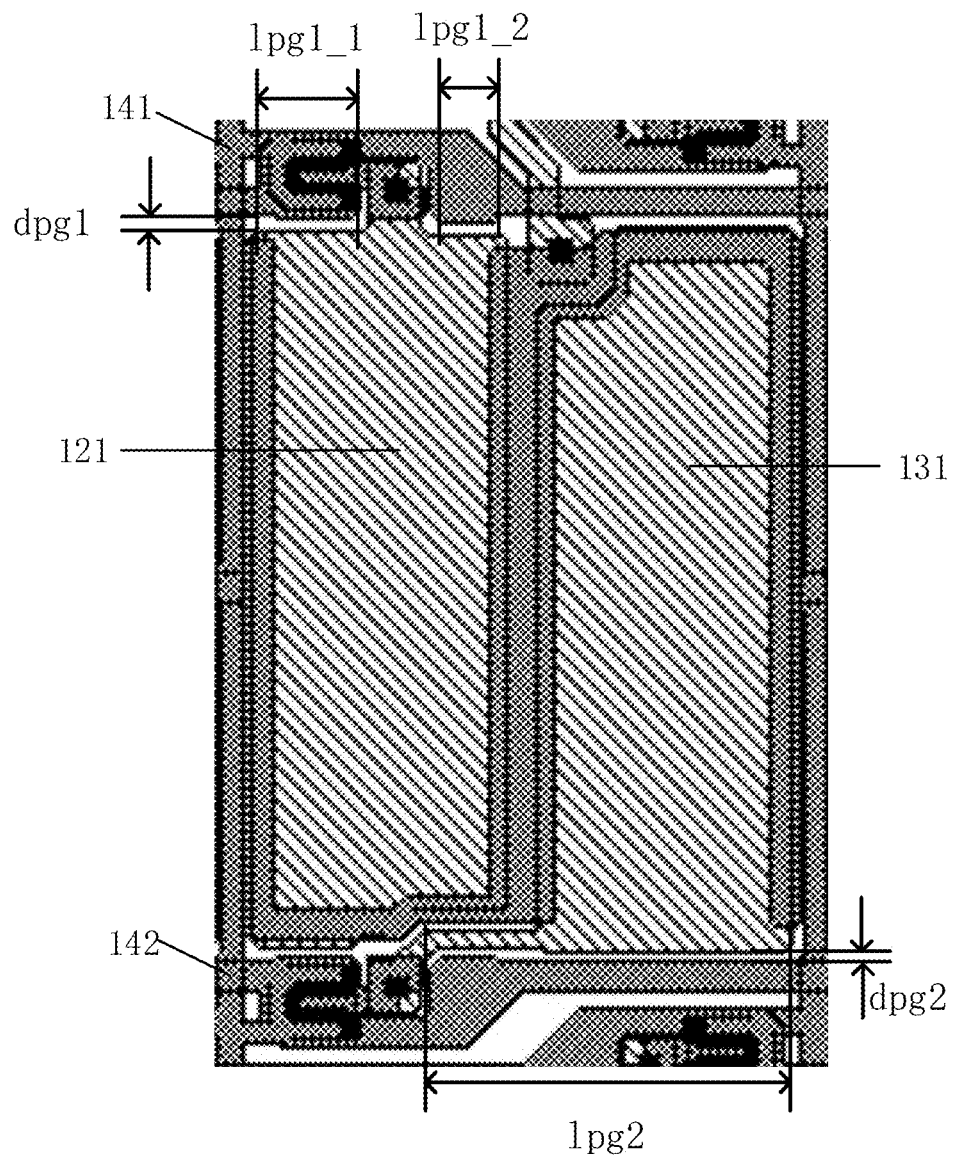
FIG. 3F is a schematic diagram illustrating a lateral distance and an effective overlapping length between a combined structure of a pixel electrode and a connection portion of a pixel in the array substrate as illustrated in FIG. 2A and a gate line for driving the pixel.
Figure 3G:
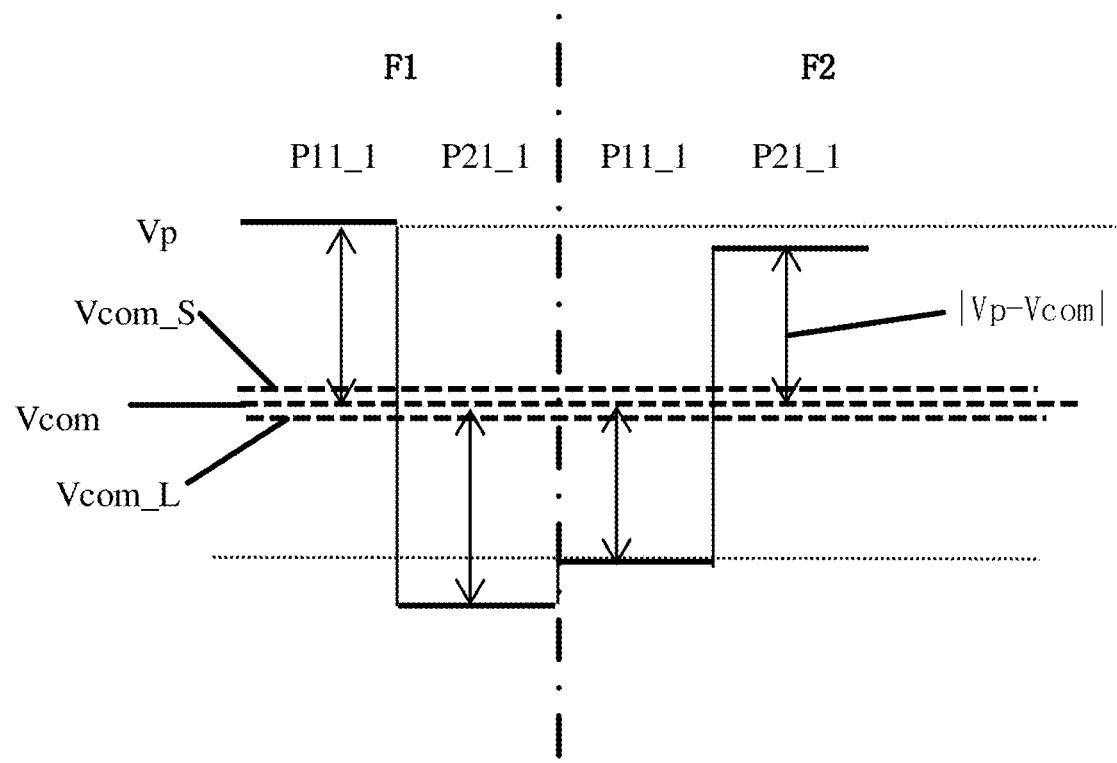
FIG. 3G is a schematic diagram illustrating the comparison of pixel voltages of short connection pixels and long connection pixels of the array substrate as illustrated in FIG. 2A under positive display frames and negative display frames.

The following will give an exemplary description of the brightness unevenness that is caused by the capacitance Cpg of the long connection pixels of the array substrate being not equal to (larger than) the capacitance Cpg of the short connection pixels with reference to FIGS. 3F and 3G. The parameters that affect the capacitance Cpg of the pixels includes a lateral distance dpg and an effective overlapping length lpg.

FIG. 3F illustrates the lateral distance dpg1 and the effective overlapping length lpg1 between the combined structure of the pixel electrode an the connection portion of the short connection pixel (first pixel, P11_1) and the gate line for driving the short connection pixel, and FIG. 3F also illustrates the lateral distance dpg1 and the effective overlapping length lpg1 between the combined structure of the pixel electrode and the connection portion of the long connection pixel (second pixel, P11_1) and the gate line for driving the long connection pixel.

As illustrated in FIG. 3F, the lateral distance dpg of a pixel refers to a distance between the pixel electrode of the pixel (the pixel electrode which is close to the edge of the gate line for driving the pixel) and the gate line for driving the pixel (the gate line close to the edge of the pixel electrode).

As illustrated in FIG. 3F, the effective overlapping length lpg1 (lpg1=lpg1_1+lpg1_2) of the short connection pixel (first pixel) is smaller than the effective overlapping length lpg2 of the long connection pixel (second pixel). For example, when the lateral distance dpg1 of the short connection pixel is equal to or approximate to the lateral distance dpg2 of the long connection pixel, the capacitance Cpg of the short connection pixel is smaller than the capacitance Cpg of the long connection pixel. Therefore, the jump change value of the pixel voltage of the short connection pixel is A Vp is smaller than the jump change value ΔVp of the pixel voltage of the long connection pixel.

As illustrated in FIGS. 2A and 3A, the pixel P21_1 is also a long connection pixel. FIG. 3G is a schematic diagram illustrating the comparison of the pixel voltages of the short connection pixel P11_1 and the long connection pixel P21_1 in a positive display frame and a negative display frame.

As illustrated in FIG. 3G, in the first image frame F1, the short connection pixel P11_1 is in a positive display frame, and the long connection pixel P21_1 is in a negative display frame; in the second image frame F2, the short connection pixel P11_1 is in a negative display frame, and the long connection pixel P21_1 is in the positive display frame.

As illustrated in FIG. 3G, because the jump change value ΔVp of the pixel voltage of the short connection pixel is smaller than the jump change value ΔVp of the pixel voltage of the long connection pixel, in the first image frame F1, both of the short connection pixel P11_1 and the long connection pixel P21_1 are slightly darker. In the second image frame F2, the short connection pixel P11_1 and the long connection pixel P21_1 are both slightly brighter. An exemplary description will be given below with reference to FIG. 3G.

As illustrated in FIG. 3G, in the first image frame F1, the pixel voltage Vp of the short connection pixel P11_1 in the positive display frame increases, and the absolute value of the difference between the pixel voltage Vp and the common voltage Vcom |Vp-Vcom| increases; the pixel voltage Vp of the long connection pixel P21_1 in the negative display frame decreases, and the absolute value of the difference between the pixel voltage Vp and the common voltage Vcom |Vp-Vcom| increases. Therefore, in the first image frame F1, the short connection pixel P11_1 and the long connection pixel P21_1 are both slightly darker. For similar reasons, in the first image frame F1, the other pixels located in the column where the short connection pixel P11_1 and the long connection pixel P21_1 are located are also slightly darker. For similar reasons, in the first image frame F1, all pixels located in the column where the long connection pixel P11_2 and the short connection pixel P21_2 are located are slightly brighter.

As illustrated in FIG. 3G, in the second image frame F2, the pixel voltage Vp of the short connection pixel P11_1 in the negative display frame increases, and the absolute value of the difference between the pixel voltage Vp and the common voltage Vcom |Vp-Vcom| decreases; the pixel voltage Vp of the long connection pixel P21_1 in the positive display frame decreases, and the absolute value of the difference between the pixel voltage Vp and the common voltage Vcom |Vp-Vcom| decreases. Therefore, in the second image frame F1, the short connection pixel P11_1 and the long connection pixel P21_1 are both slightly brighter. For similar reasons, in the second image frame F2, the other pixels located in the column where the short connection pixel P11_1 and the long connection pixel P21_1 are located are also slightly brighter. For similar reasons, in the first image frame F1, all pixels located in the column where the long connection pixel P11_2 and the short connection pixel P21_2 are located are slightly darker.

As illustrated in FIG. 3G, when only the short connection pixel P11_1 is considered, the common voltage should be increased from Vcom to Vcom_S (the optimal common voltage for the short connection pixel P11_1); however, when only the long connection pixel P21_1 is considered, the common voltage should be decreased from Vcom to Vcom_L (the optimal common voltage for the long connection pixel P21_1). Therefore, it is difficult to adjust the common voltage to eliminate the uneven brightness of the image caused by the difference between the Cpg of the long connection pixel and the Cpg of the short connection pixel (all the pixels in the same column are brighter or darker in the same image frame).

In the following, an exemplary description of the uneven brightness of the image possibly caused by the capacitance Cpg' of the long connection pixel being unequal to (larger than) the capacitance Cpg' of the short connection pixel with reference to FIGS. 3H-3J. For example, the parameters that affect the capacitance Cpg' of the pixel include the lateral distance dpg' and the effective overlapping length lpg'.

Figure 3H:
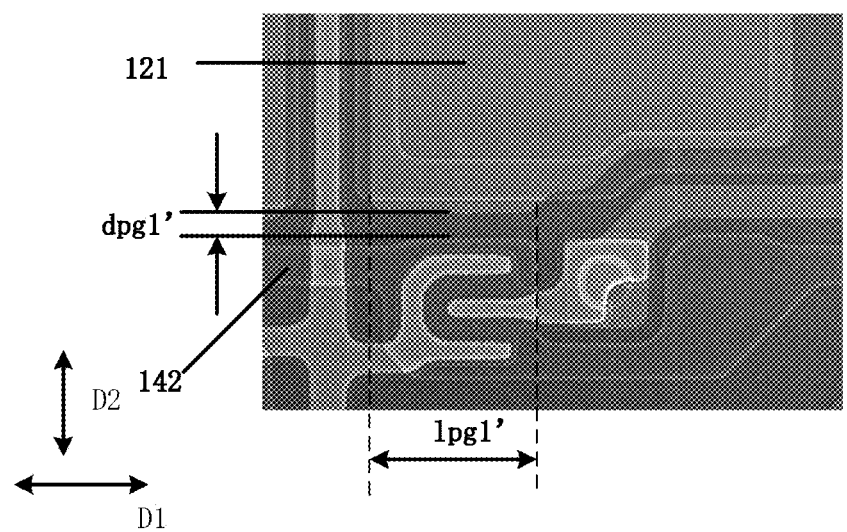
FIG. 3H is a schematic diagram of the area RC1 of the array substrate as illustrated in FIG. 2A.
Figure 3I:
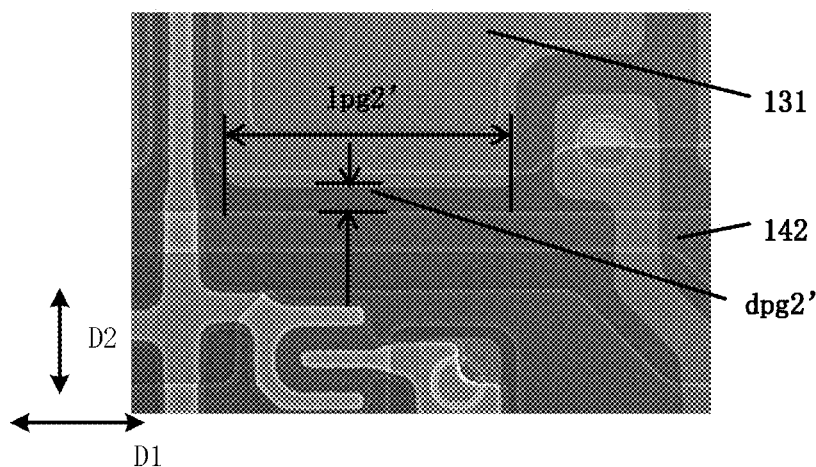
FIG. 3I is a schematic diagram of an area RC3 of the array substrate as illustrated in FIG. 2A.

FIG. 3H illustrates a schematic view of the area RC1 of the array substrate as illustrated in FIG. 2A (obtained by a scanning electron microscope), and FIG. 3I illustrates a schematic view of the area RC3 of the array substrate as illustrated in FIG. 2A (obtained by a scanning electron microscope).

As illustrated in FIG. 3H, the first pixel electrode 121 and the gate line adjacent to the first pixel electrode 121 (but not for driving the first pixel where the first pixel electrode 121 is located, that is, the second gate line 142) overlap with each other in the second direction D2. As illustrated in FIG. 3I, the second pixel electrode 131 and the gate line adjacent to the second pixel electrode 131 (but not for driving the second pixel where the second pixel electrode 131 is located, that is, the second gate lines 142) overlap with each other in the second direction D2.

The following two points should be noted. (1) As illustrated in FIGS. 2A, 3H, and 3I, the second pixel electrode 131 illustrated in FIG. 3I and the first pixel electrode 121 illustrated in FIG. 3H are located in two different pixel unit groups (two pixel unit groups that are adjacent in the second direction D2); (2) As illustrated in FIGS. 2A, 3H and 3I, the second pixel electrode 131, which is in the same pixel unit group as the first pixel electrode 121 as illustrated in FIG. 3H, is located under the gate line that is adjacent to the second pixel electrode 131, and thus, before charging the pixel where the second pixel electrode 131, which is in the same pixel unit group as the first pixel electrode 121 illustrated in FIG. 3H, is located, the scanning of the gate line that is adjacent to the second pixel electrode 131 has ended. Therefore, the charging process of the second pixel electrode 131, which is in the same pixel unit group as the first pixel electrode 121 illustrated in FIG. 3H, is not affected by (or the influence is very small) the gate line that is adjacent to the second pixel electrode 131.

As illustrated in FIGS. 3H and 3I, the distance between the first pixel electrode 121 and the gate line (e.g., the second gate line 142) adjacent to the first pixel electrode 121 in the second direction D2 can be used as the lateral distance dpg1', and the distance between the second pixel electrode 131 and the gate line (e.g., the second gate line 142) adjacent to the second pixel electrode 131 in the second direction D2 can be used as the lateral distance dpg2'.

As illustrated in FIGS. 3H and 3I, the effective overlapping length lpg between the first pixel electrode 121 and the gate line adjacent to the first pixel electrode 121 refers to a length in the first direction D1 of a region of the gate line adjacent to the first pixel electrode 121, in which the region of which corresponds to an area where the lateral distance is less than or equal to a predetermined distance (e.g., less than or equal to the lateral distance dpg1'); and the effective overlapping length lpg2' between the second pixel electrode 131 and the gate line adjacent to the second pixel electrode 131 refers to a length in the first direction D1 of a region of the gate line adjacent to the second pixel electrode 131, in which the region of which corresponds to an area where the lateral distance is less than or equal to a predetermined distance (e.g., less than or equal to the lateral distance dpg2').

For example, when an array substrate adopts a GOA (Gate Drive on Array) to drive the gate lines, the array substrate has a pre-charging function, and the capacitance Cpg' can cause pixel voltage of pixels (e.g., pixels driven by odd-numbered rows of gate lines) further decrease, exemplary description will be given below with reference to FIG. 3J.

Figure 3J:
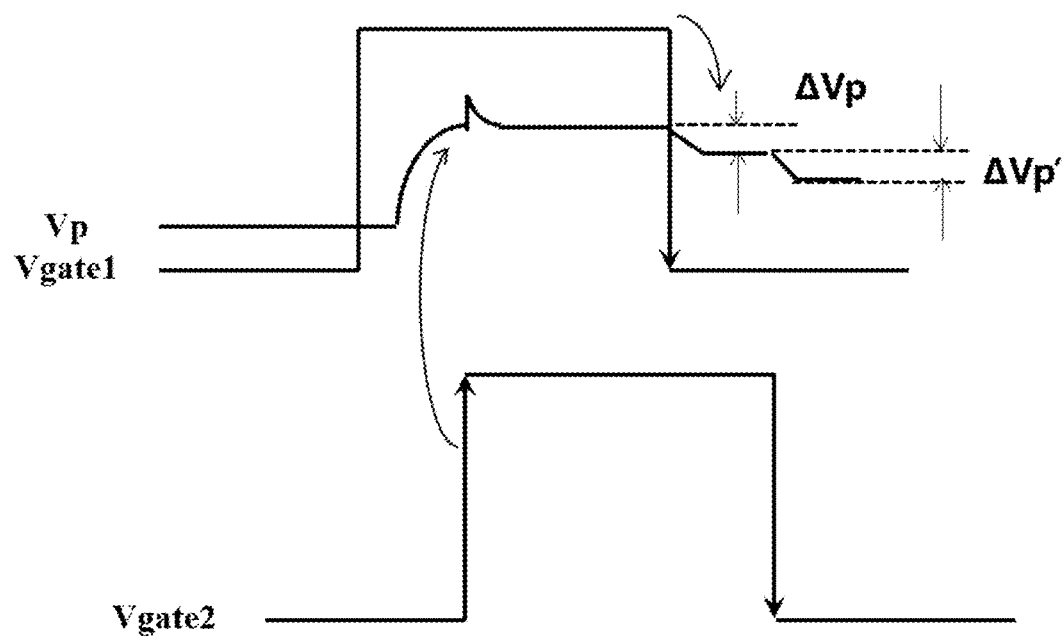
FIG. 3J is a schematic diagram illustrating an effect of a capacitance Cpg' of a pixel of the array substrate as illustrated in FIG. 2A on the pixel voltage of the pixel.

FIG. 3J is a schematic diagram illustrating the effect of the capacitor Cpg' on the pixel voltage Vp. As illustrated in FIG. 3J, Vgate1 is a gate line in an odd-numbered row, Vgate2 is a gate line in an even-numbered row, and Vp is a pixel voltage of a pixels in an even-numbered row. As illustrated in FIG. 3J, when the signal of the gate line in the odd-numbered row is at the rising edge, the pixel voltage Vp of the pixel has an additional increment due to the influence of the capacitance Cpg', but because the pixel is at the charging stage at this time, the above additional increments will be removed. As illustrated in FIG. 3J, when the signal of the gate line in the even-numbered row is on the rising edge, the pixel voltage Vp of the pixel has an additional decrement $\Delta Vp'$ due to the influence of the capacitance Cpg', and because the pixel is not in the charging stage, the additional increments cannot be removed.

For example, the inventors of the present disclosure have discovered in research that when the capacitance Cgs of the long connection pixel and the capacitance Cgs of the short connection pixel are more approximate to each other and/or the capacitance Cpg of the long connection pixel and the capacitance Cpg of the short connection pixel are more approximate to each other, the jump change value of pixel voltage $\Delta Vp$ of the long connection pixel is more approximate to the jump change value of pixel voltage $\Delta Vp$ of the short connection pixel, thereby reducing the display unevenness phenomenon (e.g., the shaking stripe phenomenon). The following is an exemplary description with reference to FIG. 4A.

Figure 4A:
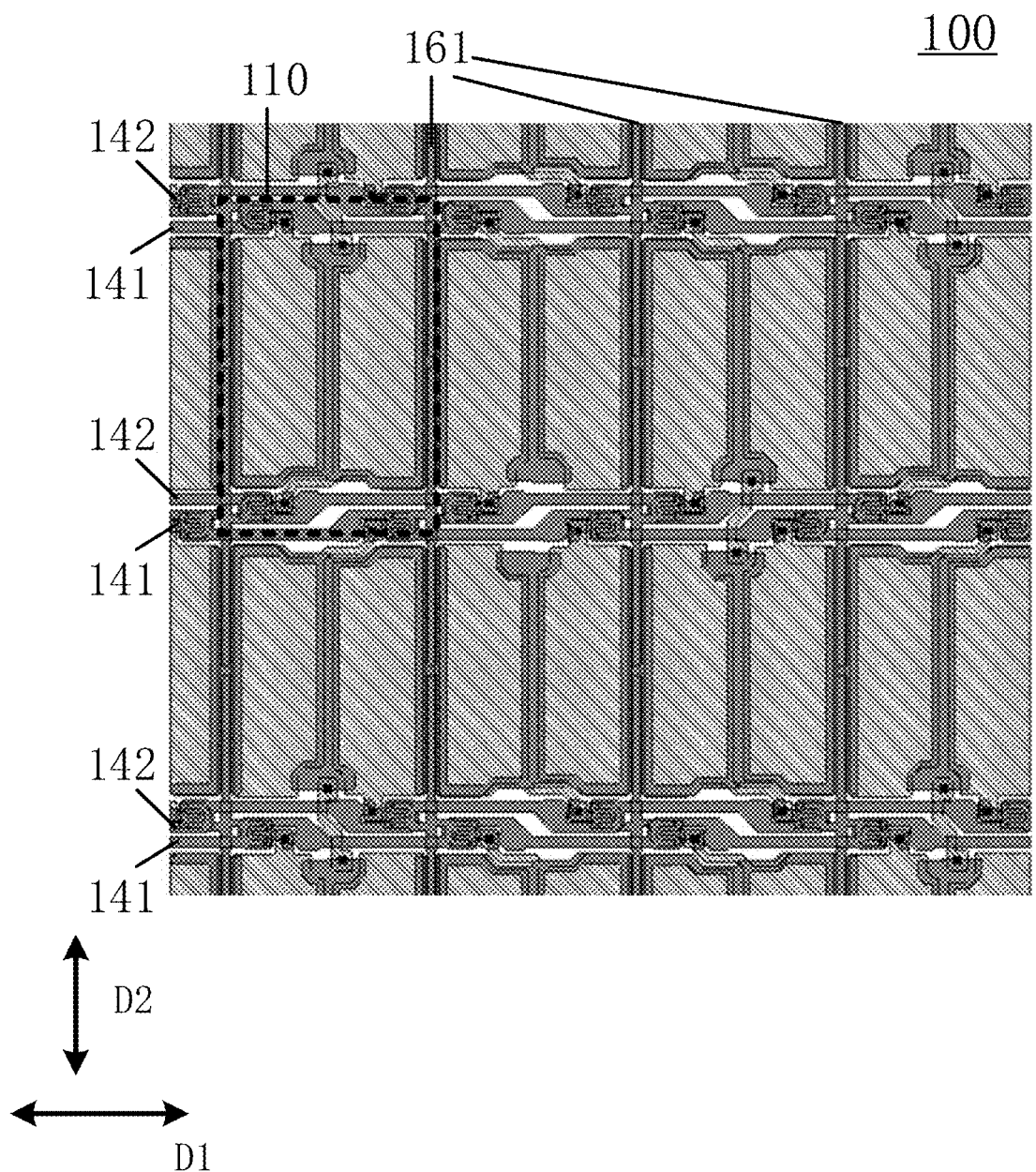
FIG. 4A is a schematic plan view of another array substrate provided by at least one embodiment of the present disclosure.

FIG. 4A is a schematic plan view of another array substrate 100 provided by at least one embodiment of the present disclosure. The array substrate 100 as illustrated in FIG. 4A differs from the array substrate as illustrated in FIG. 2A in that: (1) the array substrate 100 as illustrated in FIG. 4A has Cgs compensation capability; (2) the pixel electrode of the long connection pixel of the array substrate 100 as illustrated in FIG. 4A has a recessed portion on the side closer to the gate line for driving the long connection pixel; (3) the array substrate 100 as illustrated in FIG. 4A has first and second via-holes different from the first and second via-holes of the array substrate 100 as illustrated in FIG. 2A; and (4) the array substrate 100 as illustrated in FIG. 4A has a common electrode pattern different from the common electrode pattern of the array substrate 100 as illustrated in FIG. 2A.

It should be noted that other embodiments of the present disclosure can have the array substrate different from the array substrate as illustrated in FIG. 2A only in part (e.g., one or any combination) of the above four differences, which will not be elaborated here.

Exemplary description of the array substrate 100 as illustrated in FIG. 4A will be given below with reference to FIGS. 4A-4E, 5A-5H and 6-11.

As illustrated in FIG. 4A, the array substrate 100 includes a plurality of pixel unit groups 110 arranged in an array, a plurality of first gate lines 141, a plurality of second gate lines 142, and a plurality of data lines 161. The plurality of first gate lines 141 and the plurality of second gate lines 142 extend substantially in the first direction D1, respectively, and the plurality of data lines 161 substantially extend in the second direction D2 intersecting with (e.g., perpendicular to) the first direction D1.

Each row of pixel unit groups 110 is driven by two gate lines, and the two gate lines (one first gate line 141 and one second gate line 142) are disposed on two sides of the each row of pixel unit groups 110 in the second direction D2 and are immediately adjacent to the each row pixel unit groups 110. Here, the gate line being immediately adjacent to the pixel unit groups 110 refers to that no other gate line is disposed between the pixel unit groups 110 and the above gate line. Two gate lines are provided between two pixel unit groups 110 that are adjacent in the second direction D2, and one data line is provided between two pixel unit groups 110 that are adjacent in the first direction D1. The following is an exemplary description with reference to FIG. 4A.

As illustrated in FIG. 4A, each row of pixel unit groups 110 corresponds to one of the plurality of first gate lines 141 and one of the plurality of second gate lines 142, and the one of the plurality of first gate lines 141 and the one of the plurality of second gate lines 142 are disposed on two sides of the each row of pixel unit groups 110 in the second direction D2, and are configured to drive the each row of pixel unit groups 110.

As illustrated in FIG. 4A, one first gate line 141 and one second gate line 142 are disposed between adjacent pixel unit groups 110 in the column direction (that is, the second direction D2). The one gate line 141 and the one second gate line 142 are respectively used to drive the pixel unit groups 110 of two adjacent rows. For example, the plurality of first gate lines 141 and the plurality of second gate lines 142 are configured to drive corresponding pixel unit groups 110 adjacent to the plurality of first gate lines 141 and the plurality of second gate lines 142 (that is, there is no other gate line between the gate line and the pixel unit group 110 driven by the gate line). As illustrated in FIG. 4A, one data line 161 is disposed between pixel unit groups 110 that adjacent in the row direction (that is, the first direction D1). As illustrated in FIG. 4A, the plurality of first gate lines 141 and the plurality of second gate lines 142 are alternately arranged in the second direction D2.

It should be noted that the expression that the plurality of first gate lines 141 and the plurality of second gate lines 142 extending substantially along the first direction D1, respectively, only defines the extending direction of the lengths of the first gate lines 141 and the second gate lines 142, and it does not mean that the first gate line 141 and the second gate line 142 are parallel to the first direction D1. That is, according to actual application requirements, the first gate line 141 and the second gate line 142 can be parallel to the first direction D1 or part of the first gate line 141 and part of the second gate line 142 may be not parallel to the first direction D1. For example, in order to better improve the aperture ratio of the array substrate 100, partial sections of the plurality of first gate lines 141 and the plurality of second gate lines 142 can be designed in a bent form. For example, the data line 161 can be parallel to the second direction D2 or part of the data line 161 may not be parallel to the second direction D2.

For the sake of clarity, the following description is made to one pixel unit group 110 of the plurality of pixel unit groups 110 as an example.

Figure 4B:
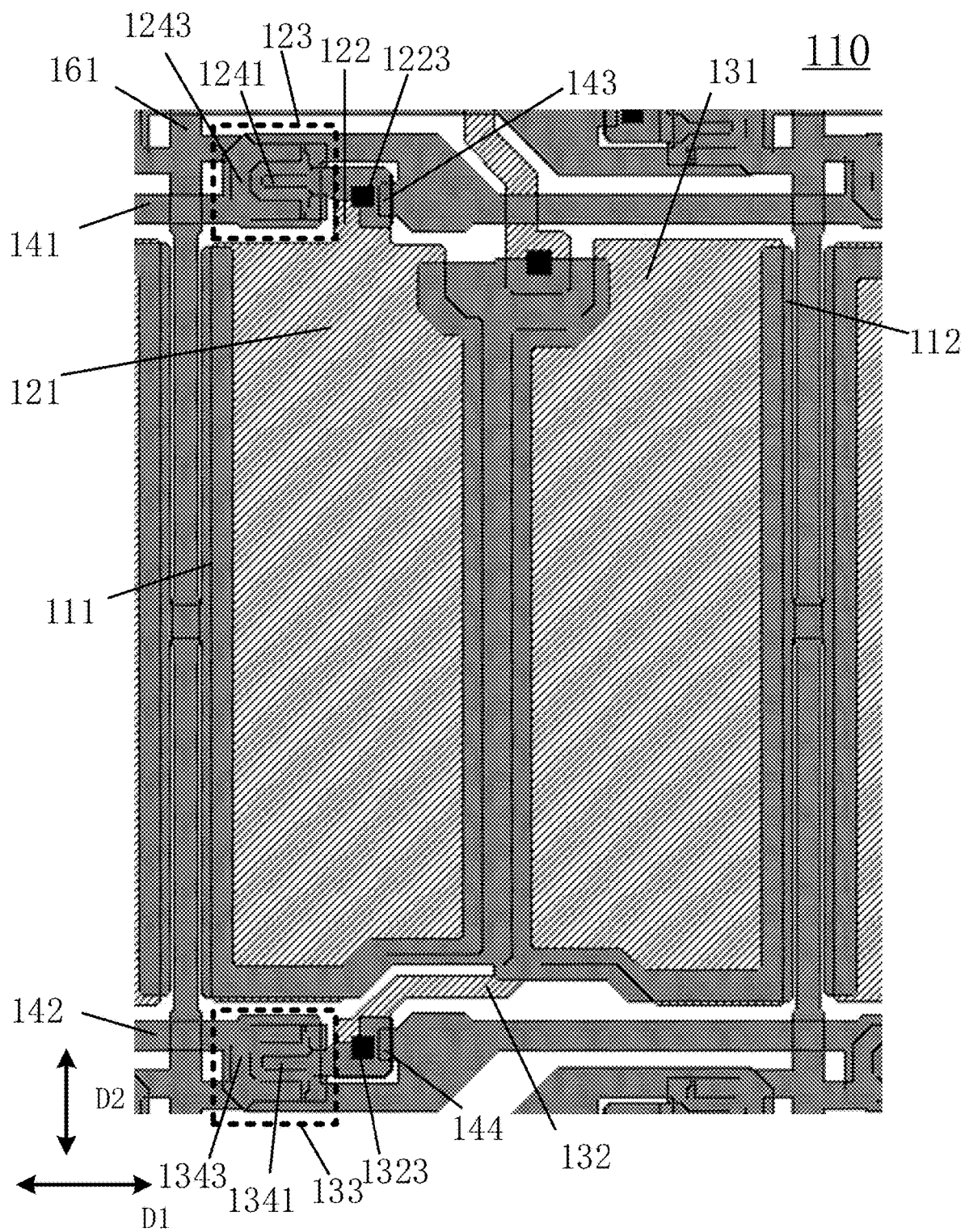
FIG. 4B is a schematic plan view of a pixel unit group of the array substrate as illustrated in FIG. 4A.

FIG. 4B is a schematic plan view of the pixel unit group 110 of the array substrate 100 as illustrated in FIG. 4A. For convenience of description, FIG. 4B also illustrates a first gate line 141, a second gate line 142, and a data line 161. Part or all of the pixel unit groups 110 of the array substrate 100 as illustrated in FIG. 4A can be implemented as the pixel unit group 110 illustrated in FIG. 4B.

As illustrated in FIG. 4B, the pixel unit group 110 includes a first pixel and a second pixel that are arranged side by side and immediately adjacent to each other in the first direction D1. It should be noted that the first pixel and the second pixel being arranged side by side and immediately adjacent to each other refers to that no other pixel is provided between the first pixel and the second pixel.

As illustrated in FIG. 4B, the first pixel includes a first pixel electrode 121, a first switching element 123, and a first connection portion 122 extending and protruding from the first pixel electrode 121, and the second pixel includes a second pixel electrode 131, a second switching element 133 and a second connection portion 132 extending and protruding from the second pixel electrode 131. The first pixel electrode 121 and the first switching element 123 are electrically connected to each other via the first connection portion 122, and the second pixel electrode 131 and the second switching element 133 are electrically connected to each other via the second connection portion 132. The extension length of the first connection portion 122 is not equal to (e.g., smaller than) the extension length of the second connection portion 132.

For example, by making the extension length of the first connection portion 122 not equal to (e.g., smaller than) the extension length of the second connection portion 132, it is possible to provide both of the first switching element 123 and the second switching element 133 on an edge of the pixel unit group 110 in the first direction D1. The following is an exemplary description with reference to FIG. 4B.

For example, as illustrated in FIG. 4B, the pixel unit group 110 includes a first edge 111 and a second edge 112 opposite to each other in the first direction D1, and both of the first switching element 123 and the second switching element 133 are closer to the first edge 111 of the pixel unit group 110 than to the second edge 112.

For example, as illustrated in FIG. 4B, the first switching element 123 and the second switching element 133 of each pixel unit group 110 are connected to the same data line 161. For example, the distance between the first switching element 123 of each pixel unit group 110 and the same data line 161 is the same as the distance between the second switching element 133 of each pixel unit group 110 and the same data line 161. In this case, a connection line between the first switching element 123 of each pixel unit group 110 and the data line 161 for driving the pixel unit group 110 can have a length (the length in the first direction D1) equal to a length (the length in the first direction D1) of a connection line between the second switching element 133 of each pixel unit group 110 and the data line 161 for driving the pixel unit group 110.

For example, as illustrated in FIG. 4A, the switching elements connected to the same data line 161 include a switching element disposed on the first side (e.g., the left side) of the same data line 161 and a switching element disposed on the second side (e.g., the right side) of the same data line 161, and the switching element on the first side (e.g., the left side) of the same data line 161 and the switching element on the second side (e.g., the right side) of the same data line 161 partially overlap in the first direction D1.

For example, by making the switching element on the first side (e.g., left side) of the same data line 161 and the switching element on the second side (e.g., right side) of the same data line 161 partially overlap in the first direction D1, it is possible to reduce the size, in the second direction D2, of the area occupied by the switching elements (the first switching element 123 and the second switching element 133), and thus it can reduce the size, in the second direction D2, of the black matrix for shielding the switching elements, and can increase the aperture ratio of the array substrate 100 and the aperture ratio of the display panel and display device including the array substrate 100.

For example, as illustrated in FIG. 4B, the first connection portion 122 and the second connection portion 132 of the pixel unit group 110 are respectively disposed on two sides of the first pixel electrode 121 in the second direction D2. The first connection portion 122 and the second connection portion 132 are both disposed between the first gate line 141 and the second gate line 142 in the second direction D2.

For example, as illustrated in FIG. 4B, the first connection portion 122 extends and protrudes in the second direction D2, and the second connection portion 132 extends and protrudes in the first direction D1. In the second direction D2, the second connection portion 132 at least partially overlaps with the first pixel electrode 121. In the second direction D2, the first pixel electrode 121 is disposed between the first switching element 123 and the second switching element 133.

For example, as illustrated in FIG. 4B, the first switching element 123 and the second switching element 133 are symmetrical with respect to the center line of the first pixel electrode 121 (or of the pixel unit group 110) in the second direction D2 which extends along the first direction D1 (see also FIG. 4D below).

For example, the first connection portion 122 and the first pixel electrode 121 are integrally formed and made of a same material, and the second connection portion 132 and the second pixel electrode 131 are integrally formed and made of a same material. For example, the first connection portion 122, the first pixel electrode 121, the second connection portion 132, and the second pixel electrode 131 can be formed by patterning the same film layer through the same patterning process.

For example, as illustrated in FIG. 4B, by making the first switching element 123 and the second switching element 133 both closer to the same edge of the pixel unit group 110 (e.g., the first edge 111) in the first direction D1, forming the first connection portion 122 integrally with the first pixel electrode 121 by a same material, and forming the second connection portion 132 integrally with the second pixel electrode 131 by a same material, it is possible to make the first connection portion 122 (the first end 1221 of the first connection portion 122, see also FIG. 6 below) electrically connected to the first pixel electrode 121 directly, and make the second connection portion 132 (the first end 1321 of the second connection portion 132, see also FIG. 6 below) electrically connected to the second pixel electrodes 131 directly. Therefore, as compared to the array substrate as illustrated in FIG. 1, it is possible to eliminate the need to provide vias in the areas closer to the first pixel electrode 121 and the second pixel electrode 131, thereby increasing the sizes of display area of the first pixel and the display area of the second pixel. Although the first connection portion 122 (the second end 1222 of the first connection portion 122) is electrically connected to the first switching element 123 through the first via-hole 1223, the second connection portion 132 (the second end 1322 of the second connection portion 132) is electrically connected to the second switching element 133 through the second via-hole 1323, because the first via-hole 1223 is closer to the first switching element 123, the second via-hole 1323 is closer to the second switching elements 133, and the areas closer to the first switching element 123 and the second switching element 133 correspond to the area shield by a black matrix, and therefore, the first via-hole 1223 and the second via-hole 1323 as illustrated in FIG. 4B does not reduce the aperture ratio of the pixel unit group 110 and the aperture ratio of the array substrate 100.

For example, both the first pixel electrode 121 and the second pixel electrode 131 can be made of a transparent conductive material. For example, the transparent conductive material is indium tin oxide (ITO) or indium zinc oxide (IZO). When the first connection portion 122 and the first pixel electrode 121 are integrally formed and made of a same material, and the second connection portion 132 and the second pixel electrode 131 are integrally formed and made of a same material, the first connection portion 122 and the second connection portion 132 can also be made of a transparent conductive material (e.g., ITO). For example, the processing accuracy of a transparent conductive material (e.g., ITO) is higher than the processing accuracy of a metal material, that is, the width of the wire of a transparent conductive material can be smaller than the width of the wire of a metal material. In this case, the size of the areas occupied by the first connection portion 122 and the second connection portion 132 can be reduced, and the size of the areas occupied by the first pixel electrode 121 and the second pixel electrode 131 can be correspondingly increased, thereby increasing the aperture ratio of the pixel unit group 110 and aperture ratio of the array substrate 100.

For example, as illustrated in FIG. 4A, switching elements connected to the same data line and located on the right side of the same data line are used to drive pixel unit groups of odd-numbered rows (or even-numbered rows); and switching elements connected to the same data line and located on the left side of the same data line are used to drive pixel unit groups of even-numbered rows (or odd-numbered rows)

For example, as illustrated in FIG. 4A, the first switching element 123 and the second switching element 133 for driving each pixel unit group are both disposed on the edge of the pixel unit group where the short connection pixel are provided in the first direction. For example, as illustrated in FIG. 4A, the first switching element 123 and the second switching element 133 of the pixel unit group located in the odd-numbered row (or even-numbered row) are both disposed on the left side of the pixel unit group and the first switching element 123 and the second switching element 133 of the pixel unit group located in the even-numbered row (or odd-numbered row) are both disposed on the right side of the pixel unit group.

For example, both the first switching element 123 and the second switching element 133 are thin film transistors (TFTs). For example, as illustrated in FIGS. 4A and 4B, the first switching element 123 and the second switching element 133 are both U-shaped thin film transistors, that is, the source electrode (or drain electrode) of the thin film transistor is a U-shaped electrode, and at least part of the drain electrode (or source electrode) is disposed in the opening of the U-shaped electrode; and the source electrode and drain electrode of the U-shaped thin film transistor at least partially overlap in the second direction D2. For example, as illustrated in FIG. 4A, the opening directions of U-shaped TFTs for driving adjacent rows are opposite. For example, as illustrated in FIG. 4A, the opening direction of the U-type TFT for driving the first row is to the right, and the opening direction of the U-type TFT for driving the second row is to the left.

For example, the array substrate 100 can include a first electrode layer 172 (see FIG. 4C), a first insulating layer 173 (see FIG. 5C), a semiconductor layer 174 (see FIGS. 5A and 5C), a second electrode layer 175 (see FIG. 5A), a second insulating layer 176 (see FIG. 5C) and a third electrode layer 177 (see FIG. 6). The first electrode layer 172, the first insulating layer 173, the semiconductor layer 174, the second electrode layer 175, the second insulating layer 176 and the third electrode layer 177 are sequentially disposed on the base substrate 171, for example.

Figure 4C:
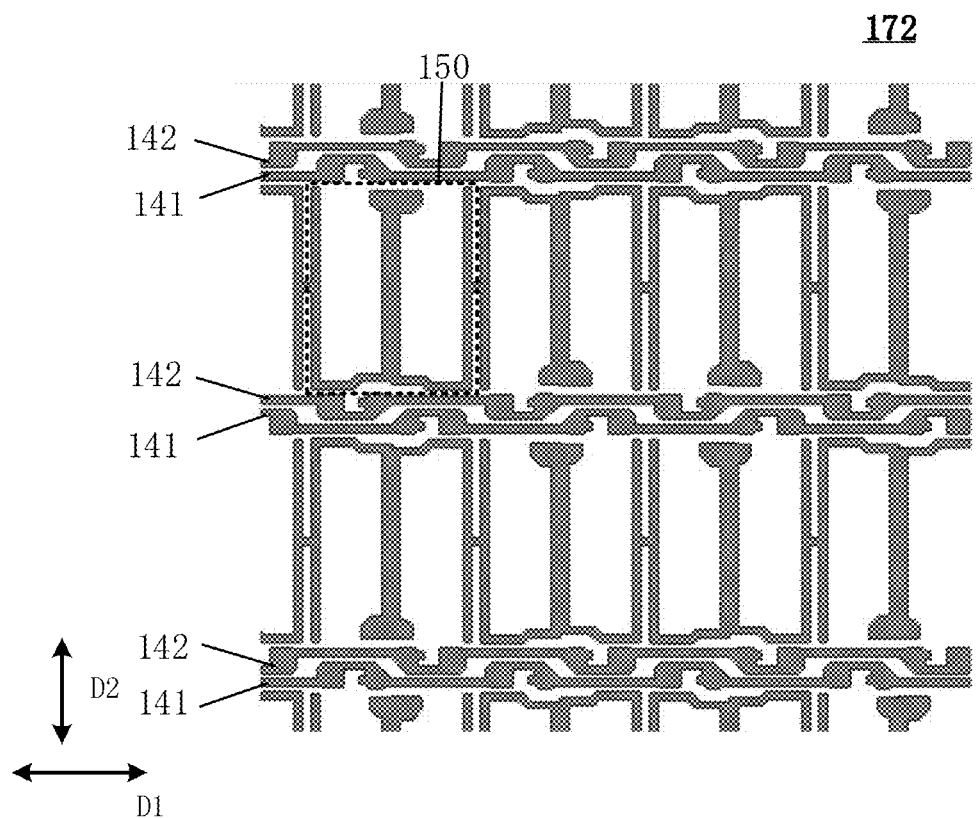
FIG. 4C is a schematic plan view of a first electrode layer of the array substrate as illustrated in FIG. 4A.

FIG. 4C is a schematic plan view of the first electrode layer 172 of the array substrate as illustrated in FIG. 4A. As illustrated in FIG. 4C, the first electrode layer 172 includes a plurality of first gate lines 141, a plurality of second gate lines 142, and a common electrode pattern 150 arranged in an array. The plurality of first gate lines 141 and the plurality of second gates lines 142 are alternately arranged in the second direction D2. The plurality of common electrode patterns 150 are in a one-to-one correspondence with the plurality of pixel unit groups 110. A plurality of common electrode patterns 150 of the same row are disposed between the first gate line 141 and the second gate line 142 which are used for driving the pixel unit groups 110 corresponding to the electrode patterns 150. It should be noted that, in some examples, the first electrode layer 172 does not include the common electrode patterns.

For the sake of clarity, the specific structure of the common electrode patterns 150 and the connection manner between the common electrode patterns 150 will be described in detail later, and the structures of the first gate line 141 and the second gate line 142 will be described below with reference to FIGS. 4D and 4E.

Figure 4D:
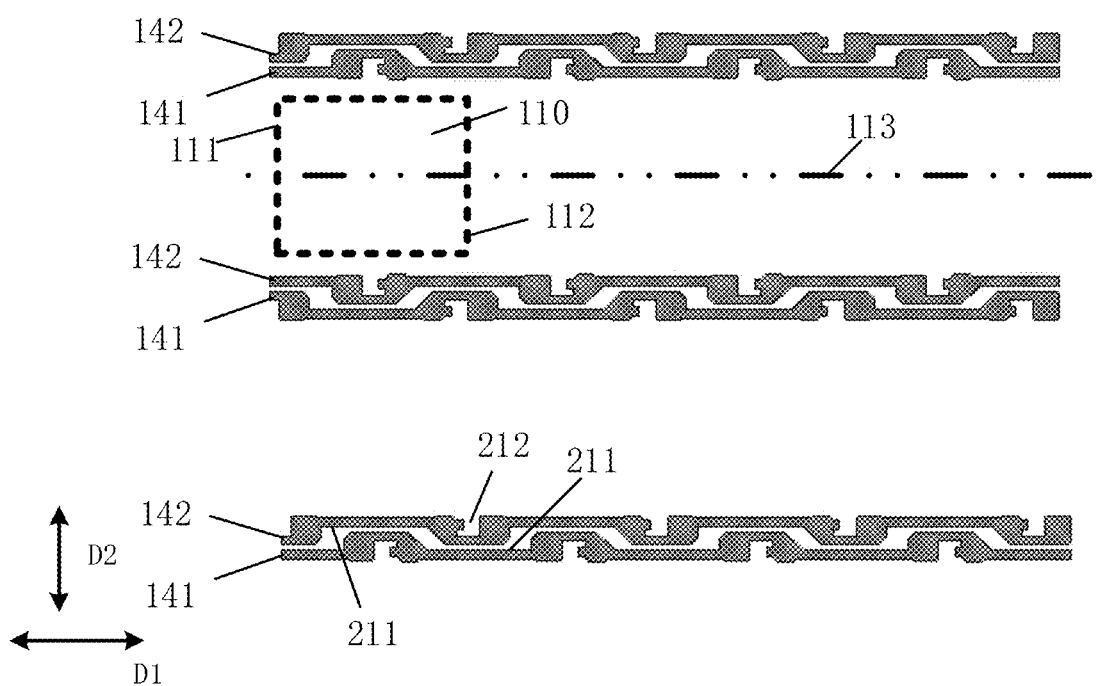
FIG. 4D is a schematic plan view of a first gate line and a second gate line of the array substrate as illustrated in FIG. 4A.

FIG. 4D illustrates a schematic plan view of a first gate line 141 and a second gate line 142 of the array substrate as illustrated in FIG. 4A.

For example, as illustrated in FIGS. 4A and 4D, for each pixel unit group 110, the first gate line 141 for driving a pixel unit group 110 and the second gate lines 142 for driving a pixel unit group 110 adjacent to the above pixel unit group 110 in the second direction D2 partially overlap in the first direction D1. That is, the first gate lines 141 and the second gate lines 142 between pixel unit groups 110 that are adjacent in the second direction D2 partially overlap in the first direction D1, thereby reducing the size, in the second direction D2, of the area occupied by the gate lines, thereby improving the aperture ratio of the array substrate 100 and the aperture ratio of the display panel and display device including the array substrate 100.

For example, as illustrated in FIG. 4D, the first gate line 141 and the second gate line 142 are arranged symmetrically with respect to the center line 113, which extends in the first direction D1, of the pixel unit group 110 in the second direction D2.

Figure 4E:
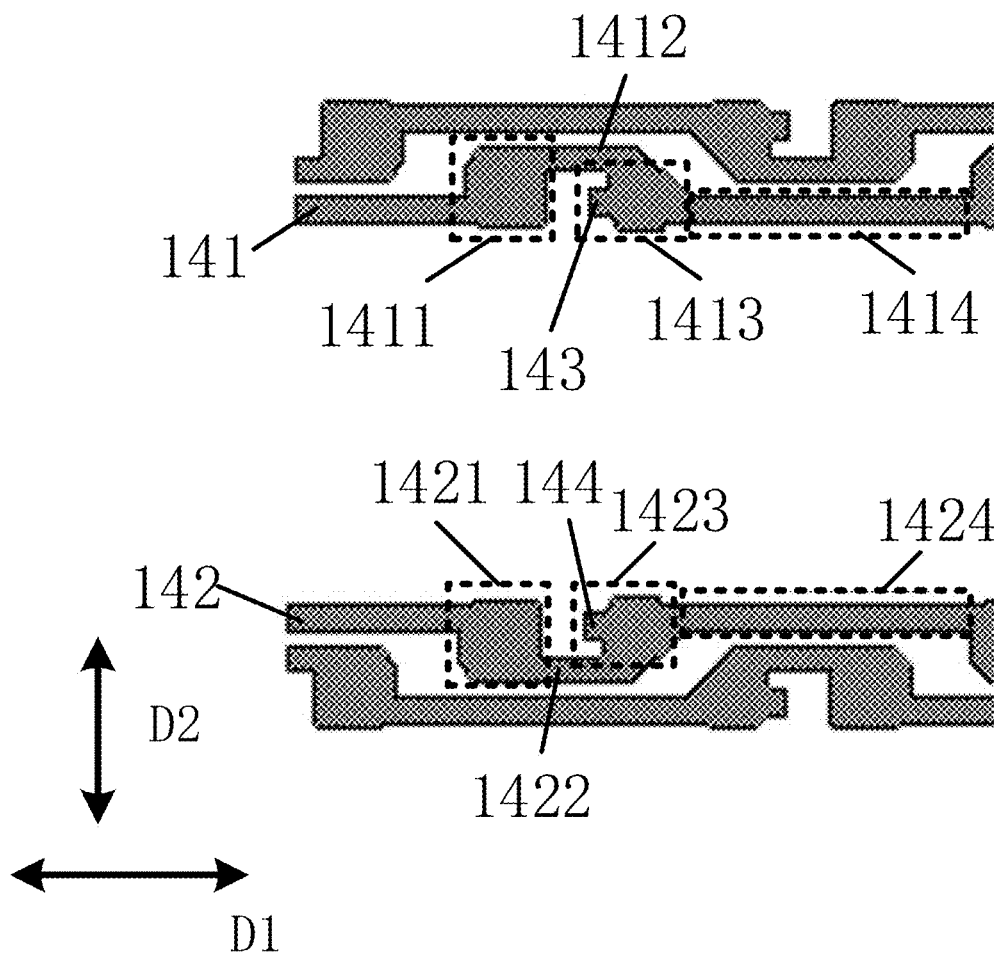
FIG. 4E is a schematic plan view of a portion of the first gate line and the second gate line corresponding to a pixel unit group in the array substrate as illustrated in FIG. 4A.

FIG. 4E illustrates a schematic plan view of a portion of the first gate line 141 and the second gate line 142 of the array substrate as illustrated in FIG. 4A corresponding to one pixel unit group 110. For example, as illustrated in FIG. 4E, the first gate line 141 includes a first gate portion 1411, and the second gate line 142 includes a second gate portion 1421. For example, the first gate portion 1411 is configured as the gate electrode of the first switching element 123, and the second gate portion 1421 is configured as the gate electrode of the second switching element 133. That is, the orthographic projection of the U-shaped electrode (source electrode or drain electrode) of the first switching element 123 on the first electrode layer 172 at least partially overlaps with the first gate portion 1411, and the orthographic projection of the U-shaped electrode (source electrode or drain electrode) of the second switching element 133 on the first electrode layer 172 at least partially overlaps with the second gate portion 1421.

For example, as illustrated in FIG. 4E, the first gate portion 1411 of the gate line 141 for driving each pixel unit group 110 and the second gate portion 1421 of the second gate line 142 for driving the pixel unit group 110 that is adjacent to the each pixel unit group 110 in the second direction D2 partially overlap in the first direction D1. In this way, the size, in the second direction D2, of the area occupied by the gate lines can be reduced, thereby improving aperture ratio of the array substrate 100 and the aperture ratio of the display panel and the display device including the array substrate 100. For example, corresponding gate portions of two gate lines (the first gate line 141 and the second gate line 142) between adjacent pixel unit groups 110 in the second direction D2 partially overlap in the first direction D1.

For example, as illustrated in FIG. 4E, the first gate line 141 further includes a first line portion 1412, a first line connection portion 1413, and a third line portion 1414 connected in sequence; and the second gate line 142 further includes a second line portion 1422, a second line connection portion 1423, and a fourth line portion 1424 connected in sequence. The first line portion 1412 is connected to the first gate portion 1411, and the second line portion 1422 is connected to the second gate portion 1421. For example, as illustrated in FIG. 4E, the first line connection portion 1413 includes a first protrusion 143 protruding toward the first gate portion 1411, and the second line connection portion 1423 includes a second protrusion 144 protruding toward the second gate portion 1421.

For example, as illustrated in FIGS. 4D and 4E, the first line portion 1412, the second line portion 1422, the third line portion 1414, and the fourth line portion 1424 are respectively parallel to the first direction D1.

For example, as illustrated in FIGS. 4D and 4E, the gate portion and the line connection portion which are on the same gate line, correspond to different pixel unit groups, and adjacent to each other, have a first recessed structure 211, and the line connection portion of the gate line adjacent to the above same gate line is provided in the above mentioned first recess structure 211.

For example, as illustrated in FIGS. 4A and 4D, each gate line can drive both of short connection pixels and long connection pixels. Therefore, each gate line may include a first gate portion 1411, a first line portion 1412, a first line connection portion 1413, a third line portion 1414, a second gate portion 1421, a second line portion 1422, a second line connection portion 1423, and a fourth line portion 1424.

For example, as illustrated in FIGS. 4A-4D, the gate portion and the line connection portion of the gate line corresponding to the same pixel unit group 110 are arranged side by side in the first direction and form a second recessed structure 212, and a via-hole (e.g., a first via-hole or a second via-hole) of a pixel driven by the gate line is disposed in the second recessed structure 212.

It should be noted that the array substrate 100 provided by at least one embodiment of the present disclosure is not limited to that the case where all of the plurality of first gate lines 141 and the plurality of second gate lines 142 adopts the structure as illustrated in FIG. 4D, and according to actual application requirements, it is possible to make part of the plurality of first gate lines 141 and the plurality of second gate lines 142 adopt the structure illustrated in FIG. 4D and the remaining part of the plurality of first gate lines 141 and the plurality of second gate lines 142 adopt other suitable gate line structures (e.g., straight gate lines), which will not be elaborated here.

In some examples, the first line connection portion 1413 may not include the first protrusion 143 and the second line connection portion 1423 may not include the second protrusion 144.

Figure 5A:
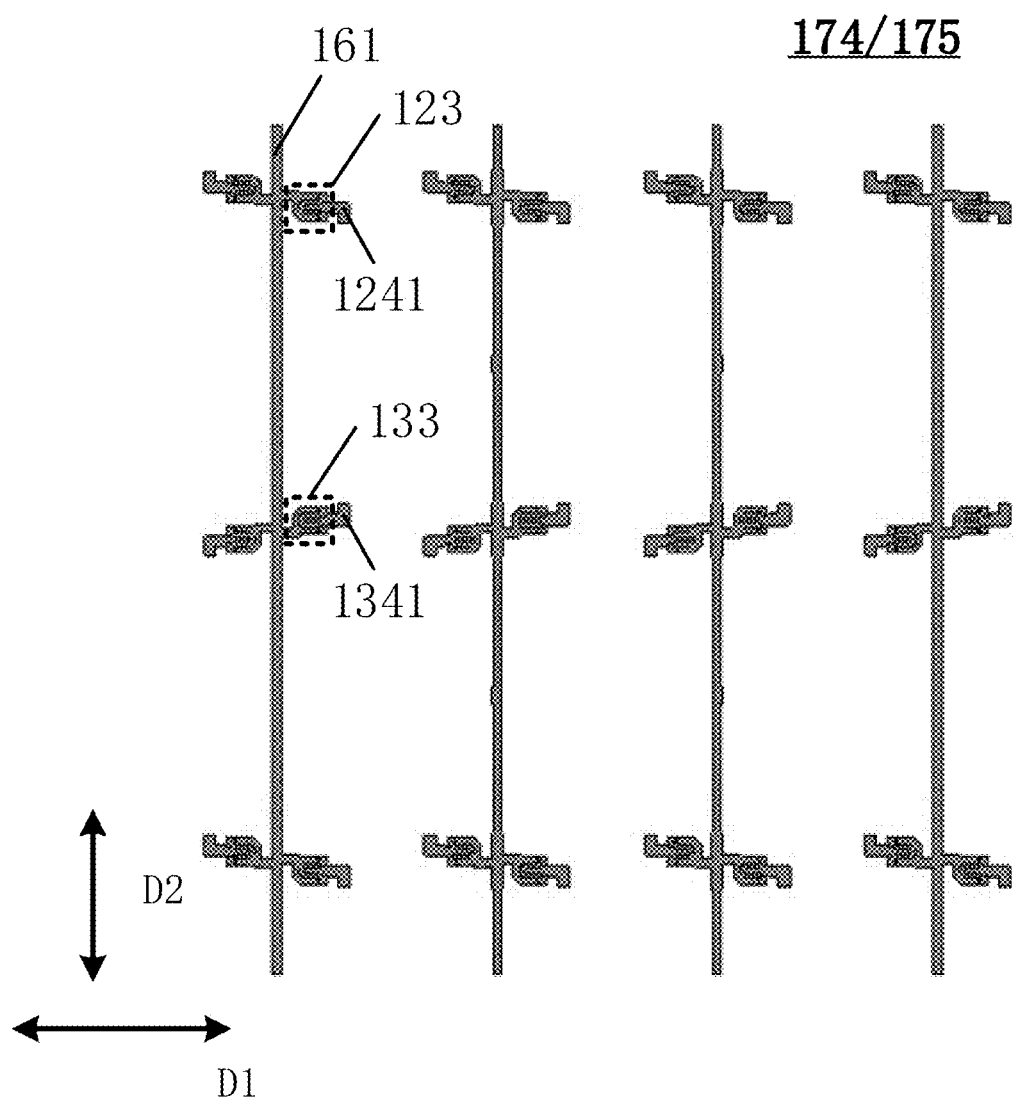
FIG. 5A is a schematic plan view of a semiconductor layer and a second electrode layer of the array substrate as illustrated in FIG. 4A.

FIG. 5A is a schematic plan view of the semiconductor layer 174 and the second electrode layer 175 of the array substrate as illustrated in FIG. 4A. As illustrated in FIGS. 4B and 5A, the second electrode layer 175 includes a plurality of data lines 161, a plurality of first source-drain layers arranged side by side, and a plurality of second source-drain layers arranged side by side. The first source-drain layer includes one 1241 of two first source-drain electrodes of the first switching element 123 and the other one 1243 (e.g., U-shaped electrode) of the two first source-drain electrodes of the first switching element 123. The second source-drain layer includes one 1341 of two second source-drain electrodes of the second switching element 124 and the other one 1343 (e.g., U-shaped electrode) of the two second source-drain electrodes of the second switching element 124.

It should be noted that the first source-drain layer and the second source-drain layer are located in different areas of the same layer. The first source-drain layer and the second source-drain layer are spaced apart in a direction perpendicular to the base substrate, and the first source-drain layer and the second source-drain layer may be formed by patterning the same film layer (for example, a single film layer) using the same patterning process.

Figure 5B:
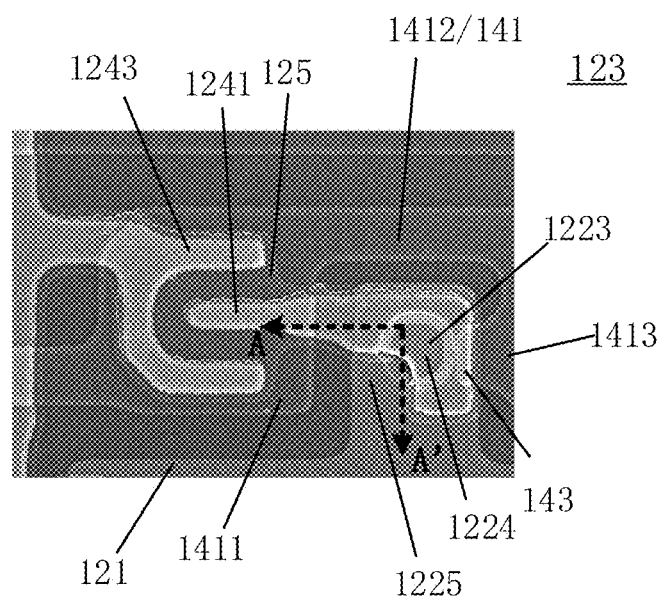
FIG. 5B is a schematic plan view of a first switching element of the array substrate as illustrated in FIG. 4A.
Figure 5C:
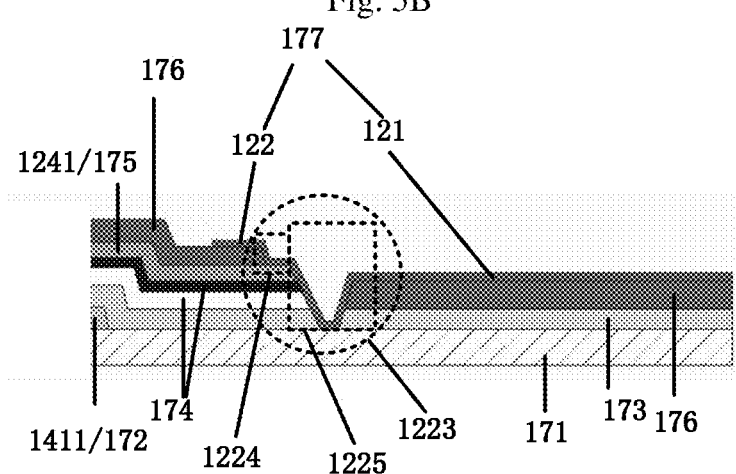
FIG. 5C is a schematic cross-sectional view taken along line AA' as illustrated in FIG. 5B.
Figure 5D:
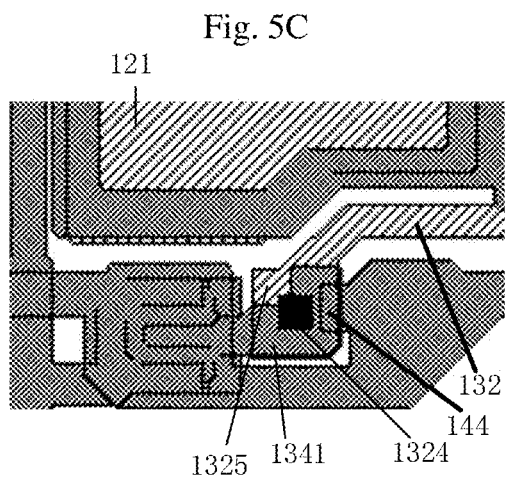
FIG. 5D is a schematic plan view of a second switching element of the array substrate as illustrated in FIG. 4A.

FIG. 5B is a schematic plan view of the first switching element 123 of the array substrate as illustrated in FIG. 4A (an image obtained by a scanning electron microscope image). For convenience of description, FIG. 5B also illustrates a part of the first gate line 141 and a part of the first pixel electrode 121 and the first via-hole 1223. FIG. 5C is a schematic cross-sectional view of the array substrate 100 obtained by cutting along line AA' illustrated in FIG. 5B. FIG. 5D is a schematic plan view of a second switching element 133 provided by at least one embodiment of the present disclosure.

For example, as illustrated in FIGS. 5B and 5C, in a direction perpendicular to the base substrate 171, the first switching element 123 includes a first gate portion 1411 (as the gate electrode of the first switching element 123), a first insulating layer 173, a semiconductor layer 174 (first semiconductor layer 125) and a first source-drain layer. The first source-drain layer includes two first source-drain electrodes that are opposite to each other and are provided separately (that is, one 1241 of the two first source-drain electrodes and the other one 1243 of the two first source-drain electrodes, for example, when the first switching element 123 is turned off, the two first source-drain electrodes are insulated from each other).

For example, the semiconductor layer 174 includes a first semiconductor layer 125 (an area of the semiconductor layer 174 corresponding to the first switching element) and a second semiconductor layer (an area of the semiconductor layer 174 corresponding to the second switching element). It should be noted that the first semiconductor layer 125 and the second semiconductor layer are located in different areas of the same layer; the first semiconductor layer 125 and the second semiconductor layer are spaced apart in the direction perpendicular to the base substrate, and the first semiconductor layer 125 and the second semiconductor layer may be formed by patterning the same film layer (for example, a single-layered film layer) using the same patterning process.

For example, in a direction perpendicular to the base substrate 171, the second switching element 133 includes a second gate portion 1421 (as the gate electrode of the second switching element 133), a first insulating layer 173, a semiconductor layer 174 (second semiconductor layer) and a second source-drain layer. As illustrated in FIG. 4B, the second source-drain layer includes two second source-drain electrodes that are opposite to each other and are provided separately (that is, one 1341 of the two second source-drain electrodes and the other one 1343 of the two second source-drain electrodes, for example, when the second switching element 133 is turned off, the two second source-drain electrodes are insulated from each other).

For example, as illustrated in FIG. 5C, the array substrate 100 further includes a second insulating layer 176, a third electrode layer 177, and a first via-hole 1223 and a second via-hole 1323 provided in the second insulating layer 176.

Figure 7:
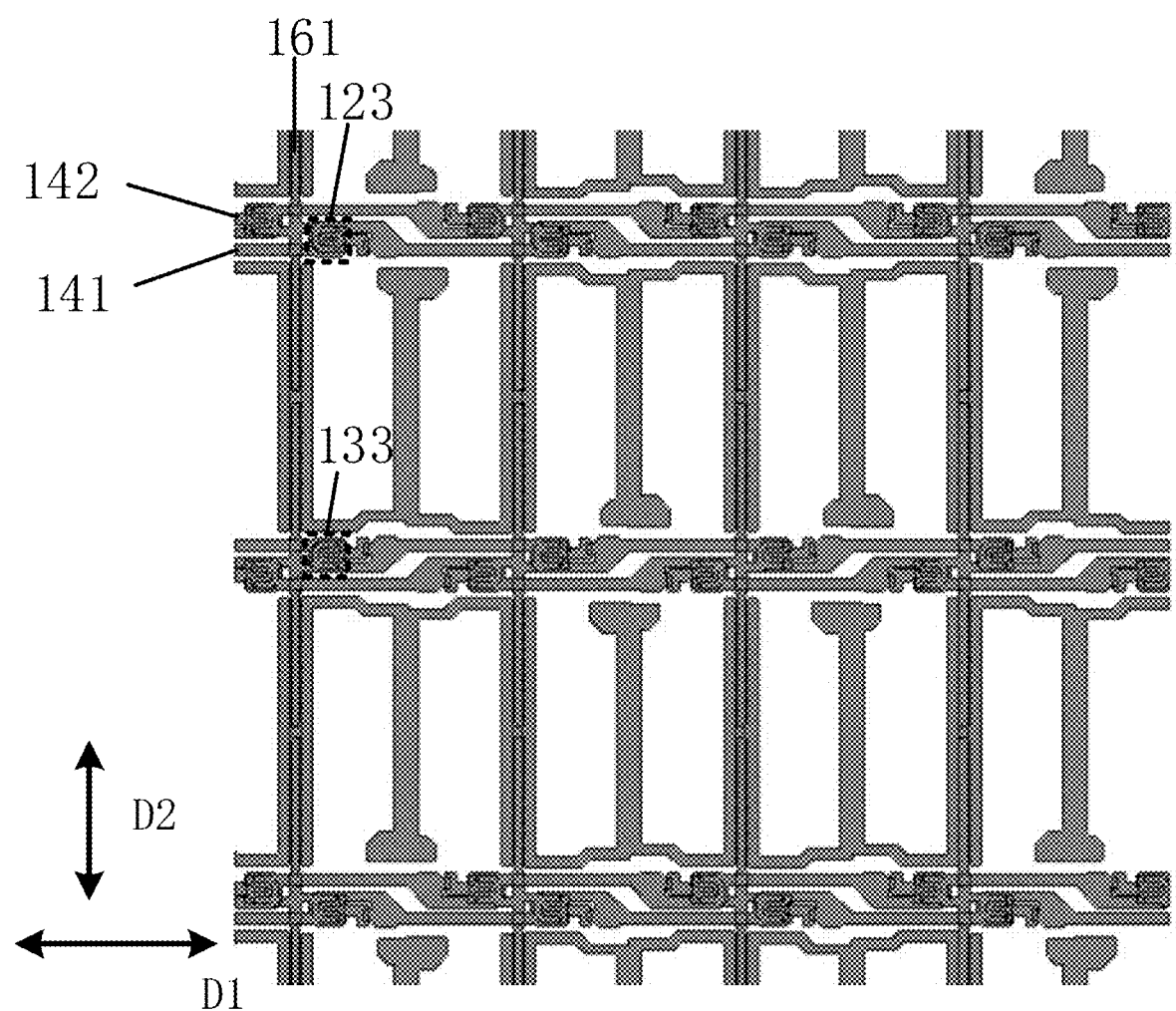
FIG. 7 is a schematic plan view illustrating a first electrode layer, a semiconductor layer, and a second electrode layer of the array substrate as illustrated in FIG. 4A.
Figure 8:
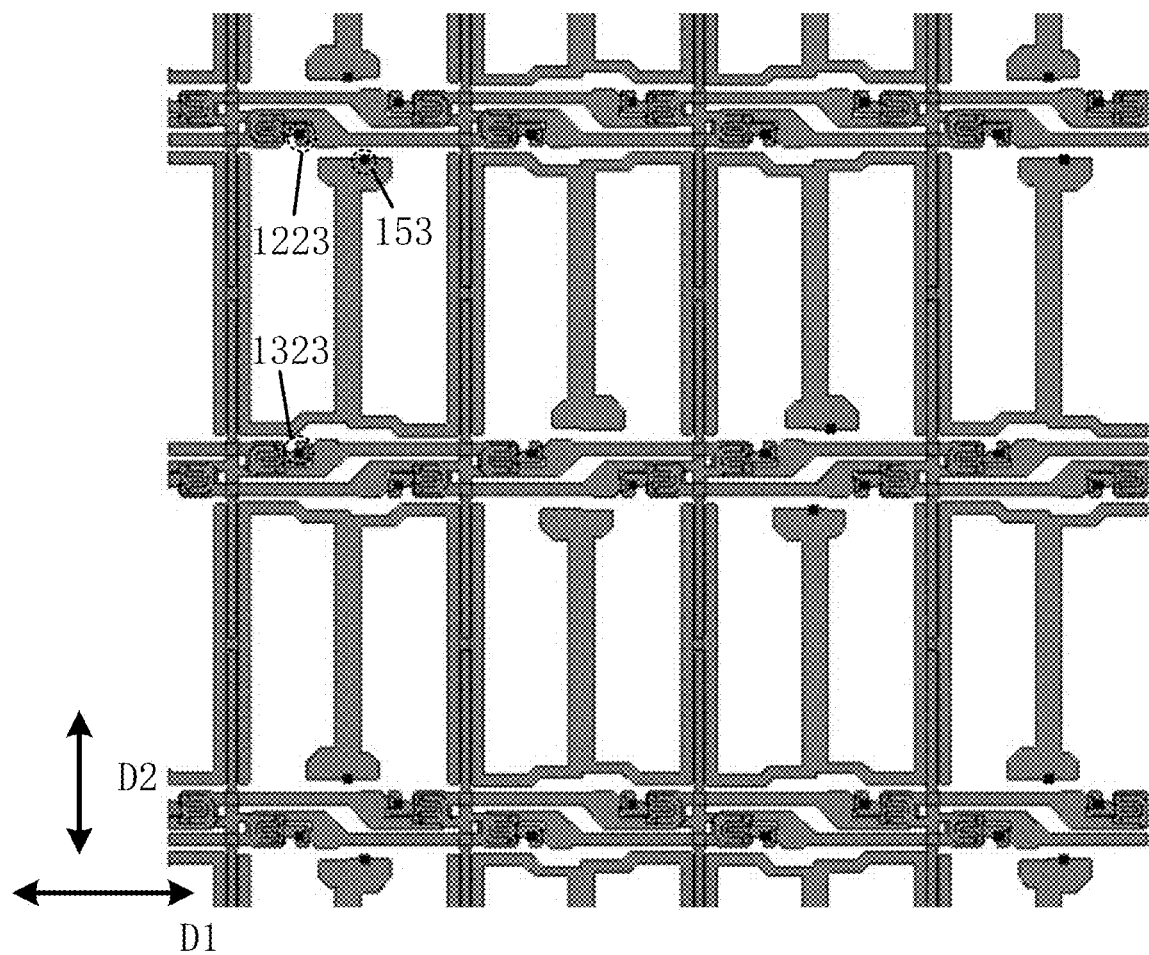
FIG. 8 is a schematic plan view illustrating a first via-hole, a second via-hole, and a third via-hole of the array substrate as illustrated in FIG. 4A.

FIG. 6 is a schematic plan view of the third electrode layer 177 of the array substrate 100 as illustrated in FIG. 4A. FIG. 7 is a schematic plan view of the first electrode layer 172, the semiconductor layer 174, and the second electrode layer 175 of the array substrate 100 as illustrated in FIG. 4A, and FIG. 8 is a schematic plan view of the first via-hole 1223, the second via-hole 1323 and the third via-hole 153 of the array substrate 100 as illustrated in FIG. 4A.

As illustrated in FIGS. 5B, 5C, and 6, the third electrode layer 177 includes a first pixel electrode 121, a first connection portion 122, a second pixel electrode 131, a second connection portion 132, and a second common electrode connection portion 152.

As illustrated in FIGS. 5B, 5C, and 6, the first connection portion 122 includes a first end 1221 and a second end 1222. The first end 1221 of the first connection portion 122 is electrically connected to the first pixel electrode 121 directly. The second end 1222 of the first connection portion 122 is electrically connected to one 1241 of the two first source-drain electrodes through the first via-hole 1223. As illustrated in FIG. 5B and FIG. 5C, the first via-hole 1223 is a half-via-hole, that is, one 1241 of the two first source-drain electrodes covers only a part of the opening area of the first via-hole 1223. As illustrated in FIG. 5B and FIG. 5C, the other part of the opening area of the first via-hole 1223 is located on the side of one 1241 of the two first source-drain electrodes closer to the first pixel electrode 121, and is directly covered by the first pixel electrode 121. That is, the bottom of another part of the opening area of the first via-hole 1223 is in direct contact with the first pixel electrode 121.

As illustrated in FIGS. 6 and 4B, the second connection portion 132 includes a first end 1321 and a second end 1322. The first end 1321 of the second connection portion 132 is electrically connected to the second pixel electrode 131 directly. The second end 1322 of the second connection portion 132 is electrically connected to one 1341 of the two second source-drain electrodes through the second via-hole 1323. As illustrated in FIG. 5D, one 1341 of the two second source-drain electrodes covers only part 1324 of the opening area of the second via-hole 1323, and the other part 1325 of the opening area of the second via-hole 1323 is located on the side of one 1341 of the two second source-drain electrodes closer to the first pixel electrode 121, and is directly covered by the second pixel electrode 131. That is, the bottom of another part 1325 of the opening area of the second via-hole 1323 is in direct contact with the second pixel electrode 131.

It should be noted that the arrangement of the first via-hole 1223 and the second via-hole 1323 is not limited to the arrangement as illustrated in FIGS. 5B and 5C. According to actual application requirements, the first via-hole 1223 and the second via-hole 1323 may also be disposed in other applicable arrangements. The following is an exemplary description with reference to the array substrate 100 as illustrated in FIG. 2A.

Figure 5E:
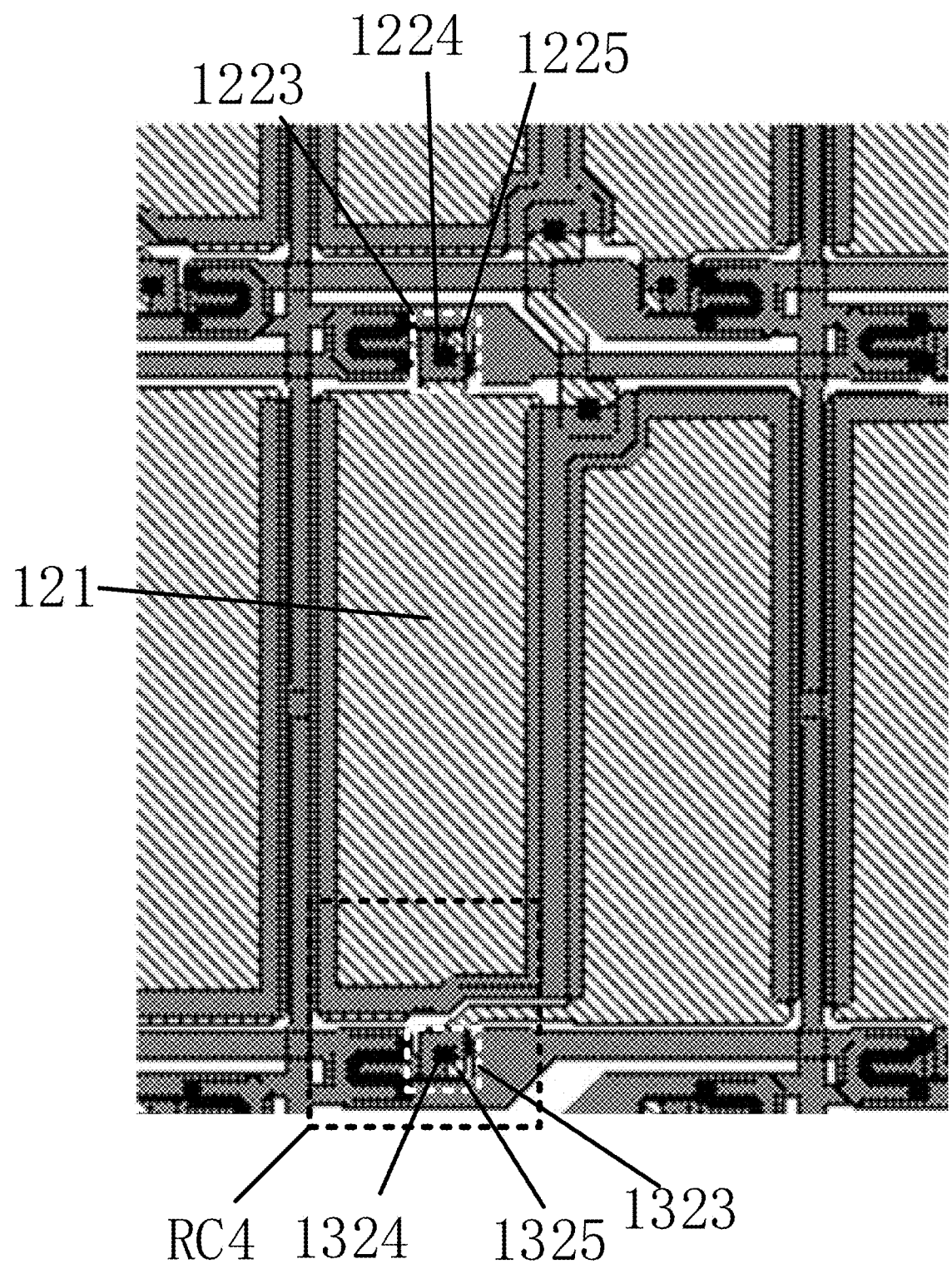
FIG. 5E is a schematic plan view of a partial area of the array substrate as illustrated in FIG. 2A.
Figure 5F:
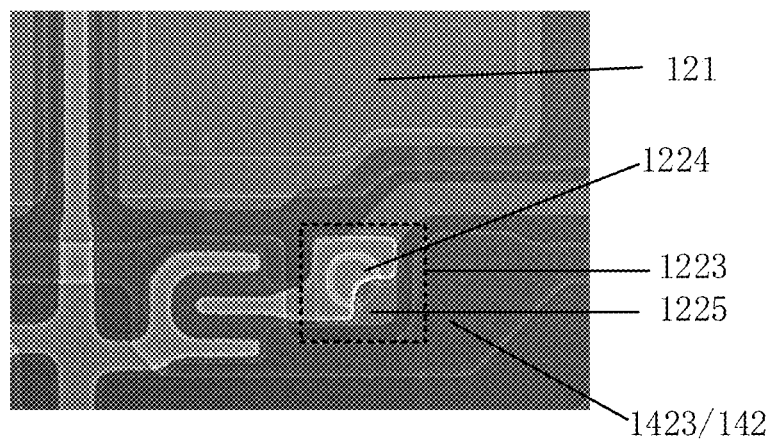
FIG. 5F is a schematic plan view of an area RC4 of the array substrate as illustrated in FIG. 5E.

FIG. 5E illustrates a schematic plan view of a partial area of the array substrate 100 as illustrated in FIG. 2A, and FIG. 5F is a schematic plan view of the area RC4 of the array substrate 100 as illustrated in FIG. 5E (acquired by a scanning electron microscope).

As illustrated in FIGS. 5E and 5F, the first via-hole 1223 and the second via-hole 1323 of the array substrate 100 as illustrated in FIG. 2A are also both semi-via-holes. That is, the one 1241 (e.g., the first drain electrode) of the two first source-drain electrodes of the first switching element 123 covers only a part 1224 of the opening area of the first via-hole 1223; and the one 1341 (e.g., the second drain electrode) of the two second source-drain electrodes of the second switching element 133 covers only a part 1324 of the opening area of the second via-hole 1323.

As illustrated in FIGS. 5E and 5F, the other part 1225 of the opening area of the first via-hole 1223 is located on the side of the one 1241 of the two first source-drain electrodes away from the first pixel electrode 121, and the other part 1325 of the opening area of the second via-hole 1323 is located on the side of the one 1341 of the two first source-drain electrodes away from the first pixel electrode 121. In some examples, in the array substrate as illustrated in FIGS. 5E and 5F, the first line connection portion 1413 may further include a first protrusion, and the second line connection portion 1423 may further include a second protrusion. However, in this case, if the positions of the first protrusion and the second protrusion are offset, the additional first protrusion can be electrically connected (short-circuited) to the first pixel electrode via the first via-hole, and the additional second protrusion can be electrically connected (short-circuited) to the second pixel electrode via the second via-hole. Therefore, as compared to the structure of the first via-hole 1223 illustrated in FIGS. 5E and 5F, by arranging another part 1225 of the opening area of the first via-hole 1223 illustrated in FIGS. 5B and 5C on the side of the one 1241 of the two first source-drain electrodes away from the first pixel electrode 121, it can reduce the risk that the first protrusion 143 and the first connection portion 122 are short-circuited in the array substrate as illustrated in FIGS. 5B and 5C. By arranging another part 1325 of the opening area of the second via-hole 1323 illustrated in FIG. 5F on the side of the one 1341 of the two second source-drain electrodes away from the first pixel electrode 121, it can reduce the risk that the second protrusion 144 and the second connection portion 132 are short-circuited in the array substrate as illustrated in FIGS. 5B and 5C.

The Cgs compensation function and the shaking stripe mitigating function of the array substrate as illustrated in FIG. 4B will be described below with reference to FIGS. 4B and 5B.

As illustrated in FIG. 5B, the orthographic projection of the first gate line 141 on the second conductive layer (the first source-drain layer) overlaps with one 1241 of the two first source-drain electrodes in at least two separate positions. For example, as illustrated in FIG. 5B, the orthographic projection of the first gate line 141 on the first source-drain layer at least partially overlaps with two sides, in the first direction D1, of one 1241 of the two first source-drain electrodes.

For example, by making the orthographic projection of the first gate line 141 on the first source-drain layer at least partially overlap with two sides, in the first direction D1, of one 1241 of the two first source-drain electrodes, it can reduce the variation range of the capacitance formed between the first gate line and the first source-drain layer. Because the variation range of the capacitance formed between the first gate line and the first source-drain layer is positively related to the shaking stripes, by reducing the variation range of the capacitance formed between the first gate line and the first source-drain layer, it can mitigate the shaking stripe defect caused by the offset between the first electrode layer 172 and the mask used for fabricating the second electrode layer 175.

For example, for convenience of description, in the following embodiments, the first source-drain electrode and the second source-drain electrode connected to the data line 161 are respectively referred to as the first source electrode and the second source electrode, and the first source-drain electrode and the second source-drain electrode connected to the pixel electrode are respectively referred to as the first drain electrode and the second drain electrode. However, embodiments of the present disclosure are not limited thereto; in some other embodiments, the first source-drain electrode and the second source-drain electrode connected to the data line 161 are respectively referred to as the first drain electrode and the second drain electrode, and the first source-drain electrode and the second source-drain electrode connected to the pixel electrode are respectively referred to as the first source electrode and the second source electrode.

Figure 5G:
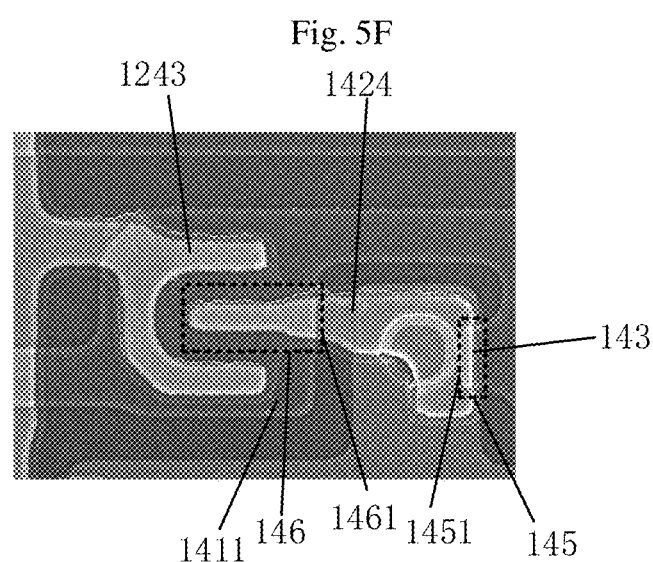
FIG. 5G is a first schematic diagram illustrating an overlapping area between an electrode layer where a gate line of the array substrate as illustrated in FIG. 4A is located and an orthographic projection of an electrode layer where a source-drain electrode is located on the electrode layer where the gate line is located.
Figure 5H:
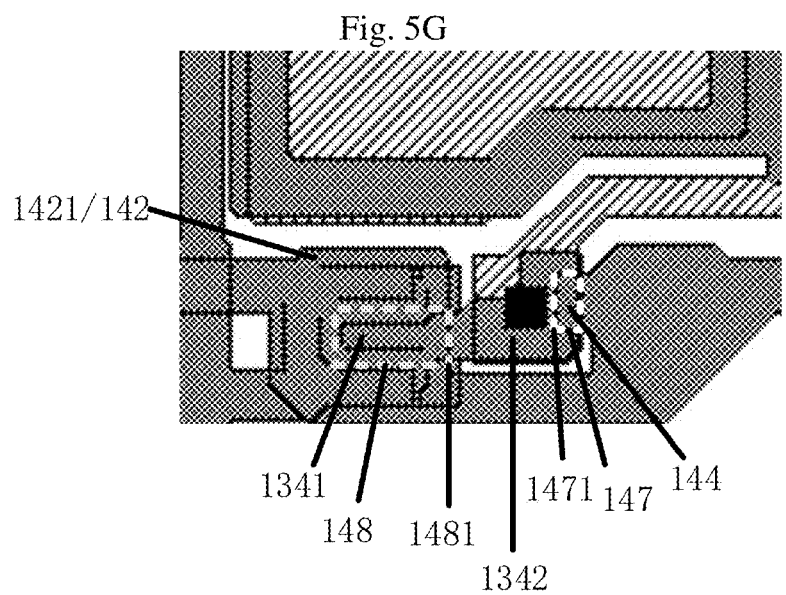
FIG. 5H is a second schematic diagram illustrating an overlapping area between an electrode layer where a gate line of the array substrate as illustrated in FIG. 4A is located and an orthographic projection of an electrode layer where a source-drain electrode is located on the electrode layer where the gate line is located.

FIG. 5G is a first schematic diagram (corresponding to the first switching element) illustrating an overlapping area between the electrode layer where the gate line of the array substrate as illustrated in FIG. 4A is located and an orthographic projection of the electrode layer where the source-drain electrode is located on the electrode layer where the gate line is located; and FIG. 5H is a second schematic diagram (corresponding to the second switching element) illustrating an overlapping area between the electrode layer where the gate line of the array substrate as illustrated in FIG. 4A is located and an orthographic projection of the electrode layer where the source-drain electrode is located on the electrode layer where the gate line is located.

For example, as illustrated in FIG. 5G, in addition to the overlapping between the orthographic projection of the first gate line 141 (the first gate portion 1411 of the first gate line 141) on the first source-drain layer and an area (e.g., the left side), which is closer to the first source electrode, of the first drain electrode, the orthographic projection of the first gate line 141 (the first line connection portion 1413 of the first gate line 141) on the first source-drain layer also overlaps with an area (e.g., the right side), which is away from the first source electrode, of the first drain electrode.

For example, as illustrated in FIG. 5G, the orthographic projection of the first protrusion 143 on one 1241 (e.g., the first drain electrode) of the two first source-drain electrodes at least partially overlaps with the one 1241 (e.g., the first drain electrode) of the two first source-drain electrodes, and the overlapping area between the orthographic projection of the first protrusion 143 on one 1241 (e.g., the first drain electrode) of the two first source-drain electrodes and the one 1241 (e.g., the first drain electrode) of the two first source-drain electrodes is a first overlapping area 145. For example, as illustrated in FIG. 5G, the overlapping area between the orthographic projection of the first gate portion 1411 on the first drain electrode and the first drain electrode is a second overlapping area 146.

As illustrated in FIG. 5G, when the first source-drain layer is offset to the right with respect to the first electrode layer 172 (e.g., the first gate portion 1411), the size of the first overlapping area 145 increases, and the size of the second overlapping area 146 decreases. When the first source-drain layer is offset to the left with respect to the first electrode layer 172 (e.g., the first gate portion 1411), the size of the first overlapping area 145 decreases, and the size of the second overlapping area 146 increases. Therefore, as compared to the example where the first overlapping area 145 is not provided, by providing the first overlapping area 145, the variation range (due to the offset of the first source-drain layer with respect to the first electrode layer 172) of the capacitance (Cgs1) formed between the gate line and the first source-drain layer can be reduced. Thereby it can mitigate the shaking stripe defect of the display panel and the display device including the array substrate 100.

As illustrated in FIG. 5G, the first overlapping area 145 has a first overlapping edge 1451 in the second direction D2 intersecting with the first direction D1, the second overlapping area 146 has a second overlapping edge 1461 in the second direction D2 intersecting with the first direction D1, and the first overlapping edge 1451 has a length the same as that of the second overlapping edge 1461. In this case, the variation range (due to the offset of the first source-drain layer relative to the first electrode layer 172) of the capacitance (Cgs1) formed between the gate line and the first source-drain layer can be further reduced and the variation range of the jump change value of the pixel voltage of the first pixel can be further reduced.

For example, as illustrated in FIG. 5H, the orthographic projection of the second gate line 142 on the second source-drain layer overlaps with one 1341 of the two second source-drain electrodes in at least two different positions. The orthographic projection of the second gate line 142 on the second source-drain layer at least partially overlaps with two sides, opposite in the first direction D1, of one 1341 of the two second source-drain electrodes.

For example, as illustrated in FIG. 5H, in addition to the overlapping between the orthographic projection of the second gate line 142 (the second gate portion 1421 of the second gate line 142) on the second source-drain layer and an area, which is closer to the second source electrode, of the second drain electrode, the orthographic projection of the second gate line 142 (the second line connection portion 1423 of the second gate line 142) on the second source-drain layer also overlaps with an area of the second drain electrode away from the side of the second source electrode.

For example, as illustrated in FIG. 5H, the orthographic projection of the second protrusion 144 on one 1341 (e.g., the second drain electrode) of the two second source-drain electrodes at least partially overlaps with the one 1341 (e.g., the second drain electrode) of the two second source-drain electrodes, and the overlapping area between the orthographic projection of the second protrusion 144 on one 1341 (e.g., the second drain electrode) of the two second source-drain electrodes and the one 1341 (e.g., the second drain electrode) of the two second source-drain electrodes is a third overlapping area 147. For example, as illustrated in FIG. 5H, the overlapping area between the orthographic projection of the second gate portion 1421 on the second drain electrode and the second drain electrode is a fourth overlapping area 148. For example, as compared to the example in which the third overlapping area 147 is not provided, by providing the third overlapping area 147, the variation range (due to the offset of the second source-drain layer with respect to the first electrode layer 172) of the capacitance (Cgs2) formed between the gate line and the second source-drain layer can be reduced, such that the shaking stripe defect of the display panel and the display device including the array substrate 100 can be mitigated.

For example, the third overlapping area 147 has a third overlapping edge 1471 in the second direction D2 intersecting with the first direction D1, and the fourth overlapping area 148 has a fourth overlapping edge 1481 in the second direction D2 intersecting with the first direction D1. The third overlapping edge 1471 has a length the same as that of the fourth overlapping edge 1481. In this case, the variation range (due to the offset of the second source-drain layer relative to the first electrode layer 172) of the capacitance (Cgs2) formed between the gate line and the second source-drain layer can be further reduced and the variation range of the jump change value of the pixel voltage of the second pixel can be further reduced.

In some examples, the planar shapes of the first overlapping area 145, the second overlapping area 146, the third overlapping area 147, and the fourth overlapping area 148 are substantially rectangular. The size of the first overlapping area 145 in the second direction D2 is equal to the size of the second overlapping area 146 in the second direction D2, and the size of the third overlapping area 147 in the second direction D2 is equal to the size of the fourth overlapping area 148 in the second direction D2. It should be noted that, in some examples, when determining the second overlapping area 146, the first semiconductor layer 125 disposed between the first gate portion 1411 and the first drain can be taken into consideration, that is, the overlapping area between the first gate portion 1411 and the orthographic projection of the combined structure of the first drain electrode and the first semiconductor layer 125 on the first gate portion 1411 is taken as the second overlapping area 146; and correspondingly, when determining the fourth overlapping area 148, the overlapping area between the second gate portion 1421 and the orthographic projection of the combined structure of the second drain electrode and the second semiconductor layer on the second gate portion 1421 is taken as the fourth overlapping area 148.

For example, the area of the overlapping area between the orthographic projection of the first gate line 141 on the first source-drain layer and one 1241 of the two first source-drain electrodes is a first value, and the area of the overlapping area between the orthographic projection of the second gate line 142 on the second source-drain layer and one 1341 of the two second source-drain electrodes is a second value, and the first value is equal to the second value; in this case, the capacitance (Cgs1) formed between the gate line and the first source-drain layer and the capacitance (Cgs2) formed between the gate line and the second source-drain layer are equal to each other, and the jump change value of pixel voltage of the first pixel and the jump change value of pixel voltage of the second pixel are relatively approximate (e.g., equal) to each other. Thereby it can further mitigate the shaking stripe defect of the display panel and the display device including the array substrate 100.

Figure 9:
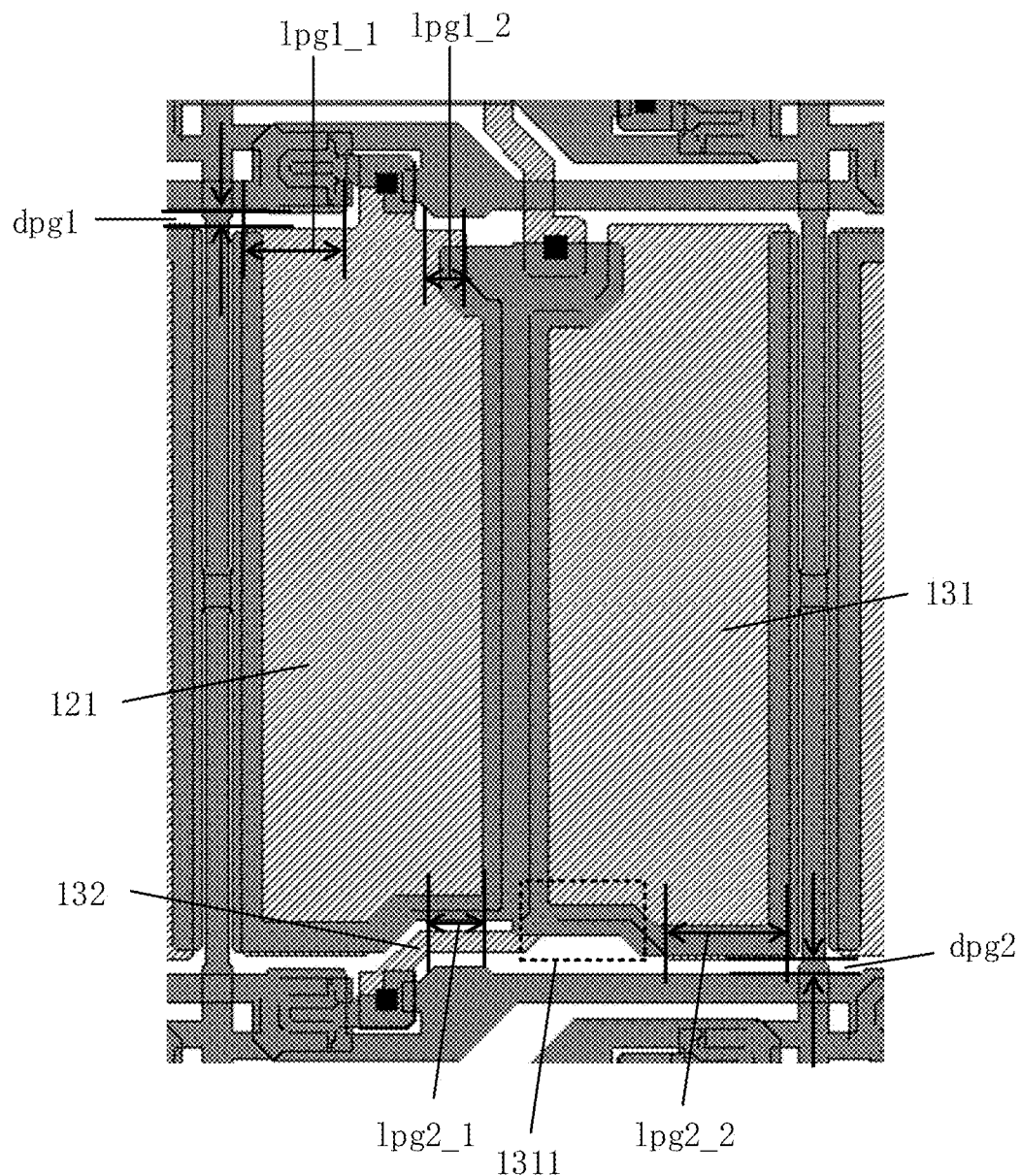
FIG. 9 is a schematic diagram illustrating a distance and an overlapping length between a pixel electrode of the array substrate as illustrated in FIG. 4A and the gate line for driving the pixel where the pixel electrode is located.

The following describes other technical solutions for improving the display evenness of the display panel including the array substrate as illustrated in FIG. 4A with reference to FIG. 9.

In an example, the first pixel electrode 121 and the gate line for driving the first pixel overlap with each other in the second direction D2, and the second pixel electrode 131 and the gate line for driving the second pixel overlap with each other in the second direction D2. FIG. 9 illustrates a schematic diagram of a distance and an overlapping length between a pixel electrode provided by at least one embodiment of the present disclosure and the gate line for driving the pixel where the pixel electrode is located.

As illustrated in FIG. 9, the lateral distance dpg1 between the first pixel electrode 121 and the gate line for driving the first pixel is a distance between an edge, which is closer to the gate line (e.g., the first gate line 141 as illustrated in FIG. 9) for driving the first pixel, of the first pixel electrode 121 and the gate line for driving the first pixel, and the lateral distance dpg2 between the second pixel electrode 131 and the gate line (e.g., the second gate line 142 as illustrated in FIG. 9) for driving the second pixel is a distance between an edge, which is closer to the gate line for driving the second pixel, of the second pixel electrode 131 and the gate line for driving the second pixel. For example, because the distance between the third electrode layer 177 where the first pixel electrode 121 is located and the first electrode layer 172 where the gate line for driving the first pixel is located (the distance in the direction perpendicular to the first electrode layer 172) is small, as illustrated in FIG. 9, the distance between the first pixel electrode 121 and the gate line for driving the first pixel (e.g., the first gate line 141 illustrated in FIG. 9) in the second direction D2 can be taken as the lateral distance dpg1, and the distance between the second pixel electrode 131 and the gate line for driving the second pixel (e.g., the second gate line 142 illustrated in FIG. 9) in the second direction D2 is taken as the lateral distance dpg2. The lateral distance of other embodiments of the present disclosure has a similar definition and will not be repeated.

As illustrated in FIG. 9, the effective overlapping length between the gate line for driving the first pixel and the combined structure of the first pixel electrode 121 and the first connection portion 122 refers to a length in the first direction D1 of an area of the gate line for driving the first pixel, in which the lateral distance dpg1 corresponding to the area is less than or equal to a predetermined distance (e.g., six microns); the effective overlapping length between the gate line for driving the second pixel and the combined structure of the second pixel electrode 131 and the second connection portion 132 refers to a length in the first direction D1 of an area of the gate line for driving the second pixel, in which the lateral distance dpg2 corresponding to the area is less than or equal to a predetermined distance (e.g., six microns).

In an example, the lateral distance between the first pixel electrode 121 and the gate line for driving the first pixel is larger than five microns, and the lateral distance between the second pixel electrode 131 and the gate line for driving the second pixel is larger than five microns. For example, the inventors of the present disclosure have discovered through a plurality of experiments and analyses that by making the lateral distance between the first pixel electrode 121 and the gate line for driving the first pixel larger than five microns, it is possible to reduce the influence of the following factors on the capacitance Cpg of the first pixel: a variation (e.g., a variation due to manufacturing processes) of the lateral distance between the first pixel electrode 121 and the gate line for driving the first pixel; variation in the effective overlapping length between the gate line for driving the first pixel and the combined structure of the first pixel electrode 121 and the first connection portion 122. By making a lateral distance between the second pixel electrode 131 and the gate line driving the second pixel larger than five microns, it is possible to reduce the influence of the following factors on the capacitance Cpg of the second pixel: a variation of the lateral distance between the second pixel electrode 131 and the gate line for driving the second pixel; variation in the effective overlapping length between the gate line for driving the second pixel and the combined structure of the second pixel electrode 131 and the second connection portion 132. Therefore, the requirement for the manufacturing process can be reduced without degrading the display evenness.

In an example, as illustrated in FIG. 9, the extension length of the first connection portion 122 is smaller than the extension length of the second connection portion 132, and the effective overlapping length between the first gate line and the combined structure of the first pixel electrode and the first connection portion is smaller than the effective overlapping length between the second gate line and the combined structure of the second pixel electrode and the second connection portion, and a recessed structure is provided at the edge of the second pixel electrode 131 closer to the gate line for driving the second pixel.

For example, by making the edge of the pixel electrode of the long connection pixel (e.g., the second pixel) closer to the gate line for driving the long connection pixel have a recessed portion, it is possible to shorten the effective overlapping length lpg between the gate line and the combined structure of the pixel electrode and the connection portion of the long connection pixel. In this case, the effective overlapping length between the gate line and the combined structure of the pixel electrode and the connection portion of the long connection pixel can be more approximate to the effective overlapping length between the gate line and the combined structure of the pixel electrode and the connection portion of the short connection pixel (e.g., the first pixel), and thus the capacitance Cpg of long connection pixel can be more approximate to the capacitance Cpg of the short connection pixel, thereby further mitigating the shaking stripe defect.

In an example, the effective overlapping length between the gate line for driving the first pixel and the combined structure of the first pixel electrode 121 and the first connection portion 122 is equal to the effective overlapping length between the gate line for driving the second pixel and the combined structure of the second pixel electrode 131 and the second connection portion 132, thereby it can further mitigate the shaking stripe defect.

In an example, the first pixel electrode 121 and the gate line adjacent to the first pixel electrode 121 (but not for driving the first pixel where the first pixel electrode 121 is located) overlap with each other in the second direction D2;

the second pixel electrode 131 and the gate line adjacent to the second pixel electrode 131 (but not for driving the second pixel where the second pixel electrode 131 is located) overlap with each other in the second direction D2.

It should be noted that when the gate line adjacent to the second pixel electrode 131 is located above the above second pixel electrode 131, the gate line adjacent to the second pixel electrode 131 has little influence or no influence on the charging process of the above second pixel electrode 131, and therefore, when describing the influence of Cpg' on the display evenness of the display panel below, the second pixel electrode 131 of the long connection pixel is disposed above the gate line (but not for driving the above pixel) adjacent to the second pixel electrode 131, that is, the first pixel electrode 121 and the second pixel electrode 131 involved in describing the influence of Cpg' on the display evenness of the display panel below are not located in the same pixel unit group but in the same column.

In some examples, in order to further reduce the influence of the capacitances Cpg' of the long connection pixels and the short connection pixels on the display evenness of the display panel, and to mitigate the shaking stripe defect, the lateral distance dpg1' (e.g., the distance between the first pixel electrode 121 and the gate line adjacent to the first pixel electrode 121 in the second direction D2) and the lateral distance dpg2' (e.g., the distance between the second pixel electrode 131 and the gate line adjacent to the second pixel electrode 131 in the second direction D2) can be made as large as possible, and the effective overlapping length lpg1' (e.g., the effective overlapping length between the first pixel electrode 121 and the gate line adjacent to the first pixel electrode 121) can be made equal to the effective overlapping length lpg2' (e.g., the effective overlapping length between the second pixel electrode 131 and the gate line adjacent to the second pixel electrode 131), or the influence of the capacitance Cpg of the long connection pixels and the short connection pixels on the display evenness of the display panel can be made exactly the same or similar.

Figure 10:
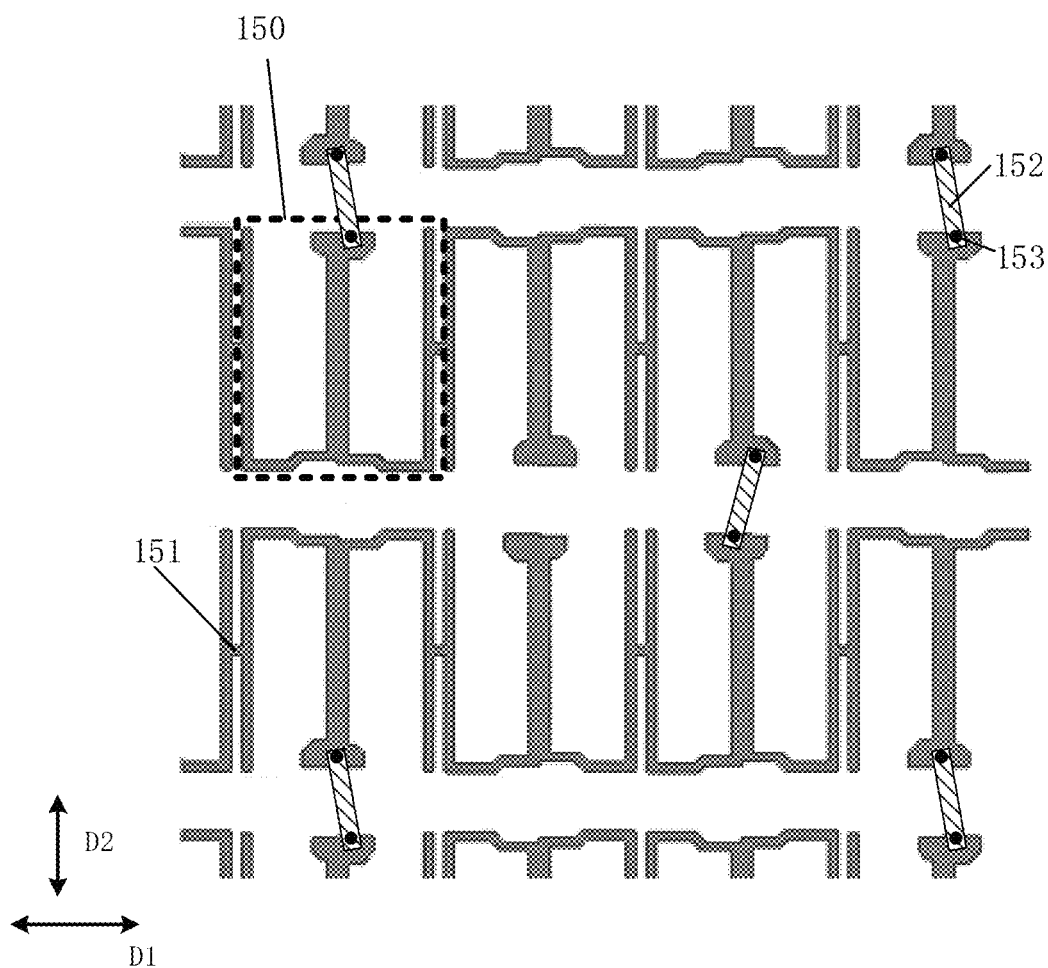
FIG. 10 is a schematic plan view of a plurality of common electrode patterns of the array substrate as illustrated in FIG. 4A.
Figure 11:
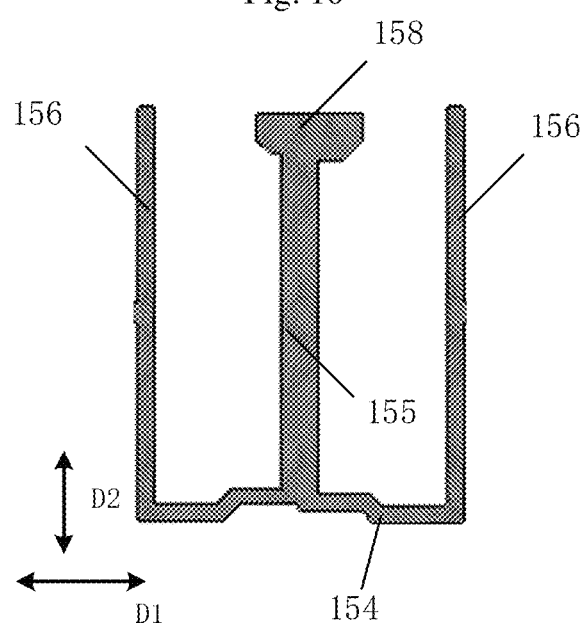
FIG. 11 is a schematic plan view of one of a plurality of common electrode patterns of the array substrate as illustrated in FIG. 4A.

The structure of the plurality of common electrode patterns 150 and the connection relationship between the plurality of common electrode patterns 150 will be explained below with reference to FIGS. 10 and 11. FIG. 10 is a schematic plan view of common electrode patterns 150, which are arranged in an array, of an array substrate 100 provided by at least one embodiment of the present disclosure. FIG. 11 is a schematic plan view of a common electrode pattern 150 of the array substrate 100 provided by at least one embodiment of the present disclosure.

As illustrated in FIG. 10, the common electrode patterns 150 that are adjacent in the first direction D1 are electrically connected to each other through first common electrode connection portions 151. The first common electrode connection portions 151 and the common electrode patterns 150 are on the same layer and common electrode patterns 150 in different rows are disposed spaced apart from each other.

As illustrated in FIG. 10, the common electrode patterns 150 that are adjacent in the second direction D2 are electrically connected to each other through second common electrode connection portions 152. The second common electrode connection portions 152 and the first connection portions 122 are on the same layer, and the second common electrode connection portion 152 and corresponding common electrode patterns 150 are electrically connected through a third via-hole 153.

As illustrated in FIGS. 10 and 11, at least one (each) common electrode pattern 150 includes a body portion 154 and a first protrusion 155 protruding from the first side of the body portion 154 and two second protrusions 156. The first protrusion 155 and the two second protrusions 156 respectively extend along the second direction D2; the first protrusion 155 is provided between the two second protrusions 156 in the first direction D1. The first common electrode connection portion 151 is disposed between second protrusions 156 of two common electrode patterns 150 that are adjacent in the first direction D1, and both ends of the first common electrode connection portion 151 are electrically connected to the second protrusions 156 of the two common electrode patterns 150 that are adjacent in the first direction D1 directly and respectively.

As illustrated in FIG. 10, common electrode patterns 150 that are adjacent in the second direction D2 are electrically connected to each other through the first protrusions 155 of the common electrode patterns 150 that are adjacent in the second direction D2 and a third via-hole 153. For example, the end of the first protruding portion 155 that is not connected to the body portion 154 includes an enlarged portion 158, and the common electrode patterns 150 that are adjacent in the second direction D2 are electrically connected to each other through the enlarged portions 158 of the common electrode patterns 150 that are adjacent in the second direction D2, the third via-hole 153 and the second common electrode connection portion 152. For example, by making the end of the first protruding portion 155 not connected to the body portion 154 include the enlarged portion 158, the freedom degree of design of the second common electrode connection portions 152 can be improved.

It should be noted that the second common electrode connection portions 152 illustrated in FIG. 10 are only used to schematically show the connection manner of the common electrode patterns 150 in different rows, but the shapes and structures of the second common electrode connection portions 152 are not limited to this case. For example, the second common electrode connection portions 152 may also adopt the shapes and structures of the second common electrode connection portions 152 illustrated in FIG. 6, details of which will not be elaborated here.

As illustrated in FIG. 10, the planar shape of the at least one (each) common electrode pattern 150 may be an "E" pattern, and the opening direction of the at least one (each) common electrode pattern 150 (that is, the opening direction of the "E" pattern) and the opening direction of the common electrode patterns 150 that are adjacent with the at least one (each) common electrode pattern 150 in the column direction are opposite directions. For example, the body portion 154 of each common electrode pattern 150 is disposed opposite to the body portion 154 of the common electrode pattern 150 that is adjacent to the each common electrode pattern 150 in the second direction, and the opening direction of each common electrode pattern 150 and the opening direction of other common electrode pattern 150 that are adjacent with the each common electrode pattern 150 in the second direction are opposite directions.

In an example, as illustrated in FIG. 10, for the common electrode patterns in the same column, the opening directions of common electrode patterns 150 in the odd-numbered columns are the same, and the opening directions of common electrode patterns 150 in the even-numbered columns are the same. The opening directions of two common electrode patterns 150 adjacent in the second direction are different from each other.

As illustrated in FIG. 10, the edge, which is on the side away from the first protrusion 155 of the common electrode pattern 150, of the body portion 154 of at least one (each) common electrode pattern 150 has a recessed portion, and, as illustrated in FIG. 4B, the recessed portion of the body portion 154 of at least one (each) common electrode pattern 150 corresponds to (e.g., at least partially overlaps with) the recessed portion of a corresponding common electrode pattern 150.

For example, as illustrated in FIGS. 4B, 6 and 10, in the second direction, the body portion 154 of each common electrode pattern 150 is provided at one side of the second connection portion 132 of the pixel unit group 110 corresponding to the common electrode pattern 150, and the opening of each common electrode pattern 150 is provided in the second direction at one side of the first connection portion 122 of the pixel unit group 110 corresponding to the common electrode pattern 150.

It should be noted that, in some examples, the common electrode pattern 150 can also be referred to as a common electrode line or a common data line.

In some examples (for a TN mode display panel), the opposite substrate of the display panel further includes a common electrode layer (e.g., made of a transparent conductive material such as ITO), and the common electrode layer and the common electrode pattern 150 are electrically connected through a conductive portion (e.g., a conductive gold ball).

In other examples (for display panels based on advanced super-dimensional field conversion technology), the array substrate further includes a common electrode layer (e.g., a patterned common electrode layer, which is insulated from gate lines), the common electrode pattern 150 is electrically connected to the common electrode layer. For example, the common electrode pattern 150 and the common electrode layer can be directly electrically connected or connected through a via-hole. For example, when the common electrode pattern 150 is directly electrically connected to the common electrode layer, the common electrode layer may be located on the side of the common electrode pattern 150 away from the data line.

At least one embodiment of the present disclosure further provides an experimental analysis method for shaking stripes. It is obtained through the analysis of experimental data that, when the display panel displays an image with a gray scale of 127 and pixels differ by 6 gray levels, shaking stripes can be clearly observed. The following is an experimental analysis method for shaking stripes and an experimental scheme for shaking stripe research.

For example, the experimental equipment used for shaking stripe research includes a lighting machine, a detector (e.g., model CA310), and a DC power supply.

The experiment of shaking stripe research includes the following steps S501-S505.

Step S501: The sample to be inspected (a display panel) is subjected to external common voltage Vcom processing, that is, a common voltage Vcom is applied to the common electrode or common electrode pattern in the display panel with a DC power supply (DC voltage) outside the display panel.

Step S502: A picture is edited with the lighting machine, the pixels of the same structure and the same polarity (127 gray levels) are lit up, and the other pixels are not lit (0 gray levels).

Step S503: The measuring probe of the detector (e.g., model CA310) is placed vertically in the middle of the sample to test its flicker degree (flicker value).

Step S504: The common voltage Vcom is adjusted until the flicker value is minimum, in this case, the common voltage Vcom is the optimal common voltage Vcom for the pixel structure.

Step S505: For all sub-pixels in a cycle, the above steps S501-S504 are repeated until the optimal common voltages Vcom of all sub-pixels (12) in a cycle are tested.

Then, based on the above test results, the shaking stripe analysis was conducted.

According to the mechanism of flicker, when the flicker value is the minimum, the brightness of the positive and negative frames of the pixels can be considered to be the same at this time. Therefore, when the flicker value is the minimum, the relationship between the jump change value ΔVp of the pixel voltage and the common voltage Vcom is illustrated as follows, Vcom=Vcenter−ΔVp.

Therefore, when the flicker value is the minimum, the common voltage Vcom is inversely proportional to the jump change value ΔVp of the pixel voltage, thereby from the difference in Vcom, difference in the jump change values ΔVp of the pixel voltages between different pixels can be calculated.

Table 1 illustrates the optimal common voltage Vcom of pixels, in a cycle (pixels P1-P6), of a 21.5-inch twisted nematic display panel (Full HD). The pixels P1-P6 are respectively red, green, blue, red, green, and blue sub-pixels.

TABLE 1

| | | \multicolumn{6}{c}{optimal common voltage of sub-pixels of 21.5-inch twisted nematic display panel (Full HD)} | | | | | |
|---|---|---|---|---|---|---|---|
| | | P1 | P2 | P3 | P4 | P5 | P6 |
| shaking stripes | First Row | 6.25 | 6.25 | 6.23 | 6.26 | 6.25 | 6.25 |
| | First Row | 6.2 | 6.19 | 6.2 | 6.2 | 6.2 | 6.21 |
| no shaking stripes | First Row | 6.22 | 6.24 | 6.23 | 6.22 | 6.24 | 6.22 |
| | First Row | 6.23 | 6.26 | 6.25 | 6.23 | 6.26 | 6.23 |

As illustrated in Table 1, when the display panel has shaking stripe defect, difference of the optimal common voltages Vcom of different sub-pixels is 0.05V; when the display panel does not have shaking stripe defect, difference of the optimal common voltages Vcom of different sub-pixels is 0.02V. For example, based on the data in Table 1, a VT curve (that is, a curve illustrating the relationship between the voltage and the transmittance of the display panel) around the gray level of 127 can be fitted, and combined with the gamma curve it can be obtained that the pixel voltage difference is 0.05 V, when the gray scale difference is 6 gray scales, the shaking stripes are more apparent.

At least one embodiment of the present disclosure further provides a display panel including any array substrate provided by the embodiments of the present disclosure. At least one embodiment of the present disclosure further provides a display device including any array substrate provided by the embodiments of the present disclosure or any display panel provided by the embodiments of the present disclosure.

Figure 12:
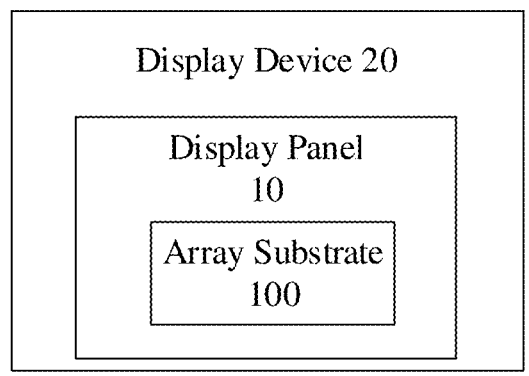
FIG. 12 is an exemplary block diagram of a display panel and a display device provided by at least one embodiment of the present disclosure.

FIG. 12 illustrates an exemplary block diagram of a display panel and an exemplary block diagram of a display device. As illustrated in FIG. 12, the display panel 10 includes an array substrate 100, and the display device includes the display panel 10.

It should be noted that other components of the display substrate 10 and the display device 20 (e.g., thin film transistors, control devices, image data encoding/decoding devices, row scan drivers, column scan drivers, clock circuits, etc.) can adopt suitable components, which should be understood by those ordinary skilled in the art, and will not be elaborated here and should not be taken as a limitation to the present disclosure. The display substrate 10 and the display device 20 can improve the aperture ratio or serve as a basis to improve the aperture ratio.

At least one embodiment of the present disclosure further provides a method for manufacturing an array substrate, which includes: forming a pixel unit group. The pixel unit group includes a first pixel and a second pixel arranged side by side in the first direction. The first pixel includes a first pixel electrode, a first switching element, and a first connection portion extending and protruding from the first pixel electrode. The second pixel includes a second pixel electrode, a second switching element, and a second connection portion extending and protruding from the second pixel electrode. The first pixel electrode and the first switching element are electrically connected to each other via the first connection portion, the second pixel electrode and the second switching element are electrically connected to each other via the second connection portion; and a length of the first connection is not equal to a length of the second connection.

For example, forming the pixel unit group includes: patterning a same film layer through a same patterning process to form the first connection portion, the first pixel electrode, the second connection portion, and the second pixel electrode.

For example, the manufacturing method for an array substrate may include the following steps S101-S108.

Step S101: providing a base substrate.

Step S102: forming a first electrode layer on the base substrate.

Step S103: forming a first insulating layer on the base substrate on which the first electrode layer is formed.

Step S104: forming a semiconductor layer on the base substrate on which the first insulating layer is formed.

Step S105: forming a second electrode layer on the base substrate on which the semiconductor layer is formed.

Step S106: forming a second insulating layer on the base substrate on which the second electrode layer is formed.

Step S107: forming a first via-hole, a second via-hole and a third via-hole in the second insulating layer.

Step S108: forming a third electrode layer on the base substrate on which the first via-hole, the second via-hole, and the third via-hole are formed.

Exemplary description of the manufacturing method for an array substrate provided by at least one embodiment of the present disclosure will be given below with the array substrate as illustrated in FIG. 4A.

For example, the base substrate can be a glass substrate, a quartz substrate, a plastic substrate (e.g., a polyethylene terephthalate (PET) substrate), or a substrate made of other suitable materials.

For example, the first electrode layer (see FIG. 4C) includes a plurality of first gate lines, a plurality of second gate lines, common electrode patterns arranged in an array, and a plurality of first common electrode connection portions. For example, the step S102 includes: forming a first electrode film on the base substrate; patterning the first electrode film through the same patterning process to form the plurality of first gate lines, the plurality of second gate lines, the common electrode patterns arranged in an array, and the plurality of first common electrode connection portions, that is, forming a first electrode layer. For example, the first electrode layer may be made of a metal material (e.g., copper, aluminum, or aluminum alloy) or other suitable materials.

For example, the material of the first insulating layer (see FIG. 5C) may be silicon oxide (SiOx), silicon oxynitride (SiNxOy), silicon nitride (SiNx), or other suitable materials.

For example, the material of the semiconductor layer (see FIGS. 5A and 5C) may be made of an oxide semiconductor material, but the embodiments of the present disclosure are not limited thereto. For example, the oxide semiconductor material can include, for example, ZnO, MgZnO, Zn—Sn—O (ZTO), In—Zn—O (IZO), SnO2, Ga2O3, In—Ga—O (IGO), In2O3, In—Sn—O (ITO), In—Ga—Zn—O (IGZO), In—Zn—Sn—O (IZTO), In—Ga—Zn—Sn—O (IGZTO), InAlZnO (IAZO), etc., but the semiconductor layer provided by the embodiment of the present disclosure is not limited to be made of the specific oxide semiconductor material described above.

For example, the second electrode layer (see FIG. 5A) includes a plurality of data lines and source and drain electrodes of a plurality of switching elements. For example, step S105 includes: forming a second electrode film on the semiconductor layer; patterning the second electrode film through the same patterning process to form the plurality of data lines and the source and drain electrodes of the plurality of switching elements, that is, forming a second metal layer. For example, the second electrode layer may be made of a metal material (e.g., copper, aluminum, or aluminum alloy) or other suitable materials.

For example, the second insulating layer may be made of inorganic or organic materials. For example, the second insulating layer may be made of organic resin, silicon oxide (SiOx), silicon oxynitride (SiNxOy), or silicon nitride (SiNx).

For example, in step S107, the first via-hole is formed at a position in the second insulating layer corresponding to the end, which is away from an U-shaped electrode (the other of the two first source-drain electrodes), of one of the two first source-drain electrodes, the second via-hole is formed at a position in the second insulating layer corresponding to the end, which is away from an U-shaped electrode (the other of the two second source-drain electrodes), of one of the two second source-drain electrodes, and the third via-hole is formed at a position in the second insulating layer corresponding to the first protrusion of the common electrode pattern (e.g., the enlarged portion 158 of the first protrusion).

For example, the third electrode layer 177 (see FIG. 6) includes a first pixel electrode, a second pixel electrode, a first connection portion, a second connection portion, and a second common electrode connection portion.

For example, step S108 includes: forming a third electrode film on the base substrate on which the first via-hole, the second via-hole, and the third via-hole are formed; patterning the third electrode film through the same patterning process to form the first pixel electrode, the second pixel electrode, the first connection portion, the second connection portion, and the second common electrode connection portion. For example, the third electrode layer may be made of a transparent conductive material. For example, the transparent conductive material is indium tin oxide (ITO) or indium zinc oxide (IZO).

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. An array substrate, comprising a pixel unit group,
wherein the pixel unit group comprises a first pixel and a second pixel arranged side by side and immediately adjacent to each other in a first direction;
the first pixel comprises a first pixel electrode, a first switching element, and a first connection portion extending and protruding from the first pixel electrode;
the second pixel comprises a second pixel electrode, a second switching element, and a second connection portion extending and protruding from the second pixel electrode;
the first pixel electrode and the first switching element are electrically connected to each other via the first connection portion;
the second pixel electrode and the second switching element are electrically connected to each other via the second connection portion; and
an extension length of the first connection portion is not equal to an extension length of the second connection portion;
the first switching element comprises a first source-drain layer, and the first source-drain layer comprises two first source-drain electrode which are opposite to each other and spaced apart;
the second switching element comprises a second source-drain layer, and the second source-drain layer comprises two second source-drain electrodes which are opposite to each other and spaced apart;
the first connection portion is directly and electrically connected to the first pixel electrode, and the first connection portion is electrically connected to one of the two first source-drain electrodes via a first via-hole; and
the second connection portion is directly and electrically connected to the second pixel electrode, and the second connection portion is electrically connected to one of the two second source-drain electrodes via a second via-hole;
the one of the two first source-drain electrodes covers part of an opening area of the first via-hole, and other part of the opening area of the first via-hole is on a side of the one of the first source-drain electrodes closer to the first pixel electrode; and
the one of the two second source-drain electrodes covers part of an opening area of the second via-hole, and other part of the opening area of the second via-hole is on a side of the one of the second source-drain electrodes closer to the first pixel electrode.

2. The array substrate according to claim 1, wherein the pixel unit group comprises a first edge and a second edge which are opposite to each other in the first direction; and
both of the first switching element and the second switching element are closer to the first edge of the pixel unit group than to the second edge in the first direction.

3. The array substrate according to claim 1, wherein the first pixel electrode is between the first switching element and the second switching element in a second direction intersecting with the first direction;
an extending and a protruding direction of the first connection portion is the second direction, and an extending and a protruding direction of the second connection portion is the first direction;
in the second direction, the second connection portion at least partially overlaps with the first pixel electrode; and
the first switching element and the second switching element are arranged symmetrically with respect to a center line, which extends along the first direction, of the first pixel electrode in the second direction.

4. The array substrate according to claim 1, wherein the first connection portion and the first pixel electrode are integrally formed and made of a same material, and the second connection portion and the second pixel electrodes are integrally formed and made of a same material.

5. The array substrate according to claim 1, wherein the array substrate further comprises a first gate line and a second gate line which are respectively extending in the first direction;
the first gate line and the second gate line are on two sides of the pixel unit group in a second direction intersecting with the first direction; and
an orthographic projection of the first gate line on the first source-drain layer overlaps with the one of the two first source-drain electrodes in at least two separate positions, or, an orthographic projection of the second gate line on the second source-drain layer overlaps with the one of the two second source-drain electrodes in at least two separate positions.

6. The array substrate according to claim 1, wherein the array substrate further comprises a first gate line and a second gate line which are respectively extending in the first direction;
the first gate line and the second gate line are on two sides of the pixel unit group in a second direction intersecting with the first direction; and
an orthographic projection of the first gate line on the first source-drain layer overlaps with the one of the two first source-drain electrodes in at least two separate positions, and an orthographic projection of the second gate line on the second source-drain layer overlaps with the one of the two second source-drain electrodes in at least two separate positions.

7. The array substrate according to claim 6, wherein the first gate line comprises a first gate portion, a first line portion, and a first line connection portion connected in sequence;
the second gate line comprises a second gate portion, a second line portion, and a second line connection portion connected in sequence;
the first gate portion is configured as a gate electrode of the first switching element, and the second gate portion is configured as a gate electrode of the second switching element;
the orthographic projection of the first gate line on the first source-drain layer at least partially overlaps with two sides of the one of the two first source-drain electrodes in the first direction; and
the orthographic projection of the second gate line on the second source-drain layer at least partially overlaps with two sides of the one of the two second source-drain electrodes in the first direction.

8. The array substrate according to claim 7, wherein an orthographic projection of the first line connection portion of the first gate line on the one of the two first source-drain electrodes at least partially overlaps with the one of the two first source-drain electrodes, and an orthographic projection of the second line connection portion of the second gate line on the one of the two second source-drain electrodes at least partially overlaps with the one of the two second source-drain electrodes.

9. The array substrate according to claim 7 wherein the first line connection portion comprises a first protrusion protruding toward the first gate portion, and the second line connection portion comprises a second protrusion protruding toward the second gate portion; and
  an orthographic projection of the first protrusion on the one of the two first source-drain electrodes at least partially overlaps with the one of the two first source-drain electrodes, and an orthographic projection of the second protrusion on the one of the two second source-drain electrodes at least partially overlaps with the one of the two second source-drain electrodes.

10. The array substrate according to claim 9, wherein an overlapping area between the orthographic projection of the first protrusion on the one of the two first source-drain electrodes and the one of the two first source-drain electrodes is a first overlapping area, and the first overlapping area has a first overlapping edge extending in the second direction intersecting with the first direction;
  an overlapping area between an orthographic projection of the first gate portion on the one of the two first source-drain electrodes and the one of the two first source-drain electrodes is a second overlapping area, and the second overlapping area has a second overlapping edge extending in the second direction;
  the first overlapping edge has a length equal to a length of the second overlapping edge;
  an overlapping area between the orthographic projection of the second protrusion on the one of the two second source-drain electrodes and the one of the two second source-drain electrodes is a third overlapping area, and the third overlapping area has a third overlapping edge extending in the second direction;
  an overlapping area between an orthographic projection of the second gate portion on the one of the two second source-drain electrodes and the one of the two second source-drain electrodes is a fourth overlapping area, and the fourth overlapping area has a fourth overlapping edge extending in the second direction; and
  the third overlapping edge has a length equal to a length of the fourth overlapping edge.

11. The array substrate according to claim 6, wherein an area of an overlapping area between the orthographic projection of the first gate line on the first source-drain layer and the one of the two first source-drain electrodes is a first value;
  an area of an overlapping area between the orthographic projection of the second gate line on the second source-drain layer and one of the two second source-drain electrodes is a second value; and
  the first value is equal to the second value.

12. The array substrate according to claim 6, wherein the first connection portion and the second connection portion are respectively on two sides of the first pixel electrode in the second direction perpendicular to the first direction;
  the first connection portion and the second connection portion are both between the first gate line and the second gate line in the second direction; and
  the first gate line and the second gate line are arranged symmetrically with respect to a center line, which extends along the first direction, of the pixel unit group in the second direction.

13. The array substrate according to claim 6, wherein the array substrate comprises a plurality of pixel unit groups arranged in an array;
  a first gate line for driving each pixel unit group and a second gate line for driving a pixel unit group that is adjacent to the each pixel unit group in the second direction partially overlap in the first direction;
  the array substrate further comprises a data line which is between adjacent pixel unit groups; and
  a first switching element and a second switching element of the each pixel unit group are connected to a same data line.

14. The array substrate according to claim 13, wherein the array substrate further comprises a plurality of common electrode patterns arranged in an array;
  the plurality of common electrode patterns are in one-to-one correspondence with the plurality of pixel unit groups;
  common electrode patterns in a same row are between a first gate line and a second gate line which are for driving pixel unit groups corresponding to the common electrode patterns in the same row;
  common electrode patterns adjacent in the first direction are electrically connected to each other through a first common electrode connection portion, and the first common electrode connection portion is in a layer same as the common electrode patterns;
  common electrode patterns adjacent in the second direction are electrically connected to each other through a second common electrode connection portion, and the second common electrode connection portion is in a layer same as the first connection portion, and the second common electrode connection portion and a corresponding common electrode pattern are electrically connected through a third via-hole;
  each of the common electrode patterns comprises a body portion and a first protrusion extending from a first side of the body portion;
  the first protrusion extends in the second direction; and
  the common electrode patterns adjacent in the second direction are electrically connected to each other through the third via-hole and first protrusions of the common electrode patterns adjacent in the second direction.

15. The array substrate according to claim 1, wherein a lateral distance between the first pixel electrode and a gate line for driving the first pixel is larger than five microns;
  a lateral distance between the second pixel electrode and a gate line for driving the second pixel is larger than five microns;
  an extension length of the first connection portion is smaller than an extension length of the second connection portion;
  the second pixel electrode has a recessed portion on a side closer to a gate line for driving the second pixel;
  the first pixel electrode and a gate line for driving the first pixel overlap with each other in a second direction intersecting with the first direction, and the second pixel electrode and a gate line for driving the second pixel overlap with each other in the second direction intersecting with the first direction; and
  an effective overlapping length between the gate line for driving the first pixel and a combined structure of the first pixel electrode and the first connection portion is equal to an effective overlapping length between the gate line for driving the second pixel and a combined structure of the second pixel electrode and the second connection portion.

16. A display panel comprising the array substrate according to claim 1.

17. A display device comprising the display panel according to claim 16.

18. A method for manufacturing an array substrate, comprising: forming a pixel unit group,
   wherein the pixel unit group comprises a first pixel and a second pixel arranged side by side in a first direction;
   the first pixel comprises a first pixel electrode, a first switching element, and a first connection portion extending and protruding from the first pixel electrode;
   the second pixel comprises a second pixel electrode, a second switching element, and a second connection portion extending and protruding from the second pixel electrode;
   the first pixel electrode and the first switching element are electrically connected to each other via the first connection portion;
   the second pixel electrode and the second switching element are electrically connected to each other via the second connection portion; and
   a length of the first connection portion is not equal to a length of the second connection portion;
   the first switching element comprises a first source-drain layer, and the first source-drain layer comprises two first source-drain electrode which are opposite to each other and spaced apart;
   the second switching element comprises a second source-drain layer, and the second source-drain layer comprises two second source-drain electrodes which are opposite to each other and spaced apart;
   the first connection portion is directly and electrically connected to the first pixel electrode, and the first connection portion is electrically connected to one of the two first source-drain electrodes via a first via-hole; and
   the second connection portion is directly and electrically connected to the second pixel electrode, and the second connection portion is electrically connected to one of the two second source-drain electrodes via a second via-hole;
   the one of the two first source-drain electrodes covers part of an opening area of the first via-hole, and other part of the opening area of the first via-hole is on a side of the one of the first source-drain electrodes closer to the first pixel electrode; and
   the one of the two second source-drain electrodes covers part of an opening area of the second via-hole, and other part of the opening area of the second via-hole is on a side of the one of the second source-drain electrodes closer to the first pixel electrode.

* * * * *